(12) United States Patent
Hirsch et al.

(10) Patent No.: US 8,898,630 B2
(45) Date of Patent: *Nov. 25, 2014

(54) SYSTEMS AND METHODS FOR A VOICE- AND GESTURE-CONTROLLED MOBILE APPLICATION DEVELOPMENT AND DEPLOYMENT PLATFORM

(71) Applicant: Media Direct, Inc., Deerfield Beach, FL (US)

(72) Inventors: Scott Hirsch, Boca Raton, FL (US); Arsen Pereymer, Ft. Lauderdale, FL (US); Sunny Rajpal, Sunrise, FL (US)

(73) Assignee: Media Direct, Inc., Deerfield Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/831,155

(22) Filed: Mar. 14, 2013

(65) Prior Publication Data

US 2014/0109046 A1    Apr. 17, 2014

Related U.S. Application Data

(63) Continuation-in-part of application No. 13/396,392, filed on Feb. 14, 2012.

(60) Provisional application No. 61/472,609, filed on Apr. 6, 2011.

(51) Int. Cl.
*G06F 9/44* (2006.01)
*G06F 3/00* (2006.01)

(52) U.S. Cl.
CPC .. *G06F 8/70* (2013.01); *G06F 9/44* (2013.01); *G06F 3/00* (2013.01)
USPC .......................................................... 717/107

(58) Field of Classification Search
USPC .......................................................... 717/107
See application file for complete search history.

(56) References Cited

U.S. PATENT DOCUMENTS 4,340,973 A    7/1982   Umetsu
5,950,167 A    9/1999   Yaker
(Continued)

FOREIGN PATENT DOCUMENTS

CN    101276276    10/2008
CN    101686427    3/2010
(Continued)

OTHER PUBLICATIONS

Notification of Transmittal of the International Search Report and the Written Opinion of the International Searching Authority, or the Declaration; International Search Report; Written Opinion of the International Searching Authority, mailed Sep. 19, 2014, for PCT/US2014/25828.

(Continued)

*Primary Examiner* — Li B Zhen
*Assistant Examiner* — Sen Chen
(74) *Attorney, Agent, or Firm* — Bryan Cave LLP

(57) ABSTRACT

Systems and methods for developing, customizing, and deploying mobile device applications through voice and/or gesture interactions are provided through a mobile application development and deployment platform. Preferably, these systems and methods are implemented in an Internet based environment that allows non-technical users to build sophisticated, highly-customizable cross-platform mobile applications. The platform allows users to use voice and/or gesture interactions to select, input, create, customize, and combine various content, design characteristics, and application components, such as modules, some of which utilize features and functionality associated with various mobile devices and mobile operating systems. In certain embodiments, the platform allows users to compile the mobile application for various mobile operating systems and generates a configuration file for the mobile application that can be distributed to end users for execution on various mobile devices. When the mobile application is installed on, or executed by the mobile device, the configuration file may enable the retrieval of various data associated with the mobile application.

21 Claims, 53 Drawing Sheets

(56) References Cited

U.S. PATENT DOCUMENTS

| | | |
|---|---|---|
| 6,023,275 A | 2/2000 | Horvitz et al. |
| 6,311,194 B1 | 10/2001 | Sheth et al. |
| 6,332,163 B1 | 12/2001 | Bowman-Amuah |
| 6,470,447 B1 | 10/2002 | Lambert et al. |
| D495,339 S | 8/2004 | Gildred |
| D496,370 S | 9/2004 | Gildred |
| D548,743 S | 8/2007 | Takahashi et al. |
| D555,660 S | 11/2007 | Noviello et al. |
| 7,331,035 B2 | 2/2008 | Loos et al. |
| 7,421,577 B2 | 9/2008 | Ichikawa et al. |
| D587,720 S | 3/2009 | Noviello et al. |
| D590,407 S | 4/2009 | Watanabe et al. |
| D604,740 S | 11/2009 | Matheny et al. |
| 7,716,634 B2 | 5/2010 | Ross et al. |
| D627,790 S | 11/2010 | Chaudhri |
| D631,887 S | 2/2011 | Vance et al. |
| 7,890,926 B2 | 2/2011 | Balathandapani et al. |
| 7,899,847 B2 | 3/2011 | Lau et al. |
| 7,913,234 B2 | 3/2011 | Neil et al. |
| 7,920,852 B2 | 4/2011 | Neil et al. |
| 7,933,965 B2 | 4/2011 | Bonar et al. |
| 7,934,019 B2 | 4/2011 | Bonar et al. |
| D638,853 S | 5/2011 | Bringa |
| 7,962,762 B2 | 6/2011 | Kirsch et al. |
| D654,085 S | 2/2012 | Jones et al. |
| 8,122,107 B2 | 2/2012 | Bonar et al. |
| D656,157 S | 3/2012 | Khan et al. |
| 8,146,156 B2 | 3/2012 | King et al. |
| 8,612,933 B1 | 12/2013 | Gill et al. |
| 8,832,644 B2 | 9/2014 | Hirsch et al. |
| 2003/0002631 A1 | 1/2003 | Gaddipati |
| 2003/0084449 A1 | 5/2003 | Chane et al. |
| 2004/0100479 A1 | 5/2004 | Nakano et al. |
| 2004/0192282 A1 | 9/2004 | Vasudevan |
| 2004/0201602 A1 | 10/2004 | Mody et al. |
| 2004/0250238 A1 | 12/2004 | Singh et al. |
| 2004/0260939 A1 | 12/2004 | Ichikawa et al. |
| 2005/0055420 A1 | 3/2005 | Wyler |
| 2006/0044307 A1 | 3/2006 | Song |
| 2006/0129972 A1 | 6/2006 | Tyburski et al. |
| 2006/0167860 A1 | 7/2006 | Eliashberg et al. |
| 2006/0193264 A1 | 8/2006 | Bonar et al. |
| 2006/0242266 A1 | 10/2006 | Keezer et al. |
| 2006/0258341 A1 | 11/2006 | Miller |
| 2006/0282897 A1 | 12/2006 | Sima et al. |
| 2007/0006327 A1 | 1/2007 | Lal et al. |
| 2007/0016925 A1 | 1/2007 | Vaysman et al. |
| 2007/0061724 A1 | 3/2007 | Slothouber et al. |
| 2007/0099658 A1 | 5/2007 | Borquez et al. |
| 2007/0100648 A1 | 5/2007 | Borquez et al. |
| 2007/0106764 A1 | 5/2007 | Mansfield |
| 2007/0118801 A1* | 5/2007 | Harshbarger et al. ......... 715/730 |
| 2007/0168947 A1 | 7/2007 | Halbedel et al. |
| 2007/0174818 A1 | 7/2007 | Pasula |
| 2007/0186241 A1 | 8/2007 | Sugimoto et al. |
| 2007/0220494 A1 | 9/2007 | Spooner |
| 2007/0240133 A1 | 10/2007 | Neil et al. |
| 2007/0261090 A1 | 11/2007 | Miller et al. |
| 2008/0015955 A1 | 1/2008 | Ehrman et al. |
| 2008/0016176 A1 | 1/2008 | Leitner |
| 2008/0046238 A1 | 2/2008 | Orcutt |
| 2008/0059893 A1 | 3/2008 | Byrne et al. |
| 2008/0222621 A1 | 9/2008 | Knight et al. |
| 2008/0228906 A1 | 9/2008 | Yerubandi et al. |
| 2008/0306740 A1* | 12/2008 | Schuck et al. ................ 704/275 |
| 2009/0119268 A1 | 5/2009 | Bandaru et al. |
| 2009/0125376 A1 | 5/2009 | Sundaresan et al. |
| 2009/0125469 A1 | 5/2009 | McDonald et al. |
| 2009/0131035 A1 | 5/2009 | Aiglstorfer |
| 2009/0178007 A1* | 7/2009 | Matas et al. .................. 715/835 |
| 2009/0183138 A1 | 7/2009 | Loos et al. |
| 2009/0216800 A1 | 8/2009 | Neil et al. |
| 2009/0228862 A1 | 9/2009 | Bertelrud et al. |
| 2009/0259940 A1 | 10/2009 | Moraes |
| 2009/0300578 A1 | 12/2009 | Neil |
| 2009/0300656 A1 | 12/2009 | Bosworth et al. |
| 2009/0307679 A1 | 12/2009 | Lee et al. |
| 2010/0017812 A1 | 1/2010 | Nigam |
| 2010/0068680 A1 | 3/2010 | Quintilio |
| 2010/0138784 A1 | 6/2010 | Colley |
| 2010/0146442 A1 | 6/2010 | Nagasaka et al. |
| 2010/0174643 A1 | 7/2010 | Schaefer et al. |
| 2010/0174974 A1 | 7/2010 | Brisebois |
| 2010/0180213 A1 | 7/2010 | Karageorgos et al. |
| 2010/0199197 A1 | 8/2010 | Faletski et al. |
| 2010/0223393 A1 | 9/2010 | Silverbrook et al. |
| 2010/0251230 A1 | 9/2010 | O'Farrell et al. |
| 2010/0251292 A1 | 9/2010 | Srinivasan et al. |
| 2010/0273450 A1 | 10/2010 | Papineau et al. |
| 2010/0281475 A1* | 11/2010 | Jain et al. ..................... 717/172 |
| 2010/0312691 A1 | 12/2010 | Johnson |
| 2010/0318508 A1 | 12/2010 | Brawer et al. |
| 2010/0319040 A1 | 12/2010 | Diaz Perez |
| 2010/0333137 A1 | 12/2010 | Hamano et al. |
| 2011/0023016 A1 | 1/2011 | Khader et al. |
| 2011/0035345 A1 | 2/2011 | Duan et al. |
| 2011/0035708 A1* | 2/2011 | Damale ......................... 715/863 |
| 2011/0078715 A1 | 3/2011 | Chung et al. |
| 2011/0145218 A1 | 6/2011 | Meyerzon et al. |
| 2011/0154305 A1 | 6/2011 | Leroux et al. |
| 2011/0161394 A1 | 6/2011 | Chidel et al. |
| 2011/0161912 A1 | 6/2011 | Eteminan et al. |
| 2011/0167336 A1 | 7/2011 | Aitken et al. |
| 2011/0185392 A1 | 7/2011 | Walker |
| 2011/0214056 A1 | 9/2011 | Fleizach et al. |
| 2011/0231872 A1 | 9/2011 | Gharachorloo et al. |
| 2011/0289524 A1 | 11/2011 | Toner et al. |
| 2012/0005702 A1 | 1/2012 | Tindell |
| 2012/0008786 A1 | 1/2012 | Cronk et al. |
| 2012/0023131 A1 | 1/2012 | Downey et al. |
| 2012/0036494 A1 | 2/2012 | Gurumohan et al. |
| 2012/0036498 A1 | 2/2012 | Akirekadu et al. |
| 2012/0042036 A1 | 2/2012 | Lao et al. |
| 2012/0050530 A1* | 3/2012 | Raman et al. .................. 348/142 |
| 2012/0060087 A1 | 3/2012 | Jame |
| 2012/0066601 A1 | 3/2012 | Zazula et al. |
| 2012/0083911 A1 | 4/2012 | Louboutin et al. |
| 2012/0089933 A1 | 4/2012 | Garand et al. |
| 2012/0123675 A1 | 5/2012 | Parker |
| 2012/0137270 A1 | 5/2012 | Ortiz |
| 2012/0159310 A1 | 6/2012 | Change et al. |
| 2012/0167047 A1 | 6/2012 | Wyler et al. |
| 2012/0260232 A1 | 10/2012 | Hirsch et al. |
| 2012/0284252 A1 | 11/2012 | Drai et al. |
| 2013/0103669 A1 | 4/2013 | Gonzalez et al. |
| 2013/0174012 A1 | 7/2013 | Kwan et al. |
| 2013/0205276 A1 | 8/2013 | Hirsch et al. |
| 2013/0205278 A1 | 8/2013 | Hirsch et al. |
| 2013/0219429 A1 | 8/2013 | Hirsch et al. |
| 2013/0247005 A1 | 9/2013 | Hirsch et al. |
| 2013/0283305 A1 | 10/2013 | Hirsch et al. |
| 2013/0305218 A1 | 11/2013 | Hirsch et al. |
| 2014/0032263 A1 | 1/2014 | Kalikivayi et al. |
| 2014/0129534 A1 | 5/2014 | Riley et al. |

FOREIGN PATENT DOCUMENTS

| | | |
|---|---|---|
| JP | 2009/104568 | 3/2011 |
| KR | 2014-0018329 | 2/2014 |
| WO | WO 96/19779 | 6/1996 |
| WO | WO 2009/058740 | 5/2009 |
| WO | WO 2011/022808 | 5/2009 |
| WO | WO 2009/078020 | 6/2009 |
| WO | WO 2012/154347 | 11/2012 |
| WO | WO 2013/121285 | 8/2013 |
| WO | WO 2013/121286 | 8/2013 |
| WO | WO 2013/121293 | 8/2013 |

(56) References Cited

FOREIGN PATENT DOCUMENTS

| WO | WO 2013/121301 | 8/2013 |
|---|---|---|
| WO | WO 2013/121302 | 8/2013 |

OTHER PUBLICATIONS

Abrahamsson, P., et al., "Mobile-D: An Agile Approach for Mobile Application Development", Proceeding OOPSLA, 2004, pp. 174-175.
Anubavam; http://web.archive.org/web/20111012143319/http://www.anubavam.com/website-to-mobile-app; Oct. 12, 2011; pp. 1-4.
App Inventor [online], Dec. 30, 2010 [retrieved on Apr. 17, 2012]. Retrieved from the Internet: <URL: http://web.archive.org/web/20101230143103/http://appinventor.googlelabs.com/about/moreinfo/>.
Appmakr [online], [retrieved on Apr. 17, 2012]. Retrieved from the Internet: <URL: http://www.appmakr.com/>.
Appsbar, "About Us", http://www.appsbar.com/AboutUs.php; 2011; 2 pages.
AppsGeyser; web.archive.org/web/20110324220845/http://www.appsgeyser.com/about/; Mar. 24, 2011, pp. 1-2.
Appy Pie; http://web.archive.org/web/20130615002921/http://www.appypie.com/convert-website-to-mobile-apps; Jun. 15, 2013; pp. 1-2.
Balagtas-Fernandez, F., et al., "Mobia Modeler: Easing the Creation Process of Mobile Applications for Non-Technical Users", In Proceedings of IUI, 2010, pp. 269-272.
Boxee [online], [retrieved on Jan. 9, 2014]. Retrieved from the Internet: <URL: http://developer.boxee.tv/Main_Page>.
Buzztouch [online], [retrieved on Apr. 17, 2012]. Retrieved from the Internet: <URL: http://www.buzztouch.com/pages/>.
Cablevision [online], [retrieved on Jan. 9, 2014]. Retrieved from the Internet: <URL: http://www.optimum.com/digital-cable-tv/games/>.
Churchill, iBuildApp: Not There Yet [online], Jun. 13, 2011 [retrieved on Apr. 17, 2012]. Retrieved from the Internet: <URL: http://www.dailywireless.org/2011/06/13/ibuildapp-not-there-yet/>.
Eliot Van Buskirk, "Appsbar Lets Bands Make Apps to Sell Music", Sep. 12, 2011, 2 pages, http://evolver.fm/2011/09/12/appsbar-lets-bands-make-apps-to-sell-music/.
Empson, Meteor: Etherpad Founder & Other Rockstars Team Up to Make Web App Development A Breeze [online], Apr. 11, 2012 [retrieved on Apr. 17, 2012]. Retrieved from the Internet: <URL: http://techcrunch.com/2012/04/11/meteor-launch>.
George Wong; "Apps Builder lets you turn your website into an app"; Feb. 10, 2012; pp. 1-3, web.archive.org/web/20120212202030/http://www.ubergizmo.com/2012/02/apps-builder/.
Google TV [online], [retrieved on Jan. 9, 2014]. Retrieved from the Internet: <URL: http://www.google.com/tv/publisher/develop/index.html>.
Hussain et al., "User Interface Design for a Mobile Multimedia Application an Iterative Approach", IEEE (2008).
iBuildApp: design and publish your own iPhone Application for free! [online], Oct. 2, 2010 [retrieved on Dec. 7, 2011]. Retrieved from the Internet: <URL: http://web.archive.org/web/20101002204504/http://ibuildapp.com/features/>.
iBuildApp: design and publish your own iPhone Application for free! [online], Nov. 1, 2010 [retrieved on Dec. 7, 2011]. Retrieved from the Internet: <URL: http://web.archive.org/web/20101101005101/http://ibuildapp.com/about-us/>.
iBuildApp: design and publish your own iPhone Application for free! [online], Nov. 9, 2010 [retrieved on Dec. 7, 2011]. Retrieved from the Internet: <URL: http://web.archive.org/web/20101109141443/http://ibuildapp.com/faq/>.
iBuildApp: design and publish your own iPhone Application for free! [online], Oct. 2, 2010 [retrieved on Dec. 7, 2011]. Retrieved from the Internet: <URL: http://web.archive.org/web/20101002204432/http://ibuildapp.com/faq/>.
iBuildApp:: Create Free iPhone Application Using Online Interface Builder| Android, iPad [online], Jan. 29, 2011 [retrieved on Dec. 7, 2011]. Retrieved from the Internet: <URL: http://web.archive.org/web/20110129063244/http://ibuildapp.com/>.
iBuildApp:: Create Free iPhone Application Using Online Interface Builder| Android, iPad [online], Jul. 13, 2011 [retrieved on Dec. 7, 2011]. Retrieved from the Internet: <URL: http://web.archive.org/web/20110713001120/http://ibuildapp.com/>.
Kevin Casey, InforamtionWeek, "Appsbar Helps SMBs Build Mobile Apps", Apr. 28, 2011, 6 pages, http://www.informationweek.com/mobile/appsbar-helps-smbs-build-mobile-apps/d/d-id/1097435?.
Lawler, Kontrol.tv Launches to Help Developers Build Multiplatform, Multiscreen Mobile and TV Apps [online], [retrieved on Jan. 9, 2014]. Retrieved from the Internet: <URL: http://techcrunch.com/2012/11/19/kontrol-tv/?utm_medium=referral&utm_source=pulsenews>.
Lee et al., "The Design and Development of User Interfaces for Voice Application in Mobile Devices", IEEE (2006).
LG NetCast [online], [retrieved Jan. 27, 2014]. Retrieved from the Internet: <URL: http://developer.lge.com/main/Intro.dev>.
Majoobi AS [online], [retrieved on Apr. 17, 2012]. Retrieved from the Internet: <URL: http://www.majoobi.com/>.
Notification of Transmittal of the International Search Report and the Written Opinion of the International Searching Authority, or the Declaration; International Search Report; Written Opinion of the International Searching Authority, mailed Jun. 6, 2012.
Notification of Transmittal of the International Search Report and the Written Opinion of the International Searching Authority, or the Declaration; International Search Report; Written Opinion of the International Searching Authority, mailed Sep. 27, 2013, for PCT/IB2013/000800.
Notification of Transmittal of the International Search Report and the Written Opinion of the International Searching Authority, or the Declaration; International Search Report; Written Opinion of the International Searching Authority, mailed Sep. 27, 2013, for PCT/IB2013/000673.
Notification of Transmittal of the International Search Report and the Written Opinion of the International Searching Authority, or the Declaration; International Search Report; Written Opinion of the International Searching Authority, mailed Sep. 27, 2013, for PCT/IB2013/000792.
Notification of Transmittal of the International Search Report and the Written Opinion of the International Searching Authority, or the Declaration; International Search Report; Written Opinion of the International Searching Authority, mailed Feb. 21, 2014, for PCT/IB2013/000585.
Notification of Transmittal of the International Search Report and the Written Opinion of the International Searching Authority, or the Declaration; International Search Report; Written Opinion of the International Searching Authority, mailed Mar. 18, 2014, for PCT/IB2013/000588.
Panasonic Viera Cast/Connect [online], [retrieved on Jan. 9, 2014]. Retrieved from the Internet: <URL: http://developer.vieraconnect.com/>.
PhoneGap [online], [retrieved on Apr. 17, 2012]. Retrieved from the Internet: <URL: http://www.phonegap.com/>.
PhoneGap; http://web.archive.org/web/20110902045616/http://www.phonegap.com; Sep. 2, 2011; pp. 1-2.
Rhomobile, Inc. [online], [retrieved on Apr. 17, 2012]. Retrieved from the Internet: <URL: http://rhomobile.com/>.
Roku [online], [retrieved on Jan. 9, 2014]. Retrieved from the Internet: <URL: http://www.roku.com/developer>.
Samsung Smart TV [online], [retrieved Jan. 27, 2014]. Retrieved from the Internet: <URL: http://www.samsungdforum.com/SamsungDForum>.
scotthirsch.com, "In the News", http://scotthirsch.com/news.html, 2011; 1 page.
Seattle Clouds [online], [retrieved on Apr. 17, 2012]. Retrieved from the Internet: <URL: http://seattleclouds.com/?mfb_exit=1>.
SmartTV [online], [retrieved on Jan. 9, 2014]. Retrieved from the Internet: <URL: http://www.yourappontv.com/home>.

(56) References Cited

OTHER PUBLICATIONS

SwebApps [online], [retrieved on Apr. 17, 2012]. Retrieved from the Internet: <URL: http://swebapps.com/index.php>.

Taft, D.K., "PhoneGap Simplifies iPhone, Android, BlackBerry Development", http://www.eweek.com—eWeek, Mar. 13, 2009.

TapLynx [online], [retrieved on Apr. 17, 2012]. Retrieved from the Internet: <URL: http://taplynx.com/>.

TapLynx: Build Feature Rich IPhone Apps Without Coding [online], [retrieved on Apr. 17, 2012]. Retrieved from the Internet: <URL: http://taplynx.com/features/>.

Toshiba Places [online], [retrieved on Jan. 9, 2014]. Retrieved from the Internet: <URL: http://us.toshiba.com/tv/research-center/technology-guides/internet-tv-apps>.

UppSite; web.archive.org/web/20111026105033/http://www.uppsite.com/; Oct. 25, 2011-Nov. 1, 2011, pp. 1-24.

Verizon FIOS [online], [retrieved on Jan. 9, 2014]. Retrieved from the Internet: <URL: <https://www22.verizon.com/fiosdeveloper/General/FiosDevCenterExt.aspx>.

Williams, Unity cross-platform game development tool launches for Android, examiner.com [online], Mar. 2, 2011 [retrieved on Apr. 17, 2012]. Retrieved from the Internet: <URL: http://www.examiner.com/mobile-gaming-in-columbus/unity-cross-platform-game-development-tool-launches-for-android.

Yahoo Connected TV [online], [retrieved on Jan. 9, 2014]. Retrieved from the Internet: <URL: http://connectedtv.yahoo.com/>.

Notification of Transmittal of the International Search Report and the Written Opinion of the International Searching Authority, or the Declaration; International Search Report; Written Opinion of the International Searching Authority, mailed Aug. 21, 2014, for PCT/US2014/25805.

\* cited by examiner

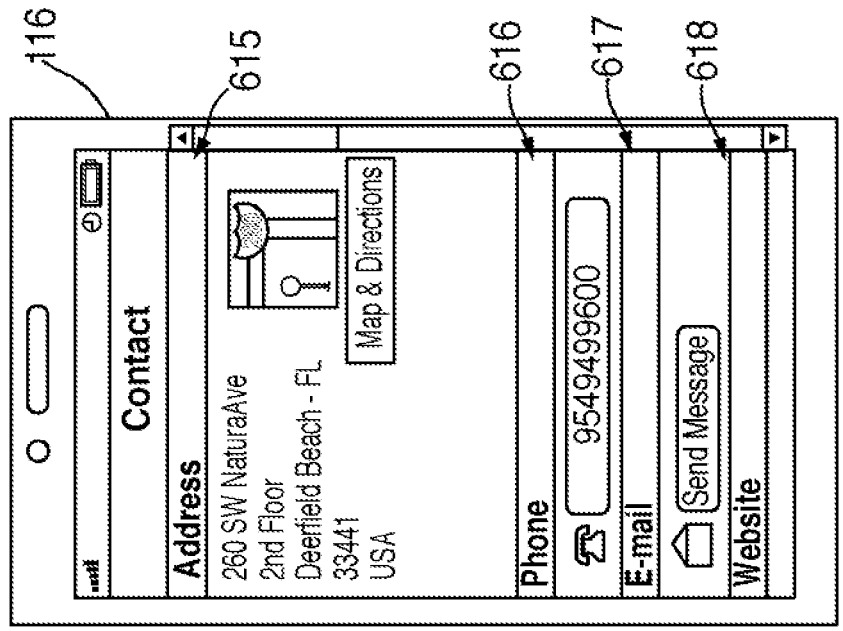
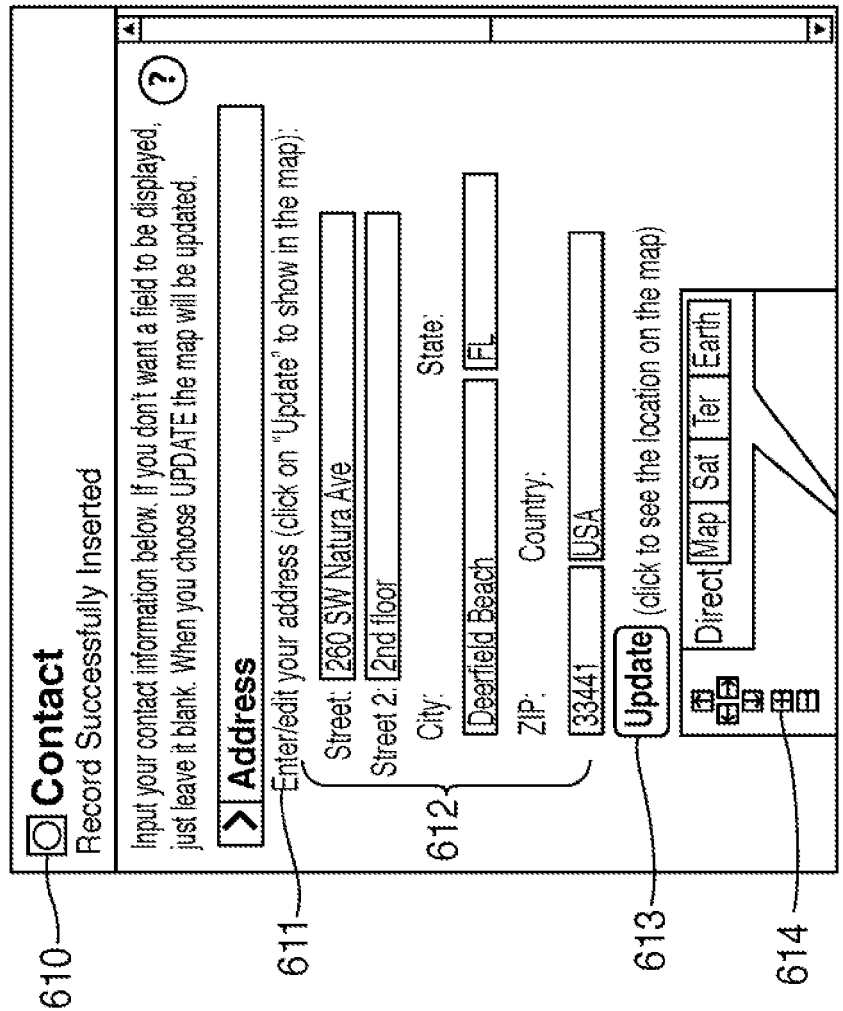
FIG. 10

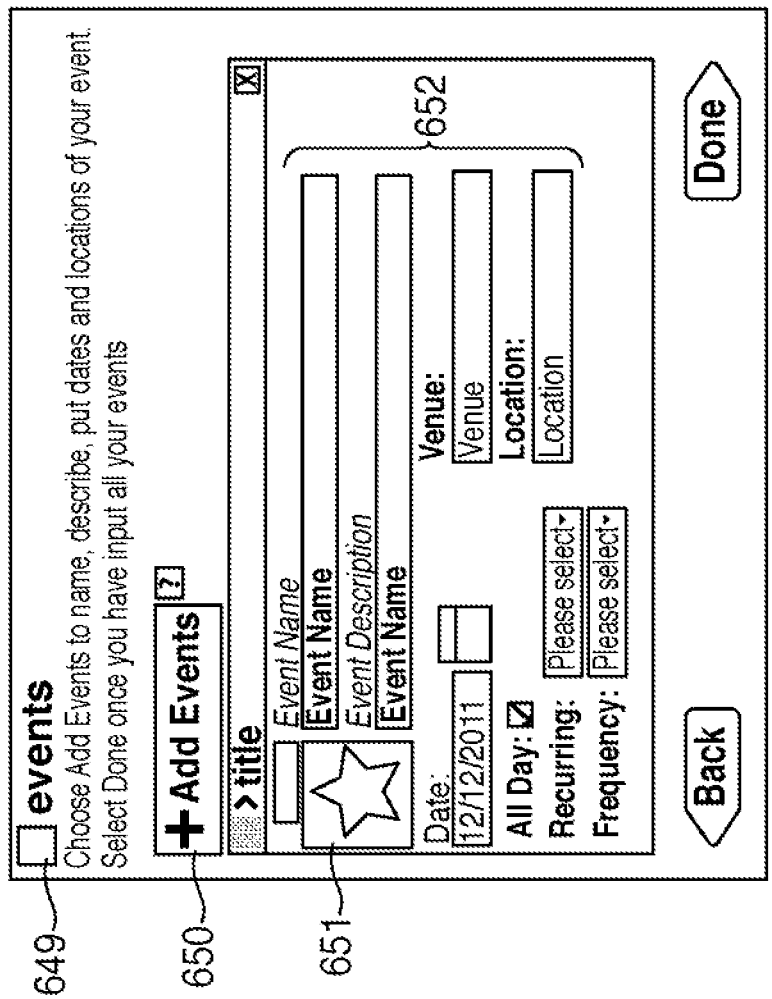
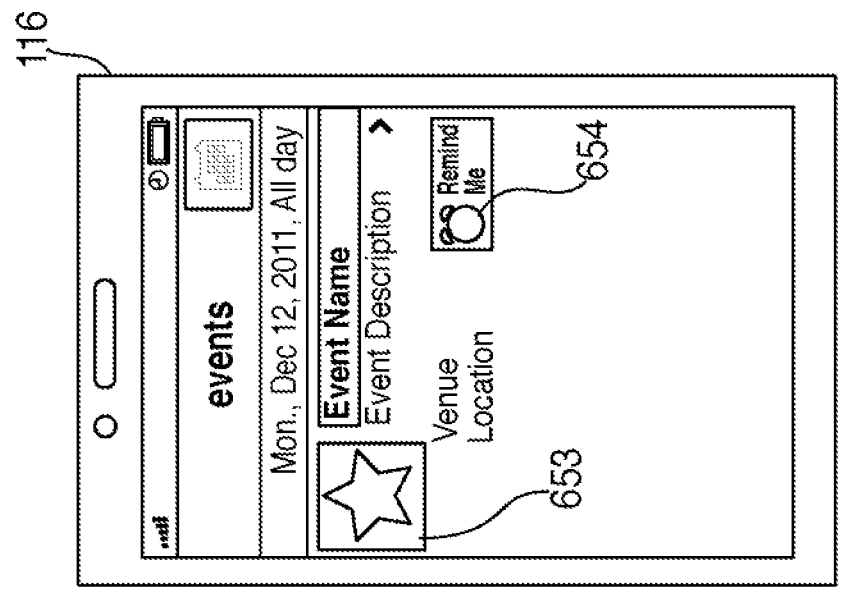
FIG. 16

FIG. 20A

Your form intro text...

Your Text Box:

Your Mulitple Choice Text:
  ○ Option 1
  ○ Option 2

Your Drop Down List:
[Option 1 ▼]

Your Text Area:

*Required

[Submit]

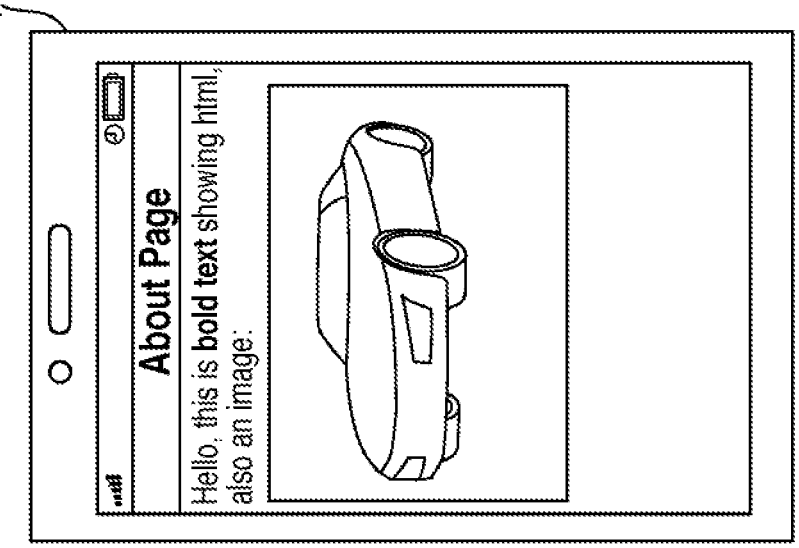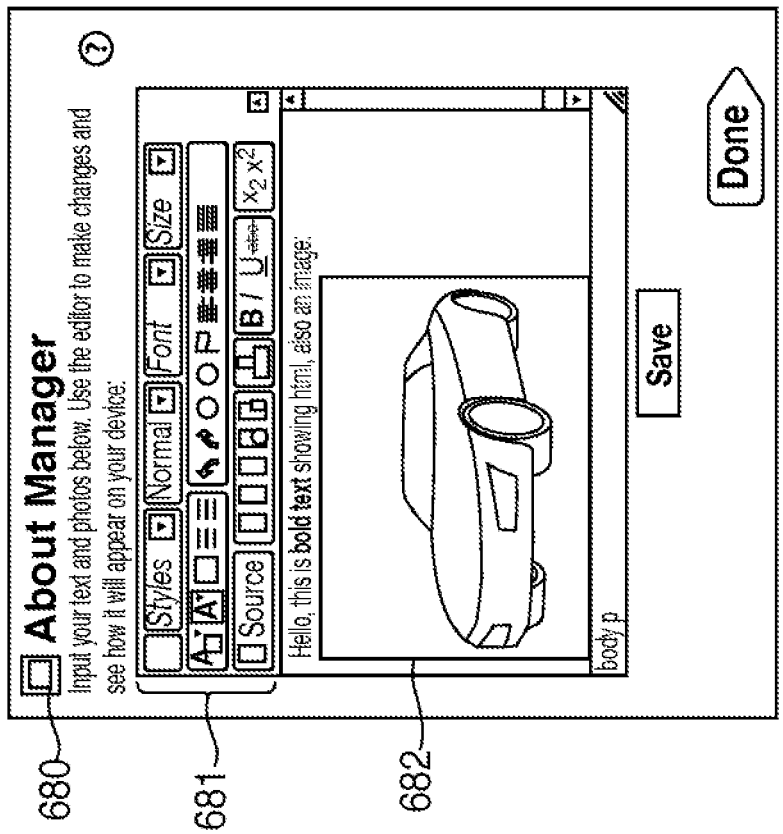
FIG. 22

FIG. 23A
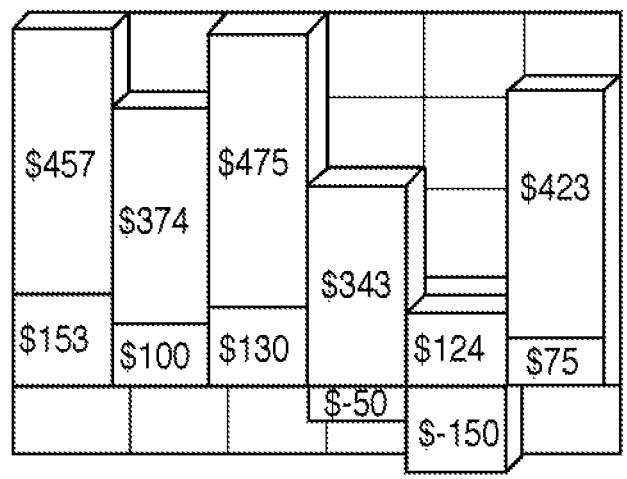
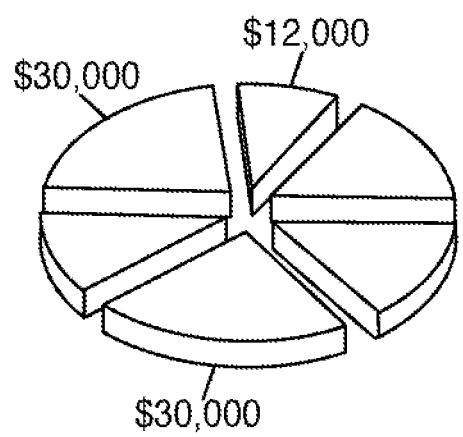

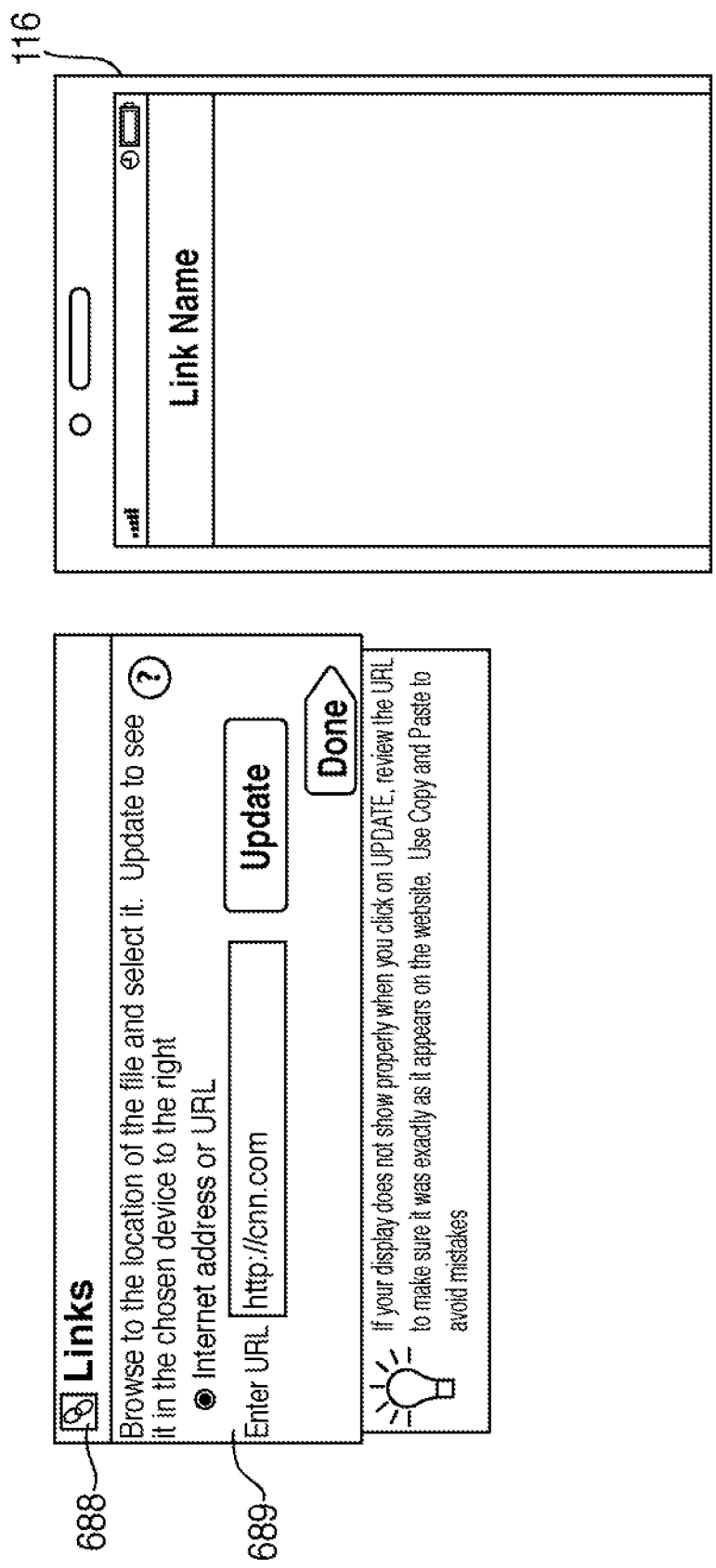

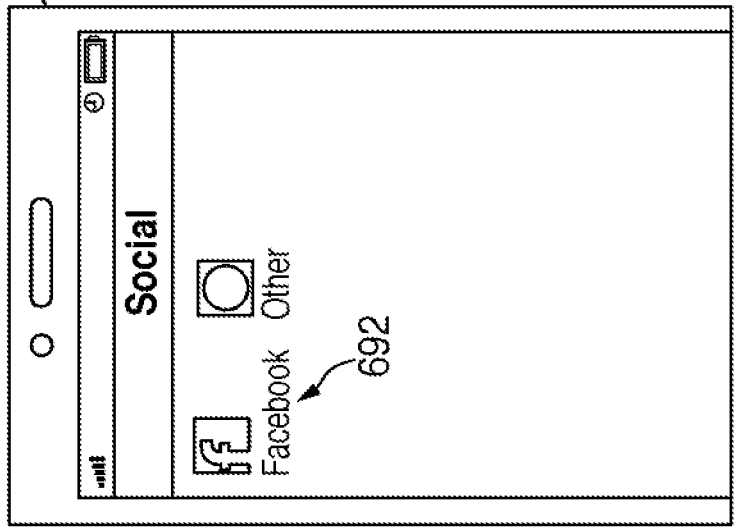
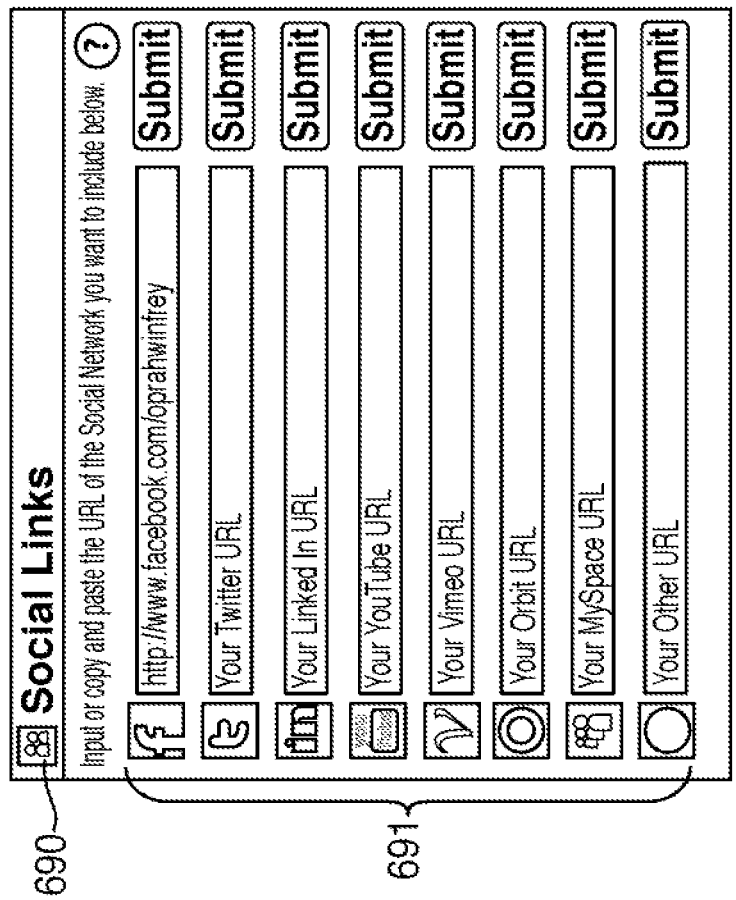
FIG. 25

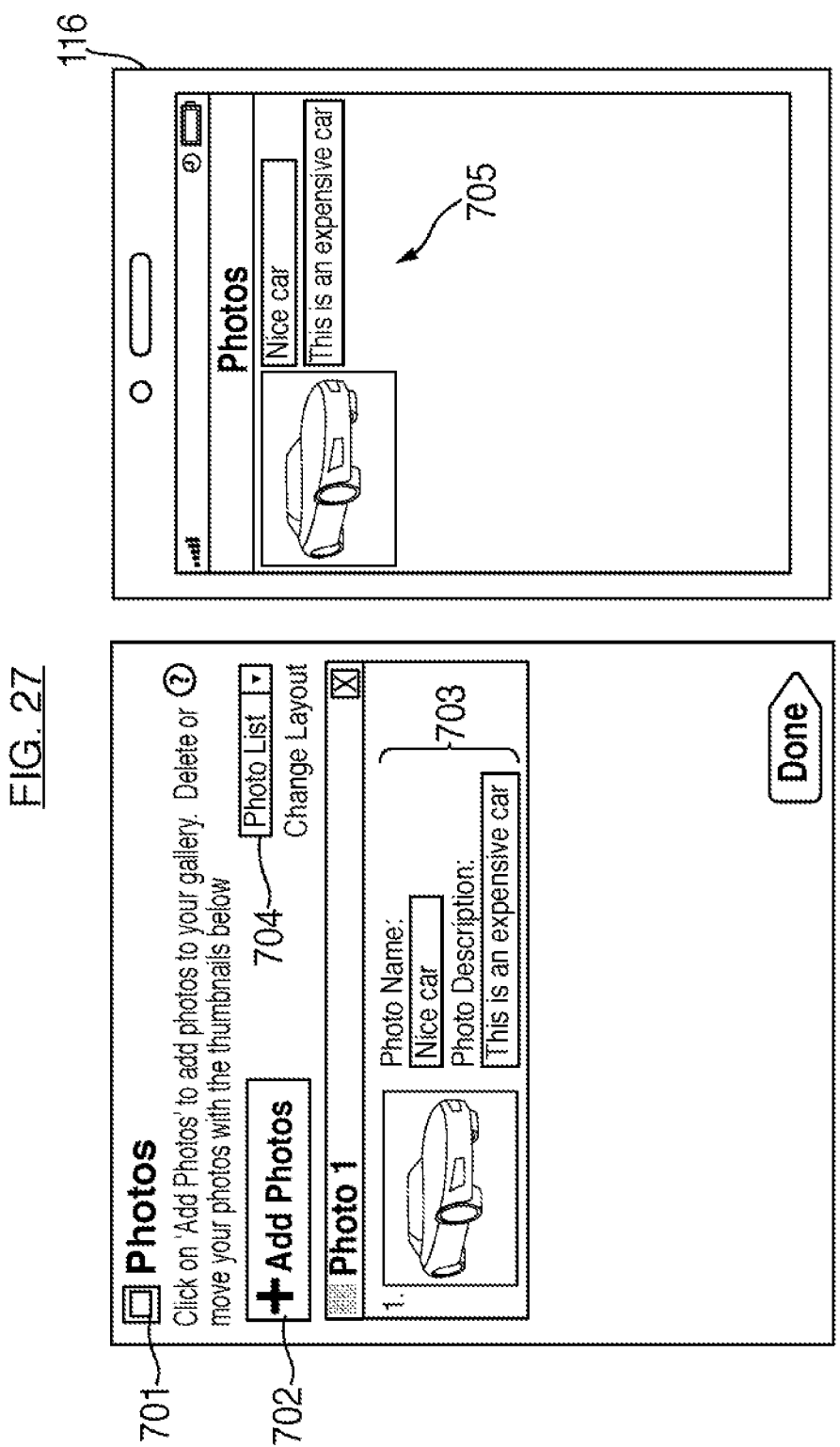

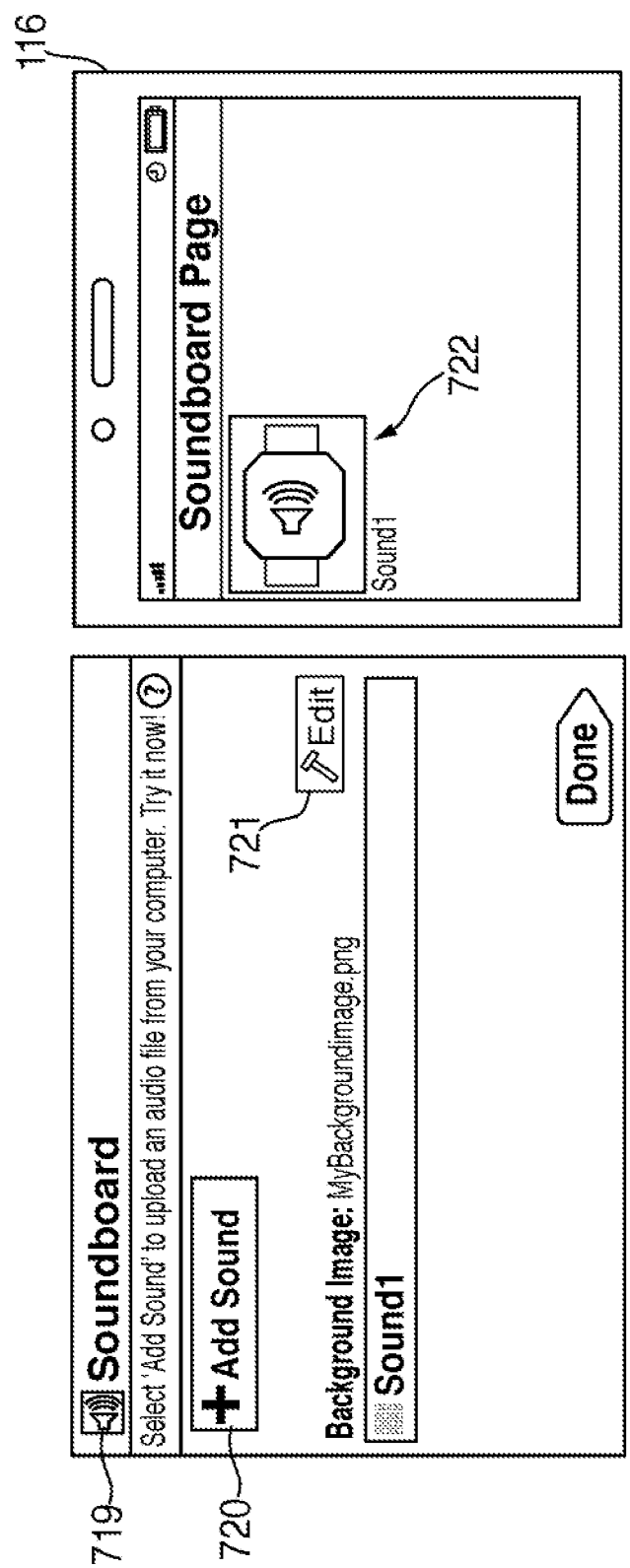

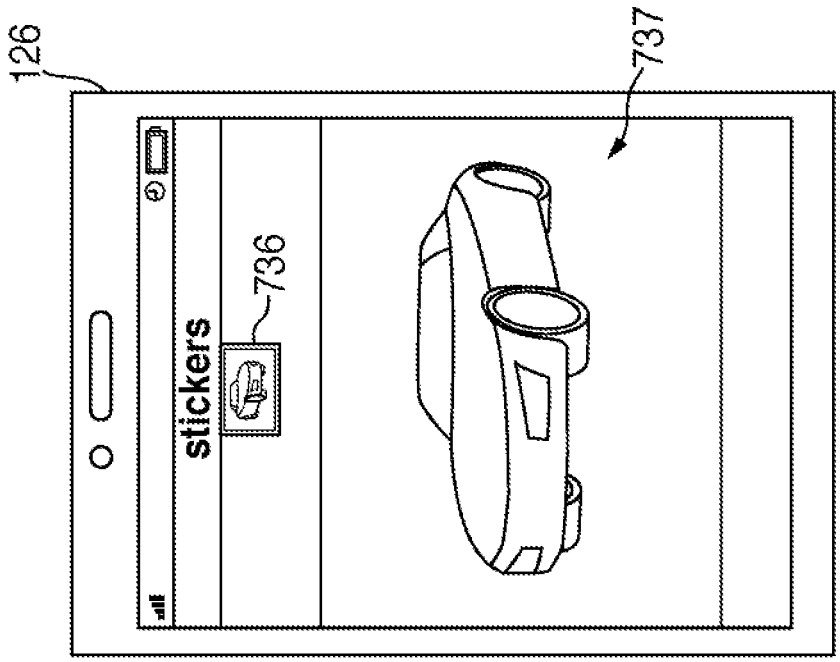
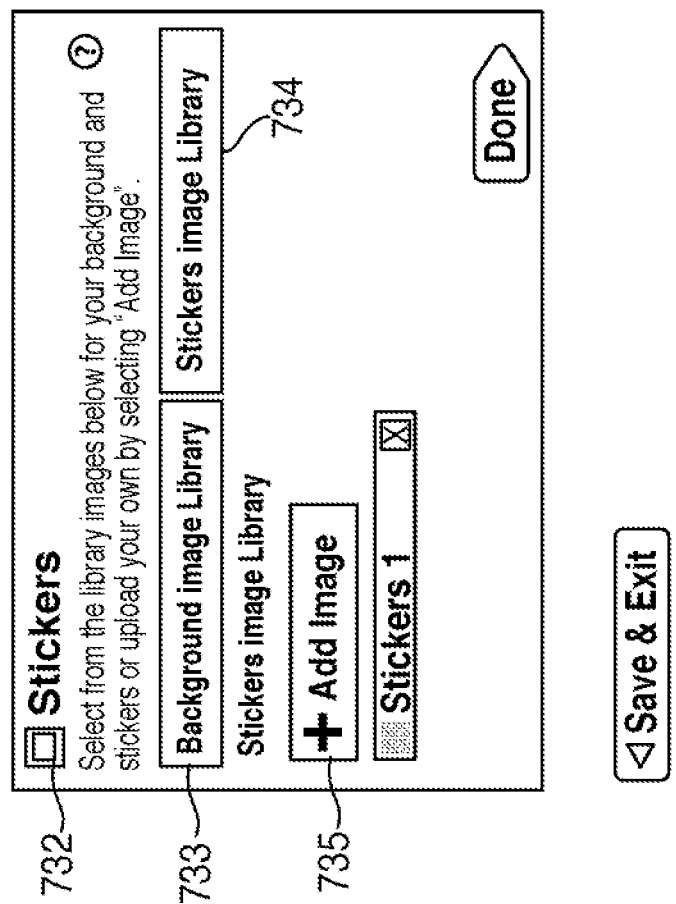
FIG. 32

FIG. 34A
| | Express | Late Night | Main | |
|---|---|---|---|---|
| Fan Favorites | | | | |
All Star Burger
Grilled and Served with Pub Sauce.
Add Cheese $0.50 Cheddar, Provolone,
Swiss, Pepperjack or American
$4.95   with Beverage Purchase
Five Wings
Mild, Medium, Hot, Habanero, Garlic,
Teriyaki, Honey BBQ, Rasberty or Chipotle
$4.95   with Beverage Purchase
Grilled Chicken Sandwich
With Lettuce and Tomato on a Kaiser Bun

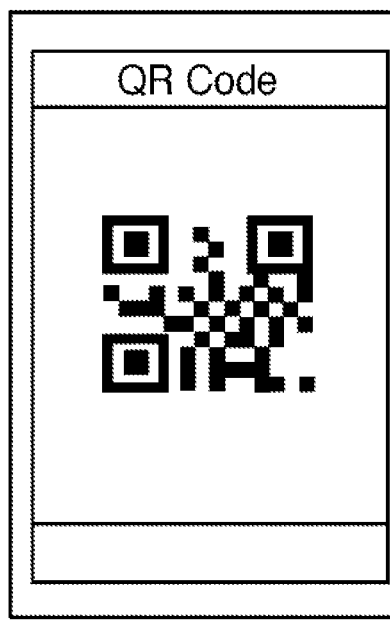

FIG. 36

Coupon Manager — 761

You can both create and edit the coupons from here. To edit a coupon you already created just select it and edit away. To add new coupons select 'Add Item' and the coupon wizard will begin.

+ Add Coupon — 762

Coupon Item Title

Name:
Coupon Item Title
Description:
Coupon Item Description

Date:
12/16/2011
Frequency:
Once
Repeat: [2] (number of times)

Coupon information
Name of Item or Service:
Item Name
Information or Promotion:
Promotion
Code:
123456789

— 763

Done

Coupons — 126

Coupon Item Title

Coupon Item Description

— 764

Item name

Promotion

123456789

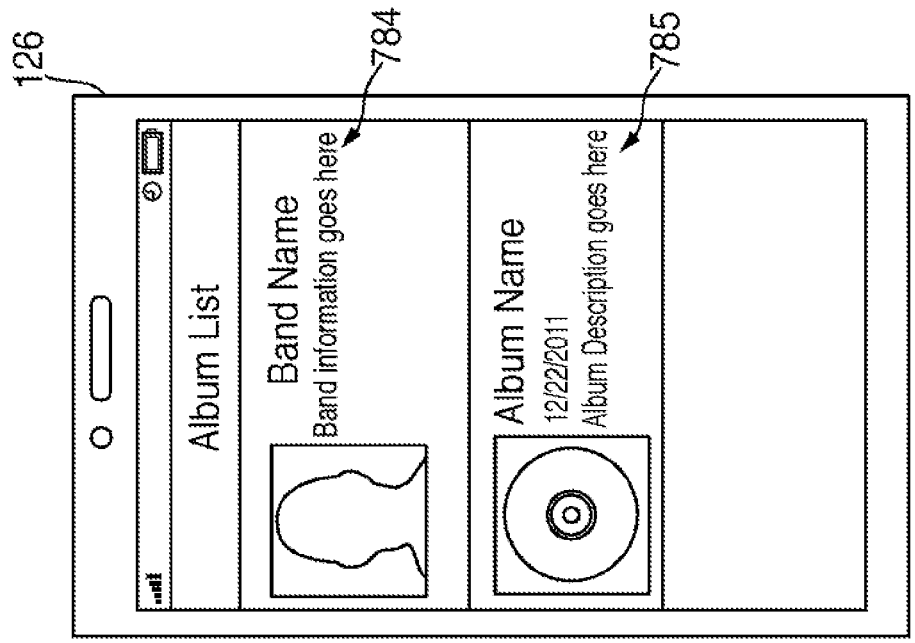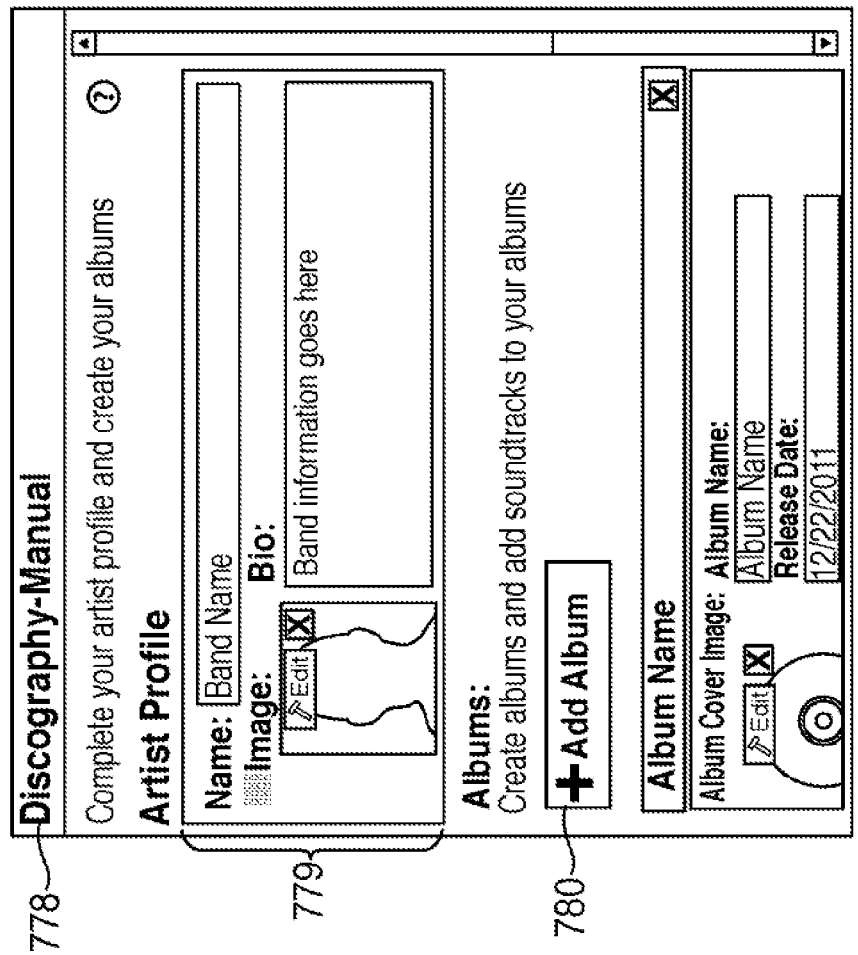
FIG. 38

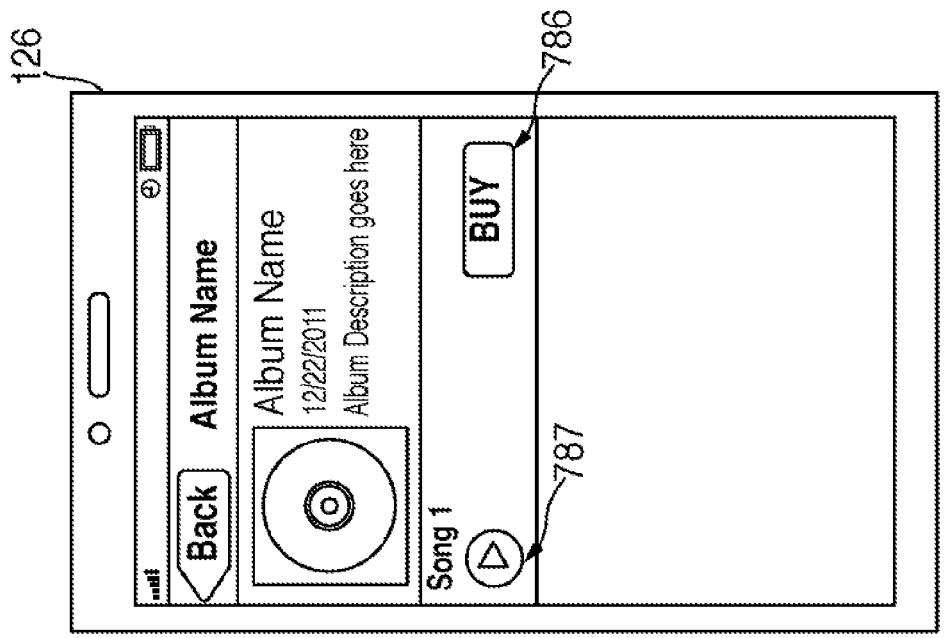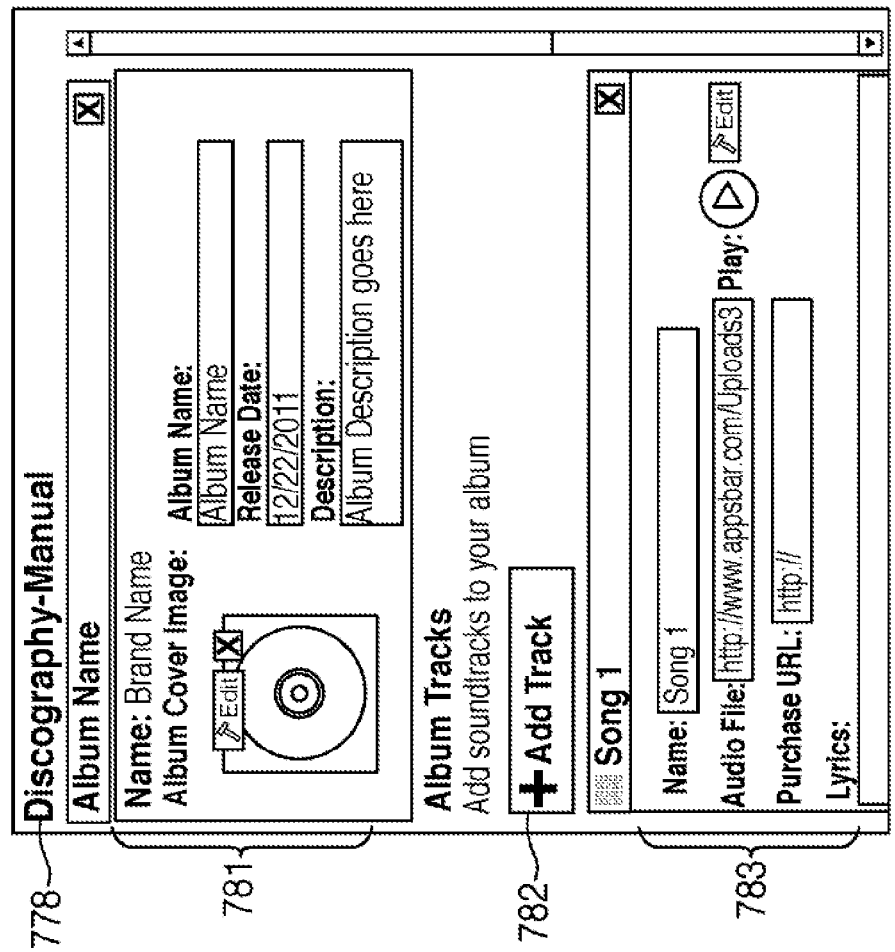
FIG. 39

SYSTEMS AND METHODS FOR A VOICE- AND GESTURE-CONTROLLED MOBILE APPLICATION DEVELOPMENT AND DEPLOYMENT PLATFORM

CROSS-REFERENCE TO RELATED APPLICATIONS

The present application is a continuation-in-part of U.S. patent application Ser. No. 13/396,392, filed on Feb. 14, 2012, which claims benefit to U.S. Provisional Patent Application No. 61/472,609, filed on Apr. 6, 2011, and which is related to U.S. patent application Ser. No. 13/396,368 (now U.S. Pat. No. 8,261,231), filed on Feb. 14, 2012. The contents of the above-identified applications are incorporated by reference in their entirety as if recited in full herein.

FIELD OF THE INVENTION

The present invention generally relates to systems and methods for developing computer software applications. More specifically, certain embodiments are directed to systems and methods for developing, deploying and updating cross-platform mobile device applications through an Internet-based mobile application development and deployment platform that allows non-technical users and developers to build sophisticated, highly-customizable applications through voice and/or gesture interactions.

BACKGROUND OF THE INVENTION

Mobile devices, such as smart-phones, tablet PCs, and other handheld devices have become widespread and important to the daily activities of many consumers and businesses. Traditionally, these type of devices have primarily served as communications devices. Recently, however, consumers are increasingly relying upon these devices as an integral tool in the performance of a wide-range of personal and work-related tasks. In response, mobile phones and other wireless handheld devices have evolved into complex computing devices with equally complex computer hardware and software.

While many of these mobile devices continue to be used for various forms of communication (e.g., voice calls and text messaging) they also generally provide other various functionalities, including accessing and displaying websites, sending and receiving e-mails, taking and displaying photographs and videos, playing music and other forms of audio, etc. These, and numerous other functionalities, are generally performed by software applications either in the form of software components that are built-in to the device's mobile operating system or separate mobile applications (mobile apps) that run on top of the operating system. Recently, the development and use of mobile apps has become prolific and thousands of apps now exist across a wide array of mobile devices.

Numerous competing manufacturers, developers, and other service providers have entered the mobile device space in recent years, offering hardware, software in the form of mobile operating systems, or in some cases a combination of both hardware and software. This, in turn, has resulted in the development of a number of dissimilar and incompatible mobile device platforms and environments. Some of the differences among these devices include their hardware components, operating systems and input and output capabilities. In fact, many of the most widely used mobile devices, such as Blackberrys, iPhones and Android-based devices, use different operating systems (e.g., Symbian, iOS, Android and webOS), many of which have their own programming environments and software development tools.

Typically, developing mobile applications for these different operating systems and devices requires the use of varying design techniques and programming languages, as well as separate operating system or device specific software code and compilations. As a result, it is often challenging for developers to write software applications that are portable across multiple types of mobile devices. Instead, mobile app developers are frequently forced to rewrite all or at least substantial portions of the software in order to support different devices.

In order to encourage and facilitate the development of mobile apps for certain types of mobile operating systems and/or devices, the manufacturers and developers of these systems and devices frequently distribute software development kits (SDKs) that are associated with their devices and/or operating systems (or particular versions or releases thereof). Among other things, these SDKs allow application developers to write programs or applications for users of the supported mobile devices and/or mobile operating systems. While these SDKs assist with the development of mobile apps, in order to utilize these SDKs a significant degree of technical knowledge and expertise in software programming and mobile devices is typically required. In particular, use of these SDKs requires programmers to possess an understanding of and experience with both the programming language and the specific mobile operating system platform for which the application is being developed.

In addition to the challenges associated with building mobile apps, deploying these applications and distributing them to end users can often be a complex and involved process. In part, this is due to the fact that many of the mobile device and operating system manufacturers and developers require that all mobile apps to be used with their devices and operating systems must be distributed through their digital distribution platform (e.g., iOS's App Store, Android's Google Play, webOS's App Catalog). Typically, the apps must also be approved by the manufacturers or developers prior to being included in their distribution platforms. Obtaining such approvals for a mobile applications can be a time-consuming and complex process. As a result, an understanding of, and experience with, the requirements and restrictions imposed by manufacturers is often necessary in order to deploy and distribute applications to mobile device users successfully and efficiently.

Similarly, these manufacturers and developers often require that any additional data associated with the application, such as updates, plug-ins, extensions, and content, also be distributed through their digital distribution platforms. In some cases, certain types of updates are also subject to separate approval by the manufacturers. Thus, these restrictions can further complicate and slow-down the distribution and management of mobile applications.

Given the high level of skill and expertise needed to create, deploy and update mobile applications, many non-technical individuals, as well as individuals lacking experience in a particular programming language or mobile operating system or digital distribution platform, have are not able to develop and/or distribute mobile applications. Although there have been attempts to make mobile application development more accessible to a wider public through software systems that allow persons who do not have significant experience in programming or specific mobile operating system platforms to create mobile applications, these systems have exhibited a number of drawbacks and limitations which have resulted in their failure to be widely adopted by consumers.

For example, one drawback is that many of these software systems allow non-technical users to create applications for only one mobile operating system, such as, for example, iOS, Android, webOS, or Symbian, (or a restricted subset of the operating systems). In light of the number of different mobile operating systems, including a number of which are widely used, the ability to develop an application that can be easily ported across all mobile operating systems (or at least those with meaningful consumer bases) is a crucial in promoting efficient and simplified mobile application development.

Another drawback is that many of these software systems still require substantial technical knowledge and expertise and, therefore, these systems do not simplify the process to the degree necessary to make mobile app development accessible to non-technical users. Some of these systems are not intuitive to use, involve user training and/or require at least a base level of technical knowledge, such as exposure to application programming and design.

A further drawback is that many of these software systems do not allow the user to develop applications using voice or gesture commands and interactions, and therefore, these systems do not incorporate features that can simplify the user's application development experience. Furthermore, many of these systems do not facilitate application development for users who are visually impaired or have limited hand mobility.

Yet another drawback is that many of these software systems place significant limitations on the types of applications that can be built using the system. For example many of these systems only provide users with the ability to create simple, non-flexible applications that prohibit the utilization of the wide-range of features and specific functionalities included within many mobile devices and their respective mobile operating systems, such as a compass, GPS, gyroscope, touch screen, camera, speaker, microphone, Bluetooth, Wi-Fi, USB connectivity, and proximity sensor. As a result, with these types of systems, special programming skills and expertise is needed to use/install additional components, plug-ins, modules, or emulators, in order to create more sophisticated mobile apps that utilize these features and functionalities. Also, some of the resulting applications built using existing systems or development tools are only usable while the user's device is "online." In addition, some of these systems require the user to download updates for the application from a third party, such as the mobile operating system's digital distribution platform, rather that from the application developer directly.

There is, therefore, a need for a system that simplifies and streamlines the development, deployment and update of mobile software applications, thereby making the process accessible to non-technical users through an enhanced, user-friendly experience. There is further a need for a system that allows users to develop applications using voice or gesture interactions. There is also an need for a system that allows users to develop an application that can run on any mobile device operating system. There is further a need for a system that allows users to create sophisticated applications that utilize a customized combination of mobile device and mobile operating system features and functionality. There is still further a need for a system that is web based while also enabling users to access applications developed through the platform off-line. There is still further a need for a system that provides users with updates associated with applications directly without the need to access the mobile operating system's digital distribution platform.

SUMMARY OF THE INVENTION

One aspect of the invention is to provide a mobile application development and deployment platform that allows developers to design, build, distribute and manage mobile software applications. Another aspect of the invention is to provide such a platform that is accessible to non-technical users and operable through an easy-to-use, intuitive user interface that does not require users to possess expertise in computer programming or mobile devices and applications. An additional aspect of the invention is to provide a platform that allows users to develop applications using voice or gesture interactions. A further aspect of the invention is to provide a platform that allows visually-impaired users to develop applications using voice and/or gesture interactions. Yet another aspect of the invention is to provide such a platform that allows for a high degree of customizability and allows users to create sophisticated application through the customization and combination of various components, such as app-types, modules, content elements, and templates that can access features of various mobile devices and mobile operating systems. Yet another aspect of the invention is to provide such a platform that allows users to create, customize, update and deploy other types of applications, such as mobile games and web applications through the development platform.

Another aspect of the invention is to provide a mobile development platform that is accessible through the Internet without the need for users to download or install any separate software, while enabling the applications developed through the platform to be accessible off-line. Yet another aspect of the invention is to provide such a platform that allows users to build a single application (or portions of an application) that can be compiled for use across a wide range of mobile devices and operating systems. Yet another aspect of the invention is to provide such a platform that manages the deployment and distribution through third-party digital distribution platforms of applications developed using the platform. Yet another aspect of the invention is to provide such a platform that allows applications to be assembled and updated on-the-fly through the use of configuration files that may be downloaded by end users and which include a reference to and/or subset of the application that is used to access application data from a remote source. Yet another aspect of the invention is to provide such a platform that provides updates, content and other data associated with the application to users directly, without the need for users to reinstall the application or to download such updates, content or data from a digital distribution platform.

One or more of the above and other aspects may be realized through systems and methods for a mobile application development and deployment platform. In certain embodiments, a mobile development and deployment platform and corresponding arrangements is provided to address concerns facing non-technical users and mobile app developers, such as cross-platform interoperability, user-friendliness, customizability, and versatility. Certain embodiments allow non-technical users and application developers to develop mobile applications through the platform, without the need for technical knowledge and expertise, such as experience with computer programming and mobile devices and operating systems.

In certain embodiments, a computer system and method is provided which grants users access to a mobile application development platform in order to assist users (e.g., visually impaired users) in the development and customization of mobile applications. In certain of these embodiments, the user may be presented (e.g., through audio output) with information associated with customizable components pertaining to the functionality, design and content of a mobile application to be customized by the user. In certain embodiments, selections are received from the user (e.g., through voice commands or gesture input) related to the customizable components presented to the user. Application data representing user-defined functionality, design and content based on the user's selections is associated with the mobile application and stored by the computer system. In certain embodiments, compiled data may be generated for the mobile application based on the application data using build tools for a mobile operating system. A configuration file is generated that includes an identifier for the mobile application. In certain of these embodiments, the configuration file may be adapted for transmission to, and execution on, a mobile device running the mobile operating system. In certain embodiments, the identifier may allow the mobile device to retrieve at least a portion of the compiled application data in response to the mobile application being installed on, or executed by, the mobile device.

In certain embodiments, a computer system and method is provided which grants users access to a mobile application development platform in order to assist users (e.g., visually impaired users or users with limited mobility) in the development and customization of mobile applications. In certain of these embodiments, an application type property is received from the user (e.g., through voice commands or gesture input) indicating an application category for a mobile application to be customized by the user. The application type property may be used to determine the customizable components pertaining to the functionality, design and content of the mobile application based on the application category associated with the mobile application. In certain embodiments, information is sent to the user which causes the customizable components to be presented to the user (e.g., though a touch screen display or audio output). In certain embodiments, selections are received from the user (e.g., through voice commands or gesture input) related to the presented customizable components. Application data is associated with the mobile application based on the user's selections and stored on the physical memory of the computer system. In certain embodiments, the application data may include one or more application components that represent user-defined functionality to be provided by the mobile application, one or more design elements that represent user-defined design characteristics associated with the presentation of the mobile application on mobile devices, and/or one or more content elements that represent user-defined content data to be accessed through the mobile application.

In certain embodiments, a set of target mobile devices may be determined on which the mobile application is to execute. Compiled data may be generated for the mobile application based on the application data using build tools for a mobile operating system associated with the set of target mobile devices. A configuration file may be generated that includes an identifier for the mobile application. In certain embodiments, the configuration file may be adapted for transmission to, and execution on, a mobile device associated with the set of target mobile devices. In certain embodiments, the identifier may allow the mobile device to retrieve at least a portion of the compiled application data from a remote storage location in response to the mobile application being installed on or executed by the mobile device In certain embodiments users may build and compile applications (or portions of such applications) that are capable of running on multiple mobile operating systems and/or mobile devices. In certain of these embodiments the platform allows users to take advantage of the various features and functionality specific to certain types of mobile devices and operating systems by incorporating and combining components that access these features. In certain embodiments the platform allows non-technical users and application developers to develop and deploy other types of applications, such as mobile games and web applications, in a similar manner.

In certain embodiments a mobile development platform is provided in the form of a web based application development environment and service. The web based service may present users with an intuitive, user-friendly, graphical user interface that assists users with, and guides users through, the process of developing and deploying mobile applications. In accordance with certain embodiments, users can design, create, customize and modify mobile apps by specifying the particular features, content, and layout of a desired mobile application. In certain of these embodiments, the user may select, combine and customize various predefined and user-uploaded components, including modules, app-types, themes, templates, settings and content. In certain of these embodiments, the user may select, combine, and customize the components and elements through voice commands and/or touch screen gesture input. In certain embodiments, the user may choose one or more mobile operating system(s) and/or mobile devices for which the application is to be built and on which the application will execute.

In certain embodiments, applications developed through the platform may be compiled using automated build tools associated with the mobile operating systems. In accordance with certain of these embodiments, the compilation may not contain the complete collection of data for the application, but instead may include an identifying reference and/or other basic information, such as a settings or configurations file and/or a subset of the application data. This information can later be used (e.g., when the application is downloaded, launched or executed by a user) to retrieve certain data associated with and/or needed by the application including various components, layouts, features, and content from a remote storage medium. The application may also use this information to check for and/or download any updates or modifications. In certain of these embodiments, the application may automatically check for and/or download such updates each time the application is launched.

In certain embodiments, after an application is compiled, it may be submitted to a digital distribution platform associated with one or more mobile operating systems and/or devices. In certain of these embodiments the digital distribution platform may require the application to go through an approval process prior to allowing the application to be deployed and distributed to end users. In accordance with certain of these embodiments, the mobile development platform may submit the applications to one or more digital distribution platforms for approval and distribution automatically. In certain other embodiments, this process may be performed manually.

In certain embodiments, applications that have been developed through the mobile development platform may be downloaded by end users for installation and/or execution on the user's mobile device. In certain of these embodiments, the application may be downloaded from a digital distribution platform for use on supported mobile devices. In certain other embodiments, the application may be downloaded from the development platform or a third-party application hosting service. In certain embodiments, after the application is downloaded and/or launched, the application may access a remote storage medium to retrieve various data including features, content, and layout for the application, and display that data to the end user. In certain of these embodiments, the application data may be accessed from the mobile development platform directly. In other embodiments, the application data may be accessed through a digital distribution platform or a third-party service. In certain embodiments, the application and/or mobile device may cache certain application data retrieved from the remote storage medium. In certain of these embodiments, the application may determine whether the application should use this cached data or whether it should access the application data from the remote storage medium.

In accordance with certain embodiments, servers hosting the mobile development platform, or other third-party servers or systems, may insert advertisements or other forms of supplementary content into the applications created through the development platform and distributed to end users. The advertisements that are inserted into the applications may be based on various characteristics, such as application type, content, user information (e.g., aggregated demographic data), and/or geographic or temporal information. In certain of these embodiments, the advertisements may be presented to end users in a non-intrusive manner. The advertisements may be presented within or on top of certain content elements included in the applications, and/or may be displayed temporarily or at certain predetermined stages of the application's execution. In certain embodiments, other supplementary notifications, such as information related to the availability of updates to downloaded applications, new applications available from developers who created the downloaded applications, popular applications, and/or highly-rated applications may be sent to end users and/or inserted into applications developed through the platform.

In certain embodiments, the development platform may provide various social networking capabilities by linking developers and users who utilize the mobile development platform to create and distribute mobile applications. In accordance with certain of these embodiments, the social networking capabilities may be built into development platform itself, such as through the web based graphical interface. In certain other embodiments, these capabilities could be provided through a separate service. In certain embodiments, developers may access, connect and interact with other developers and users, such as by finding existing connections on established social media websites. Using such capabilities, developers may collaborate, share information, and exchange customized templates, modules, app types or applications.

BRIEF DESCRIPTION OF THE DRAWINGS

Further features of the invention, its nature and various advantages will be more apparent from the following detailed description of the preferred embodiments, taken in conjunction with the accompanying drawings, in which like reference characters refer to like parts throughout, and in which:

FIG. 10 is a pictorial diagram illustrating a portion of the display of an application development environment including a contacts manager accessed by a developer through the mobile development and distribution platform in accordance with certain embodiments;

FIG. 16 is a pictorial diagram illustrating a portion of the display of an application development environment including an events manager accessed by developers through the mobile development and distribution platform in accordance with certain embodiments;

FIG. 20A is a pictorial diagram illustrating a portion of the display of an app including a forms module developed through the mobile development and distribution platform and executing on a mobile device, in accordance with certain embodiments;

FIG. 22 is a pictorial diagram illustrating a portion of the display of an application development environment including an HTML manager accessed by developers through the mobile development and distribution platform in accordance with certain embodiments;

FIG. 23A is a pictorial diagram illustrating a portion of the display of a mobile app having a links module, developed through the mobile development and distribution platform, according to certain embodiments FIGS. 24 and 25 are pictorial diagrams illustrating a portion of the display of an application development environment including a links manager accessed by developers through the mobile development and distribution platform in accordance with certain embodiments;

FIGS. 27 and 28 are pictorial diagrams illustrating a portion of the display of an application development environment including a photos or videos manager accessed by developers through the mobile development and distribution platform in accordance with certain embodiments;

FIG. 30 is pictorial diagram illustrating a portion of the display of an application development environment including a soundboard manager accessed by developers through the mobile development and distribution platform in accordance with certain embodiments;

FIG. 32 is pictorial diagram illustrating a portion of the display of an application development environment including a stickers manager accessed by developers through the mobile development and distribution platform in accordance with certain embodiments;

FIG. 34A is a pictorial diagram illustrating a portion of the display of a mobile app having a menu module, developed through the mobile development and distribution platform, according to certain embodiments;

FIGS. 34B and 34C are pictorial diagrams illustrating a portion of the display of an application development environment including an eCommerce manager accessed by developers through the mobile development and distribution platform in accordance with certain embodiments;

FIG. 36 is pictorial diagram illustrating a portion of the display of an application development environment including a coupons manager accessed by developers through the mobile development and distribution platform in accordance with certain embodiments;

FIGS. 38 and 39 are pictorial diagrams illustrating a portion of the display of an application development environment including a discography manager accessed by developers through the mobile development and distribution platform in accordance with certain embodiments;

DETAILED DESCRIPTION OF THE INVENTION

As discussed above, non-technical mobile device users and other individuals may have a difficult time relying on existing, non-user-friendly software systems to develop mobile applications ("mobile apps" or "apps") for various types of mobile devices. This is especially true for users who want to develop, release and update mobile apps that utilize certain device-specific features and functionality of multiple mobile device operating systems. To reduce the burden for, and make the development and deployment process accessible to, such users, systems and methods are provided herein that allow users to develop and distribute mobile apps across multiple mobile operating systems without the need for technical knowledge of computer programming and mobile devices.

Certain embodiments pertain to a mobile development and distribution platform and corresponding arrangement that allows non-technical users and application developers to develop mobile apps through the platform that may be built and compiled to run on multiple mobile operating systems and/or mobile devices and utilize the various device and operating system specific features, without the need for programming knowledge or expertise. Certain of these embodiments allow users to highly customize the mobile apps developed through the platform by selecting and combining various predefined components, features, application designs, and content and/or creating new components, such as app-types and modules. Certain embodiments allow users to deploy apps developed through the platform by submitting the compiled applications to digital distribution platforms associated with one or more types of mobile operating systems and/or mobile devices. Certain of these embodiments, allow the compilation to consist of an identifying reference and/or other basic information, rather than the application data itself, which may be used to retrieve application data from a remote source, and build and configure the application when end users download or execute the application. Certain embodiments allow users and developers to modify or update the apps and their content directly through the mobile development platform. The mobile development platform, corresponding arrangements and systems and methods described below address many of the hurdles and restrictions that currently exist with respect to mobile app development and substantially simplify the process by removing the need for technical expertise and experience in order to make the process accessible to non-technical users and minimize the time and effort involved.

Mobile Development and Distribution Platform and Architecture

Figure 1:
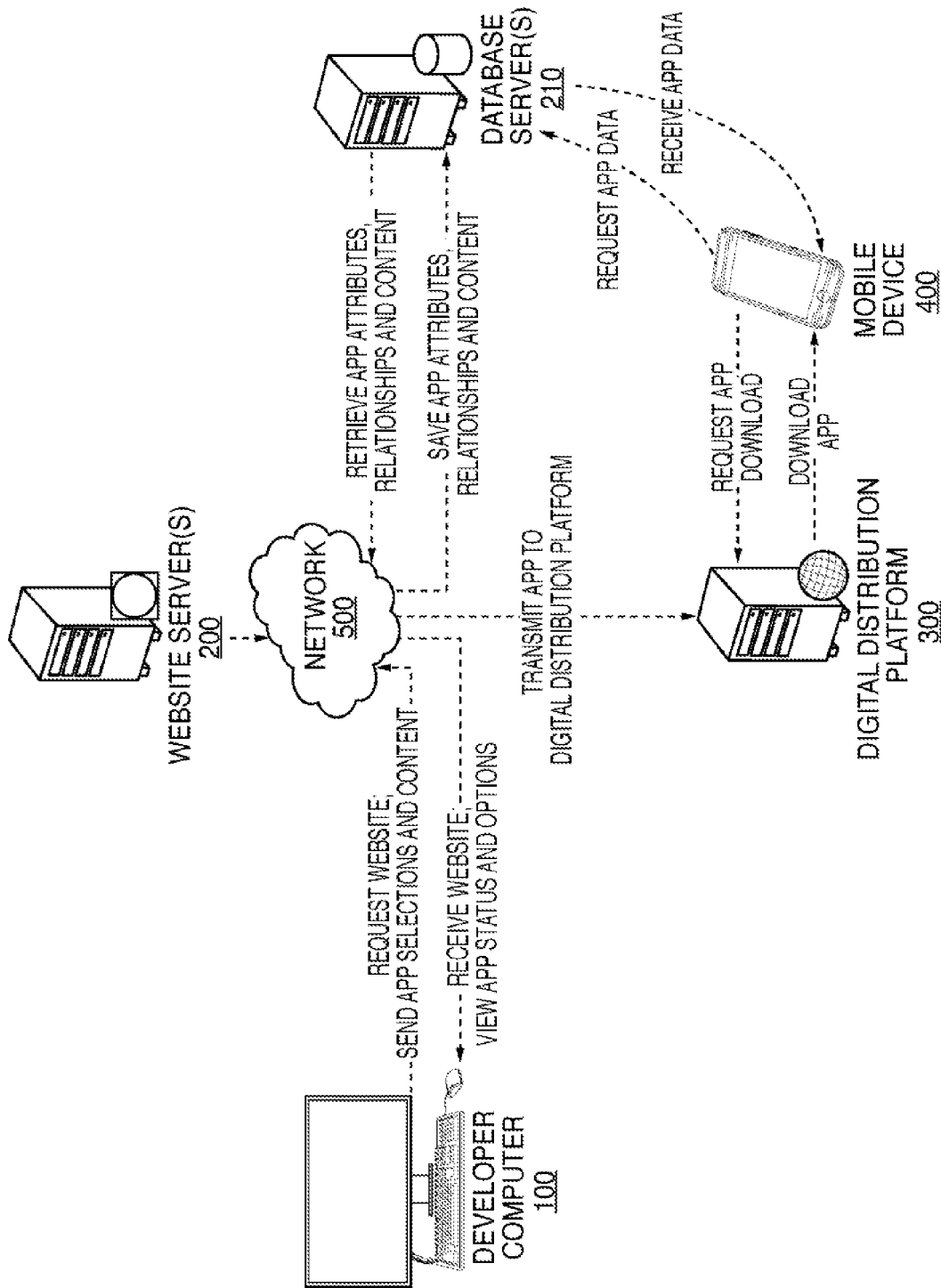
FIG. 1 is a pictorial diagram of a system including a mobile development and distribution platform in accordance with certain embodiments.

FIG. 1 is a pictorial diagram of a system including a mobile development and distribution platform in accordance with certain embodiments. As shown in FIG. 1, this system includes servers, processors, networks, and personal devices which are part of the mobile development and distribution platform. The system of FIG. 1 includes server 200, which may be computer hardware, software, or a combination thereof, including any number of physical or virtual computer servers, or any other suitable computing device or devices. In certain embodiments, server 200 hosts, operates and/or provides access to a mobile development service which can be accessed by various developers, such as non-technical users, application designers or software developers and/or any other types of users who desire to build and/or deploy a mobile app. In certain embodiments, the mobile development service may be in the form of a software development environment running on server 200. In certain other embodiments, the mobile development service may be any suitable form of hardware, software or a combination of hardware and software that allows developers to create, modify and/or deploy mobile apps. In certain of these embodiments, developers may access server computer 200 through developer computer 100, as depicted in FIG. 1. Developer computer 100 may be a personal computer, laptop, tablet PC, mobile device or any other suitable computer hardware and/or software that is capable of communicating with, and/or providing developers with access to, server 200.

In certain embodiments, server 200 and/or the mobile development service may be may be hosted and operated by one or more third-party service providers and/or may be accessed by developers through network 500 using developer computer 100. In certain of these embodiments, network 500 may be any suitable type of wired and/or wireless network, such as an Internet network or dedicated network that allows developers to access to server 200 through developer computer 100. For example, as shown in FIG. 1, server 200 may be in the form a web server that can be accessed by developers through the Internet using developer computer 100. Developers may access the mobile development service by navigating to one or more web pages using a standard web browser on developer computer 100, thereby obviating the need to download and/or install separate software on developer computer 100. In certain other embodiments, the mobile development service may be a separate client or stand-alone software application that can be downloaded by developers from server 200 and/or one or more other third-party servers, or may be provided to developers through any other suitable means (e.g., CD, physical disk, etc.) and installed on developer computer 100. Although server 200 is shown in FIG. 1 for illustrative purposes, it should be understood that in certain embodiments the functionality provided by server 200, such as the mobile development service, may be hosted and operated by any number of servers, or may be integrated with developer computer 100.

In certain embodiments, such as where server 200 is a web server, the mobile development service may be provided in the form of a web based service. In certain of these embodiments, the web based service may provide developers with access to an application development environment that allows the developers to create, modify, and deploy mobile apps. For example, the web based service may be in the form of a graphical interface, such as a website, that presents and allows developers to interact with, various web pages. In certain of these embodiments, developers can design, create and/or modify a mobile app by defining (e.g., selecting, creating, customizing and/or uploading) various application components, such as app-types and modules, design elements, such as layouts, themes and display options, and content elements, such as test, images, videos, sounds, songs, documents, and other similar data for the app. This process is illustrated and described in further detail below in connection with FIG. 2.

As shown in FIG. 1, in certain embodiments, server 200 may also utilize one or more database servers, such as database server 210. In certain embodiments, database server 210 may store various predefined or generic application data, such as templates, modules, layouts, content, etc., that can be retrieved by server 200 and presented to developer during the application development process. In certain of these embodiments, database server 210 may be used by server 200 to store and retrieve mobile applications that are being, or have been, developed by developers through the mobile development service. For example, as a developer creates and/or modifies a mobile app, server 200 may store data associated with the app, such as application components and design elements selected, created or customized, and/or content uploaded, by the developer in database server 210. In accordance with certain of these embodiments, server 200 may then retrieve the stored application data and/or present it to the developer, such as when the developer accesses the mobile development service at a later time.

In certain embodiments, database server 210 may be hosted and operated by a third-party service provider. The third-party service provider may be a separate service provider or may be the same service provider hosting and operating server 200. In certain of these embodiments, as is shown in FIG. 1, server 200 may access, and communicate with, database server 210 through network 500. In certain other embodiments, database server 210 may be integrated with (or directly connected to) server 200. In yet other embodiments, such as where server 200 is hosted and operated by the developer, database server 210 may be integrated with (or directly connected to) developer computer 100.

In accordance with certain embodiments server 200 may communicate with one or more digital distribution platforms, such as digital distribution platform 300, through network 500. Digital distribution platform 300 may be any suitable network service capable of hosting mobile apps and distributing them to end users. In certain of these embodiments, digital distribution platform 300 may be a web based service that is associated with and/or hosted and operated by a manufacturer or developer of a particular mobile operating system (or systems) and/or mobile device (or devices), such as iOS's App Store, Android's Google Play, webOS's App Catalog. In certain other embodiments, digital distribution platform 300 may be hosted and operated by a third-party provider or by developer and/or may be integrated with server 200 or developer computer 100. In certain of these embodiments, as shown in FIG. 1, server 200 may communicate with digital distribution platform 300 through network 500.

For example, during, or after, creating or modifying a mobile app through server 200 and/or the mobile development service, a developer may select one or more target mobile device sets, which include one or more mobile operating systems and/or mobile devices on which the mobile application is intended to operate. For example, target mobile device sets may include a mobile device category, mobile device type or mobile device model. Each mobile device category may be associated with the group of mobile devices that run a particular mobile operating system (e.g., the various versions of Apple's iPhone, iPad and iTouch, which run the iOS mobile operating system). Each mobile device type may be associated with a subset of a mobile device category, based on the type of mobile device (e.g., smart-phone, tablet, etc.). Each mobile device model may be associated with a single mobile device (e.g. Apple's iPhone 4) or all models of a particular mobile device (e.g., Apple's iPhone). In certain embodiments, a default target mobile device set may alternatively, or additionally, be set by the mobile development platform and/or service In certain embodiments, server 200 may compile the app based on the selected mobile device categories and/or mobile device types and/or transfer the compiled app to one or more digital distribution platforms, such as digital distribution platform 300 for distribution to end users. In certain of these embodiments, server 200 may automatically submit apps developed through the mobile development service to digital distribution platform 300. In certain other embodiments, developers may be required to manually submit their apps.

In certain embodiments, such as where digital distribution platform 300 is hosted and operated by a mobile operating system or mobile device manufacturer or developer, it may be required that mobile apps be submitted for approval prior to being accepted and/or distributed through digital distribution platform 300. In certain of these embodiments, the mobile operating system or mobile device manufacturer or developer may require that the mobile apps include a digital signature and/or unique identifier in order to be distributed through digital distribution platform 300 and/or to utilize certain features or functionality specific to the mobile operating systems and/or devices supported by the platform. In accordance with certain of these embodiments, server 200 may create the digital signatures and/or unique identifiers for the apps, such as during compilation of the mobile apps, and/or manage any approval processes or submission procedures required by digital distribution platform 300.

As shown in FIG. 1, in certain embodiments, digital distribution platform 300 may distribute mobile apps to end users for execution on a mobile device, such as mobile device 400. Mobile device 400 may be any suitable type of mobile device capable of running mobile apps, including a smart-phone, tablet, slate, or any other type of device that runs a mobile operating system (e.g., iOS, Android, Symbian, BlackBerry OS, Windows Mobile, Windows Phone). For example, digital distribution platform 300 may host a number of mobile apps, including mobile apps developed through the mobile development service. In certain of these embodiments, end users may access digital distribution platform 300 to browse through and select certain mobile apps that are available for download. The selected mobile apps are then provided to the end user and installed on mobile device 400. In certain of these embodiments, end users may access the selected mobile apps from and download the apps to mobile device 400 directly, such as through a website link, e-mail, text message, cellular data, or any other suitable form of communication between digital distribution platform 300 and mobile device 400. Alternatively, or in addition, end users may access and download the selected apps using a separate device, such as a personal computer, laptop, tablet, etc., and then transfer the downloaded apps to and install the apps on mobile device 400. In accordance with certain other embodiments, end users may download mobile apps directly either from developer computer 100 or server 200.

Mobile apps developed through server 200 and/or the mobile development service may be compiled for use with certain mobile device categories and/or mobile device types as illustrated and described in connection with FIGS. 3-5 below. In certain embodiments, the compilation may not include the entire app but, rather, may contain a subset of the data associated with the app, such as an identifying reference and/or a configuration or initialization file. The compilation may then be made available to end users for download and installation on mobile devices in a similar manner to that described above. For example, an end user may download and/or install a compilation for a selected mobile app to mobile device 400. In accordance with certain of these embodiments, after downloading the compilation, installing the app, and/or executing the app, the mobile app and/or mobile device 400 may retrieve additional application data from a remote storage medium. This additional application data may be used to build, format and/or to present the app and its contents to the end user. For example, as shown in FIG. 1, mobile device 400 may communicate with database server 210 through network 500. In certain of these embodiments, mobile device 400 may access certain application data, such as content, layouts, templates, modules, or other components associated with, and/or needed by, the app. In certain other embodiments, mobile device 400 and/or the mobile app may retrieve the application data from digital distribution platform 300, server 200, developer computer 100 and/or any third-party service provider that hosts and provides the application data. In certain embodiments, when the mobile application is launched it may automatically access database server 210 to retrieve the application data and/o check for and download any updates that have been made to the application and/or its content.

One advantage of the systems and methods described herein, as can be seen from the description above, is the ability for mobile app developers to design, build and deploy sophisticated mobile apps across multiple mobile operating systems and distribution platforms without the need for specialized technical expertise and skill. Another advantage is that mobile applications developed through the described platform can be distributed to end users in a simplified format, which may then access data associated with and/or needed by the applications from remote sources upon execution or installation of the app. In turn, this allows app developers to modify or update the format, features, functionality and content of the app after distribution simply by updating the application data that is stored at the remote source, which automatically provides end users with such updates when the app is launched without having to, reinstall the app or manually connect to, or download any data from, a digital distribution platform or other third party service provider.

Mobile App Development Tool

Figure 2:
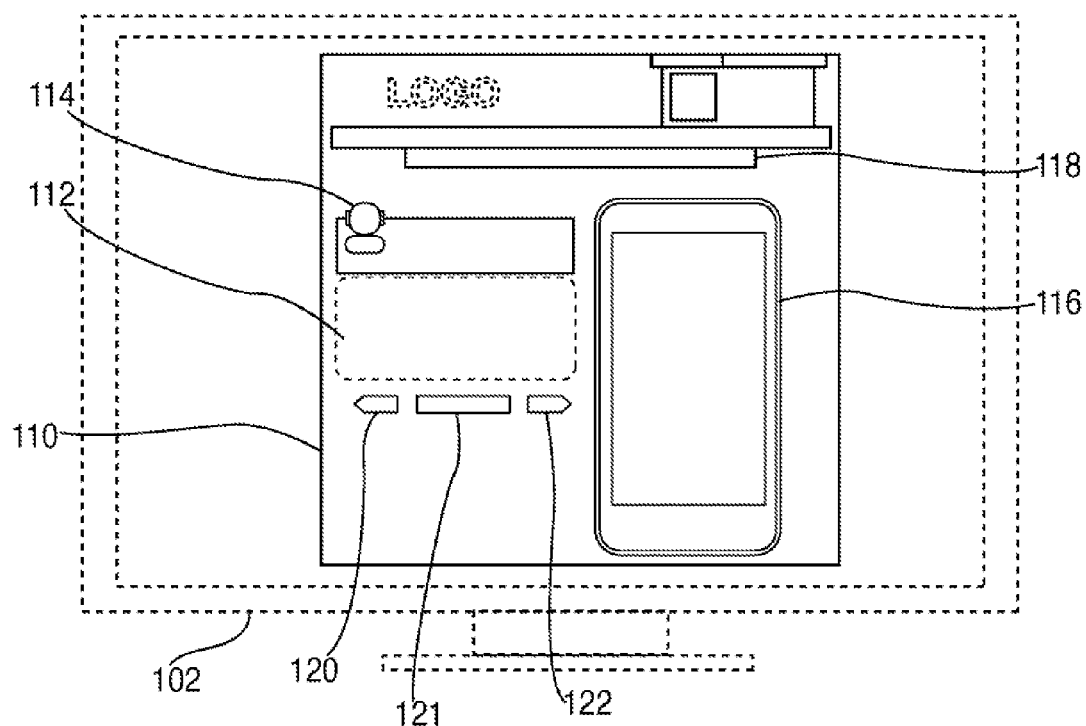
FIG. 2 is a schematic illustrating a portion of an application development environment of a mobile development and distribution platform according to certain embodiments.

FIG. 2 is a schematic illustrating a portion of an application development environment of a mobile development and distribution platform according to certain embodiments. The particular display shown in FIG. 2 is an exemplary illustration of a web tool in the form of a website that may be presented to developers in order to allow them to design and develop mobile apps. In certain of these embodiments, the application development environment may be provided by server 200 and/or the mobile development service and accessed by a developer using developer computer 100 as illustrated and described in connection with FIG. 1. For example, server 200 may host the web pages that are part of the web based tool and transmit them through network 500 to developer computer 100.

As shown in FIG. 2, in certain embodiments, the mobile development environment may be displayed to the developer on a display associated with developer computer 100, such as display screen 102. For example, display screen 102 may present the mobile development environment in a display window, such as development window 110. Development window 110 may be any form of display suitable for presenting the mobile development environment to the developer. In certain embodiments, such as is depicted in FIG. 2, development window 110 is presented in the form of a graphical user interface that allows developers to interact with various visual components in order to build mobile apps, such as by viewing and making certain selections, inputting and uploading data and/or customizing and modifying predefined application data.

According to certain embodiments, such as where the mobile development environment is provided through a web based service, development window 110 may present the developer with a graphical user interface in the form of a number of web pages that the developer can navigate through, and interact with, to create or update mobile apps. In certain other embodiments, such as where the mobile development environment is in the form of a stand-alone software application, development window 110 may display graphical output associated with the software application. In certain embodiments, the mobile development environment may allow developers to combine certain predefined application components, such as app-types and modules, content elements, such as text, images, videos, audio, and/or application design elements, such as themes, layouts, formats, styles, etc., and/or create their own application components, content elements, and design elements, thereby allowing such developers to create mobile apps without having to understand or write software code. For example, developers may be presented with and be able to select and/or modify certain predefined design elements for the mobile app and/or its components, which allow the developers to create, modify and customize the design and presentation of the mobile app and its user interface.

As another example, in certain embodiments, developers may be presented with certain predefined application components, such as app-types and modules that the developer may select, modify and combine in order to customize the app. In certain of these embodiments, each app-type may be associated with a particular category of app, such as restaurant apps, law firm apps, magazine apps, blogging apps, doctor apps, and museum apps. In certain embodiments, the modules may be associated with certain functionality and features that may be included in the app (e.g., contacts, image viewer, map function, email function, messaging function, etc.). In certain of these embodiments, the modules may include features and functionality that is specific to one or more mobile device categories and/or mobile device types (e.g., touch-screen interface, video camera, etc.), along with the corresponding application logic and code that allows such modules to function in a pre-determined manner, such as a menu.

Additional examples of specific app-types and modules that may be used in accordance with the systems and methods discussed herein are described below and/or illustrated in connection with FIGS. 9-42. It should be understood that the particular application design elements and components discussed above (e.g., layouts, themes, app-types and modules) and their corresponding names are merely provided for exemplary purposes and various other types and names of application components and design elements may be utilized.

As shown in FIG. 2, in certain embodiments, development window 110 may include a sub-window, such as component window 112 for displaying one or more application components, design elements, content elements, and/or various settings or options to the developer. For example, when a developer creates a new app, component window may present the developer with a number of available layouts, app-types and/or modules that may be used in the app. In certain embodiments, development window may include one or more selectable icons, input fields, and/or buttons, such as buttons 120-122, which allow the developer to interact with the mobile development environment, such as by selecting, creating and modifying application components, design elements, and settings and/or inputting content and other data.

For example, the developer may browse through certain available application components, content elements, and design elements that are displayed in component window 112 by clicking buttons 120 and 122. When the developer reaches a desired component or element, the developer may add the component or element to the current mobile app by clicking button 121. In certain of these embodiments, component and design elements that have been previously selected or created may be displayed in component window 112 along with various options and settings associated with the displayed component or design element that may be selected and/or modified by the developer. In certain of these embodiments, the developer may remove the previously selected component or element from the mobile app, such as by button 121. It should be understood that the particular user interface and user inputs described herein are exemplary and could be replaced by or combined with any other suitable form of user interface known in the art, such as voice recognition, visual inputs, touch-screens, etc., as described below.

According to certain embodiments, such as is illustrated in FIG. 2, development window 110 may include a graphical representation of one or more mobile devices, such as device representation 116. In certain of these embodiments, the particular mobile device represented may be based on selections previously made by the developer associated with one or more mobile device categories or mobile device types for which the mobile app is being developed. In certain other embodiments the developer may be able to select, update and/or switch between the mobile devices (or categories and/or types thereof) being represented by device representation 116, such as by clicking a button or drop-down menu included in development window 110.

In certain embodiments, device representation 116 may allow the developer to see how certain application components, content elements and/or design elements, such as app-types, modules, layouts, and themes, are presented and/or function on the represented mobile device. In certain of these embodiments, device representation 116 may be updated based on certain selections made, and/or content or data input, by the developer. For example, as the developer selects, creates, or modifies certain application components and design elements, device representation 116 may be updated or refreshed to reflect such selections within the illustrative device screen, thereby enabling the developer to view and understand in real-time how various selections and modifications will impact the display and/or operation of the mobile app on one or more mobile device categories, mobile device types, or particular mobile devices. In certain of these embodiments, device representation 116 may provide a simulation of the current state of the app and allow the developer to interact with, and navigate through, the app, such as by clicking on various portions of the app simulated by device representation 116. In response to the developer selecting a portion of the app through device representation 116, development window 110 may display certain application components, content elements or design elements associated with the selected portion of the app and/or allow the developer to add, modify, upload, and remove various features, options, designs, and content associated with these components and design elements.

As shown in FIG. 2, development window 110 may include an enhanced, user-friendly tool, such as graphical wizard 114, that assists and/or guides developers through the process of designing, creating, and/or modifying mobile apps. In certain embodiments, graphical wizard 114 may assist a developer with the selection, creation, input, combination and/or customization of various application components, design elements, and content elements, such as by recommending various app-types, modules, layouts, themes, settings, and content for the app. For example, graphical wizard 114 may present the developer with certain hints, help text, suggestions, and/or notify the developer of certain required selections or inputs, which may be presented to the developer within development window 110 or through any other suitable form of output, such as audio. In certain of these embodiments, the developer may view such information by clicking, or hovering over, an icon or button within development window 110 that is associated with graphical wizard 114. In certain embodiments, graphical wizard 114 may be presented in the form of, or include, a representative character or icon, such as the robot illustrated in FIG. 2. In certain other embodiments, any other suitable character or graphical depiction of a wizard or guiding tool may be used. In certain embodiments, the developer may be allowed to enable and disable graphical wizard 114.

In certain embodiments, application development window 110 may include a progress indicator, such as progress bar 118 depicted in FIG. 2, which may indicate the developer's progress through the application development process. In certain embodiments, progress bar 118 may indicate one or more steps that have been completed and/or that still need to be completed by the developer to finish the current mobile app. For example the application creation and deployment process may be divided into any number of sub-processes. As a developer moves through the app design and deployment process, progress bar 118 may be updated to reflect the status of each sub-process. The progress bar may also, or alternatively, reflect the quality of the app, which may be updated based on the uniqueness of the app, such as the type and/or amount of customizations selected or content added and uploaded by the developer.

In certain of these embodiments, such as where the mobile development environment is provided in the form of a web based service, the sub-processes may be represented by one or more web pages that allows the developer to step through the process of application development and deployment in a page-by-page or similar manner. In accordance with certain of these embodiments, graphical wizard 114 may guide the developer through one or more of the steps associated with each page or section. In certain other embodiments, the steps and/or sub-processes may be combined into a single group of options and settings for the developer to select as desired, such as within a single web page.

For example, according to certain embodiments, the mobile app creation and deployment process accessed through by the web based service may be divided into four main sub-processes: app properties, app design, app content, and app publishing. After selecting an option to create a new app, a developer may be prompted to complete an app properties sub-process. Through the app properties sub-process, the developer may select, upload, and/or input various high-level settings for the app, such as a name, icon image and/or splash screen image for the app. The developer may then proceed to the app design sub-process, through which the developer may select, upload, and/or input various design and layout options for the app, such as a color scheme, background image, and/or app-type. After selecting and customizing the high-level properties and overall design of the app, the developer may proceed to the app content sub-process, through which the developer may add, modify, combine and customize the functionalities and content of the app, such as by adding and customizing various modules and content elements to be included in the app. Once the developer has completed the creation and design of the app and its content, the developer may then move to the app publishing sub-process. Through this sub-process, the developer may select various publishing properties, such as target mobile device types, app description, app category, copyright settings and/or keywords, and publish the app. In certain of these embodiments, the app publishing sub-process may check whether the app meets certain minimal requirements for publishing and, if not, may indicate any deficiencies to the developer.

In certain embodiments, each of the four sub-processes described above may be presented to, and/or accessed by, the developer through a separate web page or web pages. In certain other embodiments, these sub-processes may be presented in the form of tabs within a single web page, or any other method suitable for use within a web based service. It should be understood that the four sub-processes and their names are described above for the purpose of illustration only, any number of sub-processes could be used in connection with the mobile app creation and deployment platform and/or corresponding web based service.

App Creation Process

Figure 3:
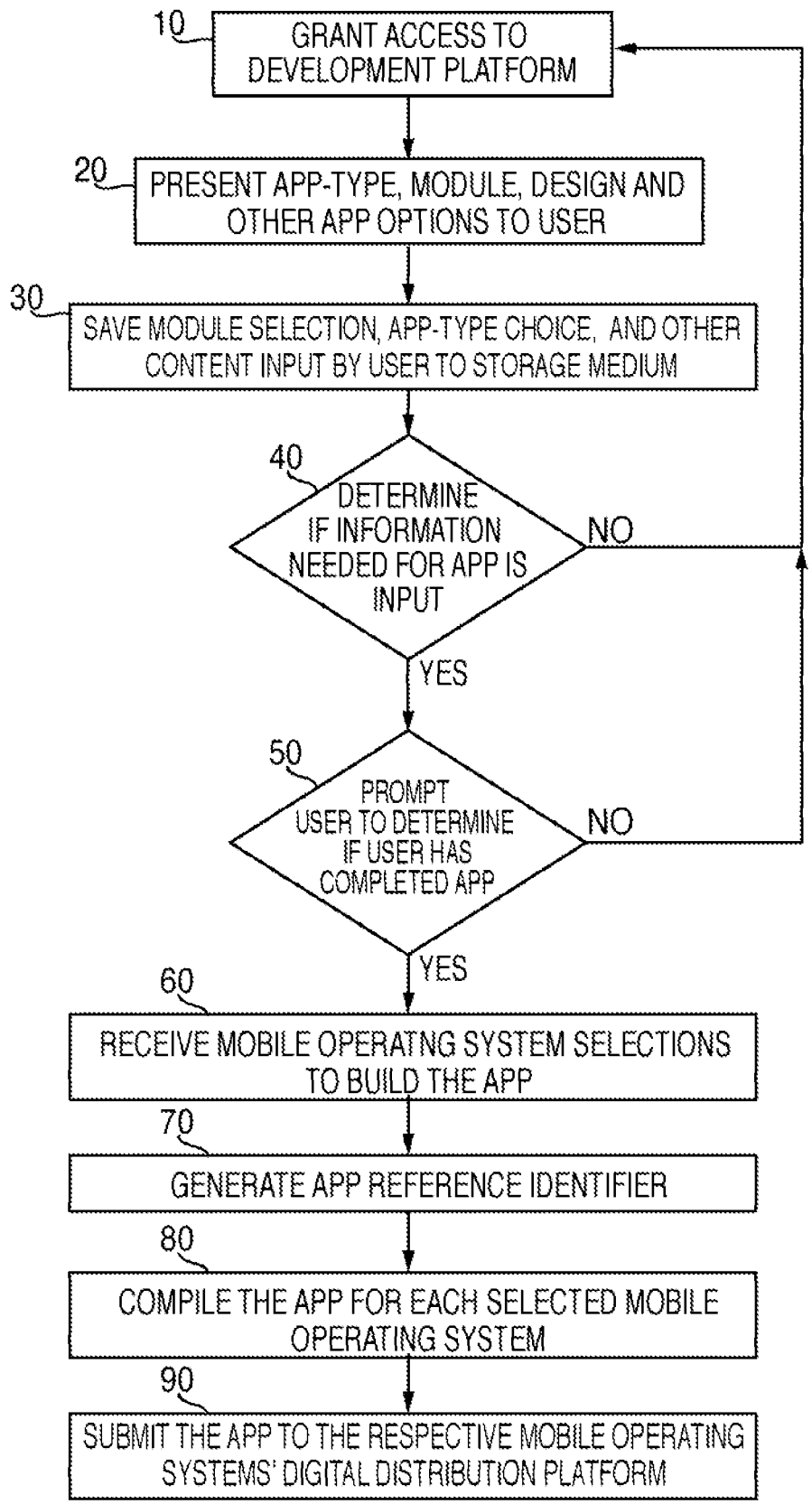
FIG. 3 is a flow diagram of a process for developing mobile applications through the mobile development platform in accordance with certain embodiments.

FIG. 3 is a flow diagram of a process for developing mobile applications through the mobile development platform in accordance with certain embodiments, such as those described in FIGS. 1 and 2. At step 10 a developer accesses a mobile development environment. In certain embodiments, the developer may access the environment by using a browser on the developer's computer to navigate to a website hosted and operated by a web server (such as server 200 illustrated in FIG. 1). The web server and/or mobile development environment may request the that the developer login (e.g., by inputting certain login credentials) in order to access the mobile development environment and/or associated website. In certain embodiments, upon accessing the mobile development environment, the developer may be presented with certain options, such as the option to create a new mobile app and update an existing mobile app. In response to the developer selecting an option to create or update an app, at step 20 the mobile development environment may display options to, and receive selections and input from, the developer related to the app, and components and elements thereof, such as application components, design elements, content elements and settings that may be included in, or selected for, the app.

For example, in certain embodiments, such as where the developer desires to create a new mobile app, the mobile development platform may display a web page displaying certain available, predefined app-types. The mobile development environment may prompt the user to select an app-type for the new app and/or input or select certain basic properties for the app, such as a name, an icon file to be displayed on the mobile device and its location, splash screen images and/or the target mobile device categories or mobile device types. In certain of these embodiments, one or more keywords may be associated with the app, which may be generated automatically based on the developer's selections and input and/or provided by the developer. In certain embodiments, these keywords may be used by the mobile development environment and/or the developer in connection with the distribution of the app to end users, such as to associate the app with one or more predefined app categories included in a digital distribution platform or to allow end users to search for the app using keyword searches.

In certain embodiments, such as after the developer selects an app-type and/or selects or inputs certain basic application properties for a new app or selects an existing app to modify, the mobile development environment may display various predefined application components, such as modules, and/or application design elements, such as themes and layouts, that can be selected, customized and/or included in the mobile app. In certain embodiments, after selecting a particular application component or design element, the developer may be presented with and select, input and modify certain options associated with the selected component or design element, including content elements, settings, features and associated sub-components. For example, after selecting a particular predefined module to include in the app, the mobile development environment may display a web page showing the available layouts for the selected module and/or various module properties or attributes that may be selected or modified. The mobile development environment may prompt the developer to input or upload certain content associated with the application component, such as text, images, videos, etc.

In certain embodiments, in addition to, or instead of, selecting a predefined application component or design element, the developer may be allowed to create or upload custom components or elements for inclusion in the mobile app, such as by creating a template for a custom component in a similar manner to that described in connection with FIG. 4. In certain embodiments, the developer may view, modify and/or remove certain previously selected components, design elements, or content elements provided by the developer. As discussed in connection with FIG. 2, the mobile development environment may display and update a graphical representation of the current state of the application based on the selections and input provided by the developer.

In accordance with certain embodiments, such as where the developer desires to update an existing mobile application, the mobile development environment may display a list of apps that the developer has previously created, such as apps that are in-progress and prompt the developer to select an app to modify or update. The mobile development environment may present the developer with the current state of the selected app and allow the user to add, modify, customize, create and/or remove application components, design elements, content elements and other data in a manner similar to that described above. In certain of these embodiments, the mobile development platform may retrieve the selected app and its data from a storage device, such as a remote database server as discussed in more detail below.

At step 30, the mobile development environment saves certain selections, updates and/or inputs provided by the developer during the application development process. In certain embodiments, the mobile development environment may store this information in an remote application database, local database or any other suitable storage medium. In certain of these embodiments, the mobile development environment may access the database and create and/or update certain entries in the database and its tables and relationships therebetween in a manner similar to that described in connection with FIG. 4. In certain embodiments, the mobile development environment may automatically store the developer's selections, input and other application data after each such selection is made or input provided. In other embodiments, the mobile development environment may store this information after prompting the developer and/or receiving an indication from the developer to save the app. In yet other embodiments, the information may be stored after the developer completes certain steps or portions of application development process as discussed in connection with FIG. 2. In certain embodiments, the mobile development environment may generate and store additional information associated with the app, such a unique identifier and change log.

At step 40, the mobile development environment may determine whether the developer has provided enough information (e.g., selections and input) to complete the app. In certain embodiments, the mobile development environment may make this determination after the developer completes certain steps or sections of the application development process. In certain other embodiments, the mobile development environment may prompt the developer and/or wait until the developer indicates a desire to complete and/or deploy the mobile app. If the mobile development environment determines that the developer has supplied enough information to complete the app, at step 50, the mobile development environment prompts the developer to indicate whether the app is complete and, if so, the process proceeds to step 60. Otherwise, flow returns to step 20, where the developer is able to modify the application, such as by adding, removing and updating application components, elements and content.

After the developer indicates that the mobile application is complete, at step 60 the mobile development platform may prompt the developer to select one or more mobile device categories, mobile device types, and/or particular mobile device models on which the app is intended to run. In certain embodiments, the developer may select the mobile device categories, types and models earlier in the process, such as when entering the application properties. In accordance with certain of these embodiments, the mobile development environment may use the selected mobile device categories, types and models to update the available application components or design elements that may be selected by the developer. In certain other embodiments, the developer may be allowed to select or modify the target mobile device categories, types and models at any time prior to compilation of the app.

At step 70, the mobile development environment creates certain reference data for the application, such as a configuration file or similar data. In certain embodiments, the reference data may contain basic information associated with the app, such as the app's unique identifier. In other embodiments, the reference data may include additional or other information, such as an application's icon file location, an app name, a splash image file location, a security key, a web address to access on the app's launch/execution, or any combination of the same, and/or other information relevant to the app. In yet other embodiments, the reference data may include all of the data needed by, and associated with, the app.

At step 80, the mobile development platform builds and compiles the app for the selected mobile device categories, types and/or models. In certain embodiments, the app may be compiled and built using certain native compilers and/or build tools provided by the manufacturers or developers of the mobile operating systems and mobile devices. For example, the mobile development may use such tools to build a shell or "empty" app for a selected mobile device category, which includes the reference data. As discussed in more detail below, when the app is downloaded, installed, and/or launched on a mobile device, the app may then use the reference data to access and retrieve certain data associated with the app.

After the app is compiled, at step 90, the app may then be submitted to digital distribution platforms for distribution to end users. For example, the compiled app may be submitted to one or more digital distribution platforms associated with the selected mobile device categories, types and/or models (e.g., iOS's App Store, Android's Google Play, webOS's App Catalog). In certain other embodiments, such as where the digital distribution platform is integrated with the mobile development environment or developer's computer, the compiled app may be distributed directly to end users. According to certain embodiments, the developer may be required to submit the compiled app to the digital distribution platforms manually. In certain other embodiments, the mobile development platform may automatically submit the compiled app to the digital distribution platforms, such as after compiling the app. The mobile development platform may also manage certain approval processes and other actions required by the digital distribution platforms.

It should be understood that the order of the steps illustrated in FIG. 3 and described herein are merely exemplary and the order or combination in which various steps, such as selecting application components, inputting application and component properties and storing the application data are performed may be modified or may be performed in any order or combination that is appropriate or desired by the developer or mobile development platform provider.

Thus, as can be seen from FIGS. 1-3 and their accompanying description, the systems and methods described herein allow non-technical users to build cross-platform mobile applications that utilize various features and functions, including features specific to particular mobile operating systems and mobile devices through a user-friendly, software tool. Accordingly, one significant advantage, is that these users can design, build, and deploy highly-customizable and sophisticated mobile apps without the need for technical expertise in computer programming or mobile operating systems and devices.

Mobile App Data Model

Figure 4:
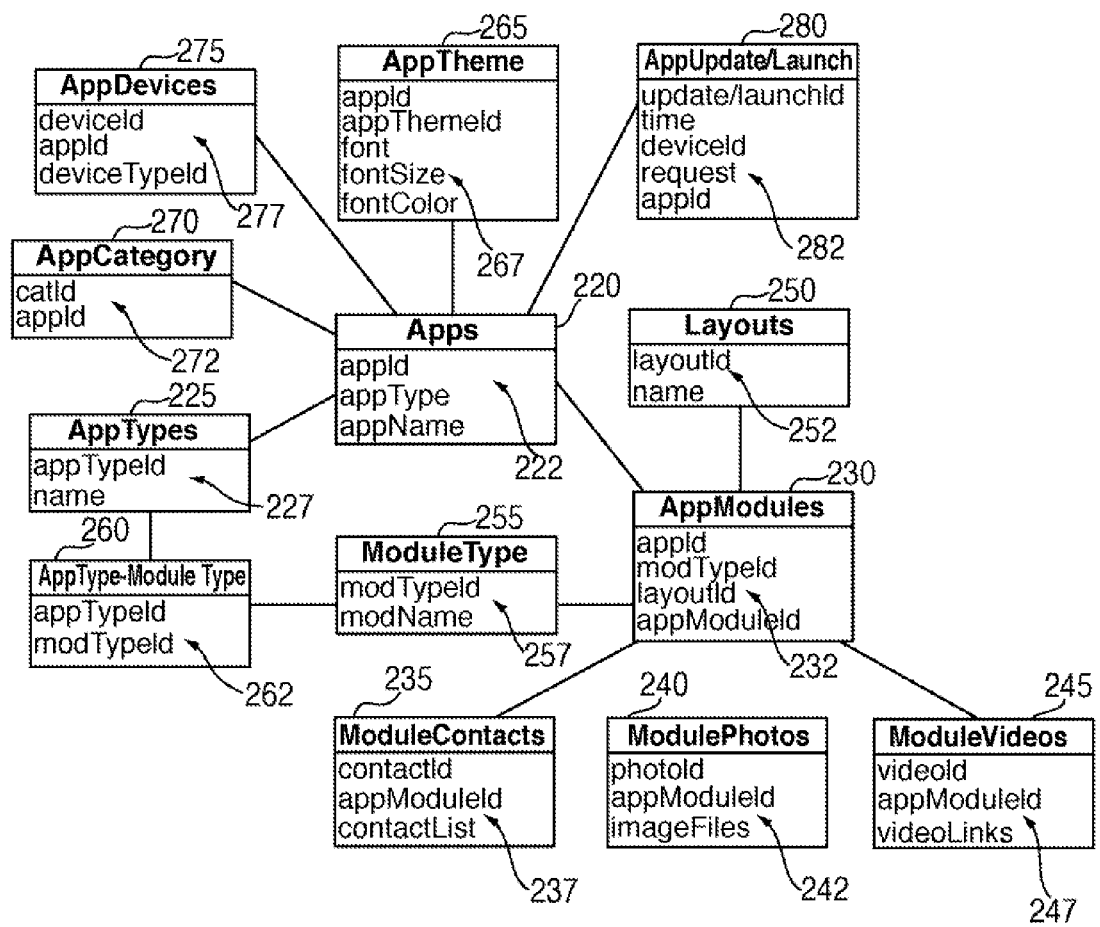
FIG. 4 is a block diagram illustrating an exemplary data model that may be used to store and represent application data for mobile apps developed through the mobile development and distribution platform in accordance with certain embodiments.

FIG. 4 is a block diagram illustrating an exemplary data model that may be used to represent application data for mobile apps developed through the mobile development and distribution platform in accordance with certain embodiments. According to certain embodiments, the application components, design elements, contents, settings, and other data utilized by developers to design, create, modify, and customize mobile apps through the mobile development platform and corresponding systems and methods described and illustrated herein may be organized and stored in a relational and/or hierarchical manner. In certain of these embodiments apps developed through the platform may include and/or be represented by a set of application components, content element, and/or design elements, each of which, in turn, may include, or be associated with, one or more other application components, content elements, and/or design elements and so on. For example, each app may be associated with an app-type, which includes one or more modules, each of which, in turn, contains one or more layouts.

In certain of these embodiments, the application components, design elements, content elements, and other data, as well as their relationships to each other, may be represented and stored in a database, such as relational database. In certain other embodiments, these relationships and the application data may be represented and/or stored in any other suitable format and/or medium, such as in tables, trees, sets of links, or other similar structures. By storing this information in a relational manner, mobile apps developed through the mobile development and distribution platform can be easily stored, retrieved, built, and updated simply by representing each app through a series of relationships between the application's components, elements and other data. Moreover, the architecture described and illustrated in FIG. 4 enables new application components, content elements, and design elements created or customized by developers or other third parties to be added to the mobile development and deployment platform and used by developers in the development of future mobile apps. It should be understood that the particular data model and corresponding tables, attributes and relationships described below and illustrated in FIG. 4 are intended to be exemplary in nature. Accordingly, the data model could be represented and stored in any other suitable format or combination of formats known in the art and/or the tables, attributes and relationships could be replaced by, or combined with, various other tables, attributes, relationships or other similar data.

In certain embodiments, the data model may contain a set of data tables, each of which may represent and store certain information associated with the apps, such as application components, design elements, content elements, and other data related to the apps. As shown in FIG. 4, the data model may include Apps table 220, which in this example represents a mobile app designed and created through the mobile development platform, such as the web based mobile development and deployment service and environment illustrated and described in connection with FIGS. 1-3. Apps table 220 contains various attributes and information associated with each app, such as Apps attributes 222, which may include a unique identifier for the app, an identifier of the app's app-type, and a name for the app. In certain embodiments, each mobile app developed through the mobile development and distribution platform may be represented by an instance of Apps table 220, such as a row entry in a corresponding table stored in a database. In certain of these embodiments, the Apps table 220 serves as the head table for each mobile app, with the app's application data represented by, and stored in various other data tables that branch out from Apps table 220, such as through a number of relationships amongst the tables. Accordingly, each app and its corresponding data can be easily retrieved, such as by looking up the app's unique identifier in Apps table 220.

As shown in FIG. 4, in certain embodiments, the data model may include AppTypes table 225, which represents the type of app associated with each mobile app (e.g., magazine app, blogging app, doctor app, or other app types, such as the exemplary app types listed and described in the sections below). AppTypes table 225 may contain various attributes associated with each app-type, such as AppTypes attributes 227, which include a unique identifier and name for each app-type. In certain of these embodiments, when a developer selects an app-type for a new or existing app, the entry associated with the app in Apps table 220 may be modified to include the unique identifier for the selected app-type. Similarly, the data model may include AppTheme table 265, which represents a theme associated with each app. AppTheme table 265 may contain various attributes and information, such as AppTheme attributes 267, which include the app's unique identifier, a unique identifier for the theme, as well as the font, font size and font color associated with the theme. In certain of these embodiments, each mobile app may be associated with a particular app-type and/or theme and the corresponding identifiers may be stored in Apps table 220, thereby forming a relationship between Apps table 220, AppTypes table 225, and AppTheme table 265. In turn, this allows the app-type, theme and their corresponding attributes and data for each mobile app to be retrieved through the app's unique identifier, such as by using the app-type identifier stored in Apps table 220 and looking up the app's identifier in AppTheme table 265.

According to certain embodiments, the data model may include AppModules table 230, which represents and/or stores the modules included within each app. In certain embodiments, each module may be associated with certain features or functionality that are included within the mobile app. AppModules table 230 may contain various attributes associated with each app and its modules, such as AppModules attributes 232, which includes the app's unique identifier, as well as a unique identifier for the module, an identifier for the module's type and an identifier for the module's layout. In certain embodiments, as shown in FIG. 4, the data model may include ModuleType table 255 comprising ModuleType attributes 257, which may include various attributes associated with each type of module, such as a unique identifier and a name for the module type. In certain of these embodiments, the data model may include a number of predefined module tables that correspond to various type of modules available for use in mobile apps developed through the mobile development and distribution platform (e.g., a contacts module, photos module, videos module, or other types of modules, such as the exemplary modules discussed in connection with FIGS. 9-42) and which include various attributes associated with the particular type of module, such as the options, features, functionality, and content for the module.

Each app developed through the mobile development and distribution platform may include a number of modules (including multiple modules of the same or differing types), each of which may be represented and stored in the tables associated with the particular type of module. For example, as shown in FIG. 4, the data model may include ModuleContacts table 235, ModulePhotos table 240, and ModuleVideos table 245. Each of these module tables may contain various attributes, content and other data that may be associated with each type of module, such as the contactModule identifier and contact list included in ModuleContacts attributes 237, the photoModule identifier and imageFiles reference included in ModulePhotos attributes 242, and the videoModule identifier and videoLinks stored in VideoModule attributes 247. In certain embodiments, each module table includes an appModule identifier, which corresponds to the unique identifier for the particular instance of the module in the app and which may be stored in AppModules table 230.

As discussed in connection with FIGS. 2-3 and 5, each type of module may be associated with certain features and functionality provided to end users through the app. In certain embodiments, the software code or logic associated with the module (or any other application component or design element) may be stored in the database, such as in AppModules table 230, or may be stored in a separate location, in which case a reference to the location of the code may be stored in the table. In certain embodiments, some of the modules may represent features and functions that are common across all or a wide range of mobile device categories and types, such as text messaging, GPS functionality, cameras, etc. Other modules may represent features and functions that are specific to a particular (or only a few) mobile device categories, types or models, such as touch-screen functionality or other specific forms of user inputs, video cameras, compass, gyroscope and other sensors, Bluetooth, etc. As a result, in certain of these embodiments, the module tables may include one or more attributes that indicate whether the module is associated with, or limited to, one or more mobile device categories, types or models. As discussed in more detail below, in certain embodiments, the mobile development environment may use these (as well as other) attributes in determining whether to display a particular type of module to the developer and/or allow the developer to select and include the module in an app, based on the mobile device categories, types or models selected by the developer. Exemplary modules and the features, functionality and content associated therewith are described and illustrated in further detail in connection with FIGS. 9-42.

In certain embodiments, each module may be associated with one or more layouts, which represent the design of the module within the app, such as its location, orientation and format. For example, as shown in FIG. 4, the data model may include Layouts table 250 containing various attributes and information associated with available layouts for a module, such as Layouts attributes 252, which includes a name and unique identifier for each layout, corresponding to the layout identifier included in AppModules table 230. In this regard, each app's modules and their respective attributes, content, layouts, software code, and other data corresponding to the modules can easily be retrieved from the data model by looking up the app's unique identifier in AppModules table 230.

According to certain embodiments, each app-type may be associated with a particular subset of module types that may be selected by developers for mobile apps developed through the mobile development and distribution platform using that app-type. For example, as shown in FIG. 4, the data model may include AppType-ModuleType table 260 comprising AppType-ModuleType attributes 262, which may include various attributes associated with each type of module, such as an app type identifier and a module type identifier. By including the identifiers in AppType-ModuleType table 260 that correspond to the app-type and module type identifiers in AppType table 225 and ModuleType table 255, the types of modules associated with and/or available for use with particular app-types may be determined quickly by querying AppType-ModuleType table 260. For example, in certain embodiments, such as where the developer accesses the mobile development service through a web based service, after selecting an app type for a new mobile app (or modifying an existing app's app type), the service may look up the available modules for the selected app type in AppType-ModuleType table 260 and present them to the developer. Accordingly, in certain embodiments, while a particular type of module may be available for use with a number of different app-types, each app-type has a discreet set of module types that may be used by developers who are developing mobile apps using that app-type. As described in more detail below, in certain embodiments, developers may be given the option to create a new app-type, or customize and existing app-type, for use with mobile apps developed through the mobile development and distribution platform. In accordance with certain of these embodiments, the developer may create or customize these new app-types, in part by selecting and/or modifying the set of module types associated with the newly created app-type.

The data model may include other data tables that comprise attributes and other information associated with each mobile app. As shown in FIG. 4, the data model may include AppCategory table 270, containing AppCategory attributes 272 that includes certain attributes related to an app's category. This information may be based on the category or categories in which the app falls that are used in certain digital distribution platforms. In certain of these embodiments, the developer may be presented with and prompted to select one or more app categories based on the mobile device category, type or model selected for the app. For example, if the developer indicates that the app is intended to operate on mobile devices using the iOS or Android mobile operating systems, the developer may be prompted to select one of the predefined app categories provided by iOS's App Store or Android's Google Play, such as Book, Travel, Business, Home, etc.

As shown in FIG. 4, the data model may include AppDevices table 275, containing AppDevices attributes 277 that stores certain attributes related to the mobile device categories and/or mobile device types with which an app is associated. For example, these attributes may include a developer's selections relating to the type of mobile operating system (e.g., iOS, or Android) or the type of device (e.g., tablet, smart-phone) that the app is intended to operate on. The data model may include AppUpdate/Launch table 280, containing AppUpdate/Launch attributes 282 that stores certain information and data related to the app's status and/or use by end users, as illustrated in FIG. 4. As discussed in more detail in connection with FIG. 5 below, in certain embodiments, this table may be used to keep track of various statistics for an app, such as the number of times it is launched or updated, when each update occurred and/or the particular end user/s associated with each update.

According to certain embodiments, the data model may be used in connection with the mobile development and distribution platform to facilitate the design, creation, and modification of mobile apps by developers, such as through the mobile development environment and/or web based service illustrated and described in connection with FIGS. 1-3. In certain of these embodiments, the data model may be used as the basis for one or more databases that are used to represent, and store certain data associated with, each app developed through the mobile development environment. The databases may be hosted by one or more servers, which, in certain embodiments, may be integrated with the server/s hosting the mobile development environment (e.g., server 200) or one or more separate servers (e.g., database server 210), such as is shown in FIG. 1.

In accordance with certain of these embodiments, the mobile development environment and/or web based service may access the databases to store certain selections made by (as well as data input and/or uploaded by) developers during the mobile app creation and modification process. For example, when a developer creates a new app, the mobile development environment may create a new entry in the database, such as in AppsTable 220. Likewise, in response to the developer selecting and modifying various application components, content elements and/or design elements for the app, the mobile development environment may create new, and update existing, entries in the database and/or form relationships between the database entries.

In certain of these embodiments, the database may be utilized by the mobile development platform and/or environment when a mobile app is compiled and distributed to end users. As discussed in more detail in connection with FIG. 3 above, after a developer has finished creating and/or modifying an app, the mobile development environment may compile the app for one or more mobile device categories and mobile device types and/or distribute the compiled app to end users, such as through a third-party digital distribution platform. In certain of these embodiments, the compiled app may not include all of the data needed by, or associated with, the app. Instead, the compiled app may simply include an unique identifier for the app and/or a configurations file or other basic information for the app. In certain of these embodiments, this information may be compile using, or based on, the database. For example, as part of the compiling process, the database may be queried to retrieve certain attributes and relationships associated with the app, which may be included in a configurations file. After being downloaded, installed, and/or launched by an end user, the compiled app may then use this information to access the application data from the database that corresponds to the app. In certain embodiments, as discussed in more detail in connection with FIG. 5, mobile apps that have already been installed on mobile devices may be updated through a similar process, such as by checking the database for new application data or content each time the app is launched.

The database and/or data model may also, or alternatively, be used to facilitate the design, creation, and modification of mobile apps by developers through the environment in certain embodiments, such as where the mobile development environment is provided in the form of a web based (or software-based) graphical interface. In certain of these embodiments, the mobile development environment may access the database, to retrieve and display various predefined application components, design elements, content elements, and other information associated with the mobile apps to developers. For example, when a developer creates a new app, the mobile development environment may query the database to retrieve the predefined app-types and/or themes currently stored in the database, present these app-types and/or themes to the developer and allow the developer to browse through and select a particular app-type and/or theme for the new app. As another example, after the developer selects a particular app-type for the app, the mobile development environment may then query the database to retrieve and display all of the types of modules that may be included in the app, based on the selected app-type. As yet another example, the mobile development environment may access the database to retrieve and display the available mobile device categories and/or mobile device types that may be selected by the developer.

In certain embodiments, the mobile development platform may provide developers with the ability to create custom templates, or other components, for use with mobile applications developed through the platform. In certain of these embodiments, a developer may begin with a "blank" template and/or be guided through various steps associated with the creation of a custom template for an application component, design element, content element, or other application data, such as by being presented with various options, settings, layouts, themes, content, features, or functionalities that can be included or associated with the custom template. The developer may select from among various predefined sub-components, content elements and design elements and/or create new sub-components, content elements and design elements that can be incorporated within mobile applications designed and developed utilizing the custom template.

For example, after accessing the mobile development environment and creating a new app, instead of, or in addition to being able to select a predefined app-type, the developer may be given the option to create a new, custom app-type for use with the new app. The developer may then select, input, and/or modify certain options, settings and attributes for the custom app-type, such as a name, splash image, icon, and associated modules. Similarly, in selecting the modules to be associated with the custom app-type (or to be included in a new or existing app) the developer may select from among certain predefined modules and/or create one or more custom modules, in which case, the developer may select and input various options for the module, such as a name, type, one or more layouts, functionalities and associated content. As another example, the developer may create a custom theme for the app or custom layout for a module by selecting various design attributes and settings, such as font type, size and color, background, position, orientation, etc.

In certain embodiments, the data model and/or associated database/s may be used by the mobile development platform to facilitate the creation and modification of custom application components, design elements, or other data by developers for use in mobile apps developed through the platform. When a developer selects an option to create a custom template for a component, content element, or design element, the mobile development environment may query the database to retrieve the relevant attributes, settings, content, and sub-components that may be selected, input, and/or combined by the developer to create the customized application component or design element.

In certain of these embodiments, the custom template may be saved by the mobile development platform, such as by storing it in the database and/or associated data model. The custom templates may then be available for use in future apps by the developer and/or by other developers. For example, when a developer creates a custom app-type, the mobile development platform may create a new entry in the database, such as in AppType table 220. This app-type may then be automatically loaded and presented to developers creating new apps through the platform as one of the available pre-defined app-types. In certain embodiments third-party developers or manufacturers may be allowed to create custom components or design elements, such as modules with related module logic for mobile apps, and make these custom modules available to developers and users in the creation of mobile apps through the mobile development and distribution platform.

As can be seen from FIG. 4 and the corresponding description above, there are a number of benefits associated with storing application data and other information associated with the mobile apps in this manner. One such benefit is that it allows apps created and modified through the mobile development platform to be stored and represented in a simplified form, such as entries in a database, without the need to store the corresponding software code, application logic and settings for each app separately. Another such benefit is that new types of application components, design elements, content elements and other settings and application data can easily be added to (and existing ones modified in) the mobile development platform and used by developers, simply by adding and/or modifying the entries in the database and/or corresponding data model. These new or updated components, design elements, content elements and other data can then be automatically presented to, and used by, developers in their mobile apps. Yet another such benefit associated with the data model described above is that it allows developers to create highly-customizable apps by creating and saving custom templates for application components content elements and design elements as well as selecting, modifying, and combining predefined components and design elements. In turn, this provides developers with an extensible and continually evolving development environment by allowing developers to take advantage of new components, content elements design elements and other data created and/or customized by other developers.

App Execution and Update Process

Figure 5:
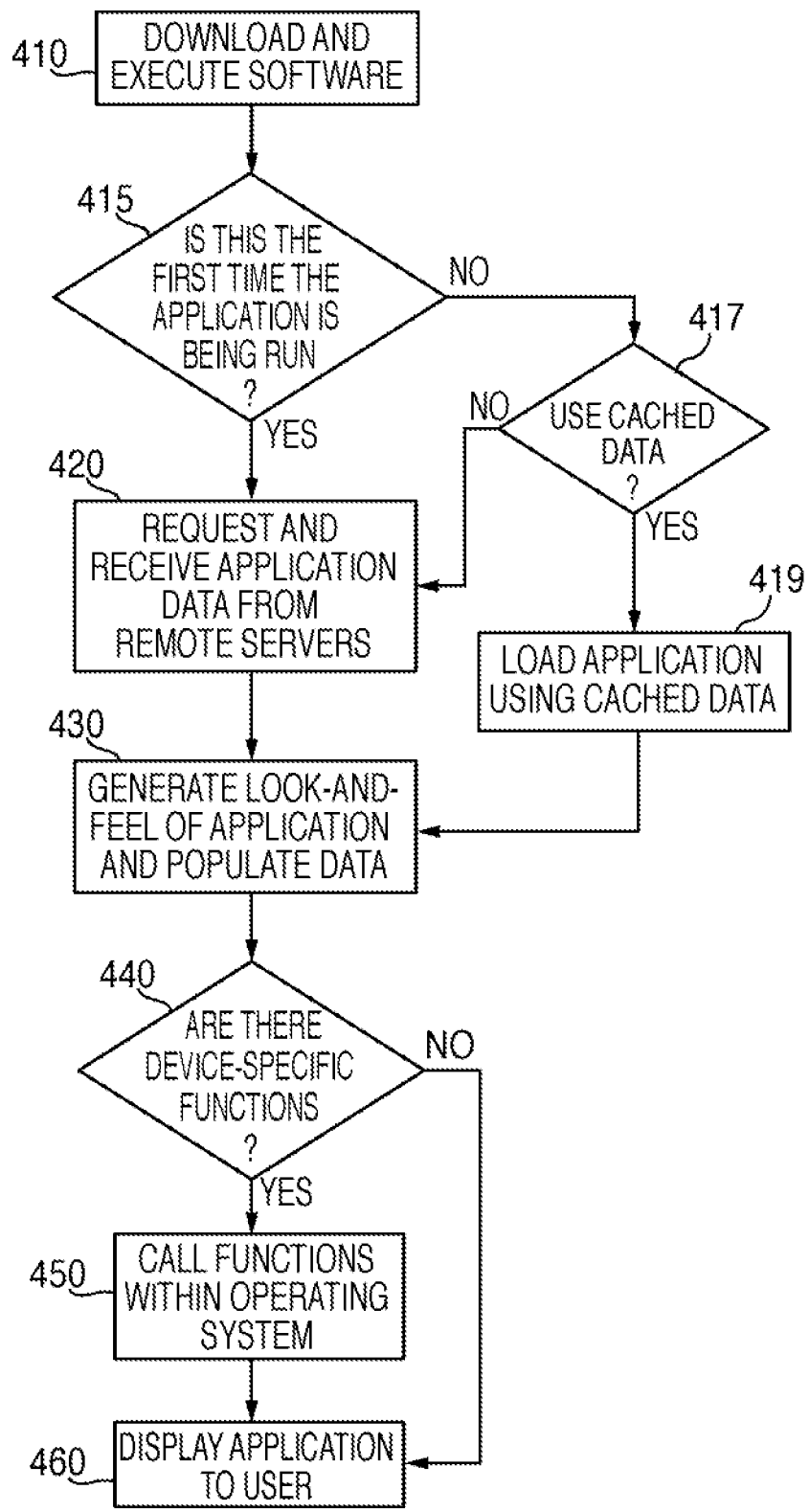
FIG. 5 is a flow diagram of a process that may be used in connection with executing mobile applications developed through the mobile development and distribution platform in accordance with certain embodiments.

FIG. 5 is a flow diagram of a process that may be used in connection with executing mobile applications developed through the mobile development and distribution platform as illustrated and described in connection with FIGS. 1-4 in accordance with certain embodiments. At step 410, an end user may download a mobile app developed through the mobile development platform to the end user's mobile device, such as by downloading the app from a digital distribution platform associated with the mobile device's mobile operating system or by downloading the app directly from a server hosted and operated by developer or one or more servers associated with the mobile development environment. For example, the end user may download the mobile app from digital distribution platform 300 to mobile device 400 through network 500 as illustrated in FIG. 1.

When the end user launches the mobile app, at step 415 the app may determine whether it is the first time that the app is being executed on the mobile device. If so, the process proceeds to step 420, otherwise, at step 417, the app determines whether certain data associated with and/or needed by the application has been stored locally (e.g., cached) on the mobile device. If cached data exists for the app, the app may determine whether the cached data should still be maintained and used by the app. For example, the mobile app may determine whether to continue using the cached application data by querying a server or other computer system hosting the application data to determine whether the cached application data needs to be updated (e.g., whether the application data hosted on the server has been modified since being downloaded and stored at the mobile device).

As another example, the mobile app may determine whether cached application data should be used based on detecting that the app and/or mobile device is unable to access the servers or systems where the application data resides (e.g., the mobile device is off-line or the servers or systems are unavailable). If the mobile app determines that there is no cached application data or that cached application data should be discarded and/or updated, the process proceeds to step 420. Otherwise, at step 419, the mobile app loads the cached application data and proceeds to step 430. One significant advantage associated with the caching of application data is that mobile applications developed through the mobile development platform may still be used even when the mobile device is off-line. In certain embodiments, the mobile app, mobile device, and/or end user may disable the caching of application data, either for a particular app or apps or for all apps running on the mobile device, in which case steps 417 and 419 of the process may be omitted.

At step 420 the mobile app requests and receives certain application data from the servers or systems hosting the data. In certain embodiments the mobile application may request and receive the application data from servers associated with the mobile development platform, such as database server 210 illustrated in FIG. 1. In certain other embodiments, the application data may be requested and received from a digital distribution platform or directly from servers operated by the developer. In yet other embodiments, the mobile app and/or mobile device may retrieve the application data from one or more intermediary servers that interface with both or either of the mobile development platform and/or database server 210 or from other servers hosted and operated by third-party service providers.

In certain embodiments, such as where the mobile app is compiled and downloaded by end users in the form of reference data, such as a configuration file, rather than the complete application data, the mobile app may use the reference data to retrieve the relevant application data. In certain of these embodiments, the mobile app may send an app identifier or other app-identifying information, to the server hosting the application data. The server may use this information to look-up, retrieve and send the corresponding application data to the mobile device. In certain of these embodiments, such as where the app and its data is stored in a database and/or represented by a corresponding data model, the server may use the app identifier to look-up the app in a database table and retrieve the application data by following the relationships or links to other tables that are associated with the app in a manner similar to that described in connection with FIG. 4.

The application data may include any data that is associated with the mobile app and/or needed to execute and display the app and its content on the mobile device. For example, the server may send certain data associated with the application components, design elements, features and content included in or associated with the mobile app, such as app-types, modules, content, layouts, themes, settings, and other information to the mobile device. In certain other embodiments, such as where the entire application is compiled and downloaded and installed on the mobile device, the mobile app may request and receive updates to the application data and/or content in a similar manner to the process described above. In accordance with certain embodiments, such as where the mobile app and/or mobile device is adapted to cache certain application data, after receiving application data from the server, the mobile app may store the application data in the memory of the mobile device.

After receiving the application data (and/or loading the cached application data), at step 430 the mobile app may utilize the application data to build and display the app on the mobile device, such as by incorporating the application components, content elements, design elements, functions, and settings into the application and/or formatting the display and operation of the application. In certain embodiments, the app may preferably display the application data in the same or a substantially similar form as the app was designed and developed by the developer through the mobile development and distribution platform. At step 440, the mobile app and/or mobile device may determine if the application data includes one or more modules or other components that rely on features and/or functionality specific to the type of mobile device or mobile operating system on which the app is executing, such as button appearance or multi-touch gesture functionality. If so, at step 450 the mobile app may call the device-specific features and functions from within the mobile operating system. Otherwise, the process proceeds to step 460 and the mobile app and its content are displayed to the end user.

The systems and methods described herein allow mobile apps to be constructed, formatted, and/or updated on-the-fly when they are downloaded, installed and/or launched on end users' mobile devices. Accordingly, an important benefit is that developers may easily update mobile apps developed through the mobile development platform simply by modifying the version of the application data and related information on the servers or other systems where the application data is hosted and accessed by the mobile apps and/or mobile devices. For example, as discussed above, when an app is launched the app may query the server for the latest application data. Thus, the first time the app is launched after the developer has updated the application data, the app may automatically retrieve and utilize the updated data. In turn, this allows updates to mobile apps to be realized immediately by end users without requiring them to manually download updates and/or connect to a digital distribution platform to received the updated application data. By updating the information stored on the relevant servers, the components, design, functionality, features and content elements of the app running on an end user's mobile device is therefore updated upon execution of the app.

In certain embodiments, such as where the mobile apps developed through the mobile development and distribution platform are represented by a data model and stored in a database, the platform may store certain information associated with the use of the apps by end users and/or the accessing and updating of application data by end users and their mobile devices. For example, as discussed above in connection with FIG. 4, the data model may include one or more tables that store certain data in response to an end user and/or the end user's mobile device accessing the mobile development and distribution platform (and/or its associated database servers) to retrieve or update application data for a mobile app developed through the platform. In certain of these embodiments, this information may include a unique identifier for the mobile device, the mobile app being executed and/or updated, the location of the mobile device, and/or the requested application data. In certain embodiments, this information may be stored by the mobile development and distribution platform each time the mobile app is executed by the end user. In certain other embodiments, this information may be stored when the mobile app and/or mobile device accessed the mobile development and distribution platform, such as to update cached application data and/or retrieve application data or supplementary content, including advertisements.

Supplementary Content

In accordance with certain embodiments certain additional or supplementary content or other data, such as advertisements and notifications, may be included or inserted into the mobile apps developed and deployed through the mobile development and distribution platform. For example, the mobile development and distribution platform may allow advertisements to be inserted into the mobile apps. In certain embodiments, the decision as to whether or not advertisements should be included within a mobile app may be determined solely by the provider and/or operator of the mobile development and distribution platform. In certain of these embodiments, the mobile development platform may automatically insert advertisements in some or all of the apps developed through the platform. Alternatively, or in addition, developers may be given the option to select whether or not to insert advertisements, such as during and/or after development of the mobile app. If a developer chooses to incorporate advertisements or other supplementary content into an app, the developer may be given the option to customize various properties associated with the advertisements, such as the type of advertisements, their placement within the app, how often they are updated, and when they are to be presented to end users running the app.

The advertising network/platform, and the delivery of advertisements and other supplementary content to mobile apps created through the mobile development and distribution platform, may be provided by servers or systems integrated or associated with the servers providing access to the mobile development and distribution platform or by servers hosted by the developer or a third-party advertising provider. In certain of these embodiments, the advertisements or other supplementary content may be included with the application data hosted by a server, such as database server 210 illustrated in FIG. 1. The mobile app may then retrieve the advertisements in a manner similar to the retrieval of application data discussed in connection with FIG. 5 above. In certain other embodiments, advertisements may be retrieved from a separate advertisements server, such as by including a reference to the location of the server in the mobile app. In certain embodiments, the advertisements may be retrieved and integrated into the app upon execution. In certain of these embodiments, the advertisements may be updated, replaced or modified each time the app is launched, during the execution of the app, and/or at certain predefined intervals. In certain embodiments, the app may cache certain advertisements, such as for display to the end user when the mobile device is offline.

The advertisements or other supplementary content that is inserted into the apps may be based on various characteristics associated with the app and/or the end user, such as the application's type, components or content, aggregated demographic data for the end user, selections or input from made by the developer and/or geographic or temporal information. In certain embodiments, the advertisements may be presented to end users in a non-intrusive manner, such as by displaying them within, or on top of, certain content elements included in the apps or allowing end users to minimize or hide the advertisements. Alternatively, or in addition, the advertisements may be displayed temporarily or during certain stages of the app's execution.

As another example, the mobile development and distribution platform may allow developers to send notifications to mobile device users, such as users who have downloaded one or more apps developed and deployed by the developer. In certain embodiments, such as where the mobile development service is provided through a web based service, the developer may be given the option to view a webpage that displays all of the apps that the developer has created (or is in the process of creating) through the mobile development and distribution platform. Accordingly, each developer may have a set of apps that is associated with the developer. In certain of these embodiments, this application set may be stored in a database, such as database server 210, in a manner similar to that described in connection with FIG. 4 above.

In certain embodiments, the mobile development and deployment platform may include a notifications manager that allows developers to create, modify and send notifications to end users and/or that is responsible for managing, retrieving, and displaying such notifications. For example, in certain of these embodiments, the developer may create notifications pertaining to a particular app developed by the developer through the mobile development platform. As another example, the developer may create notifications that pertain to new apps created by the developer. In certain embodiments, the notifications manager, may allow the developer to input, upload, create, and customize certain features, content and options associated with the notifications. For example, the developer may be required to set a date, time, and time zone for each notification, as well as a set of end users to receive the notification. In certain embodiments, notification manager may check whether the selected date is permissible (e.g., in the past). In certain of these embodiments, the notifications may then be automatically delivered to end users who have downloaded and installed one or more mobile apps developed by the developer. Alternatively, or additionally, the developer may be able to select a particular app or end user or a group of apps or end users to receive the notification. In certain of these embodiments the developer may be able to select the type of notification that is sent to end users, such as a push notification, a notification based on the GPS location of the end user's device, or any other suitable type of notification.

Figure 6:
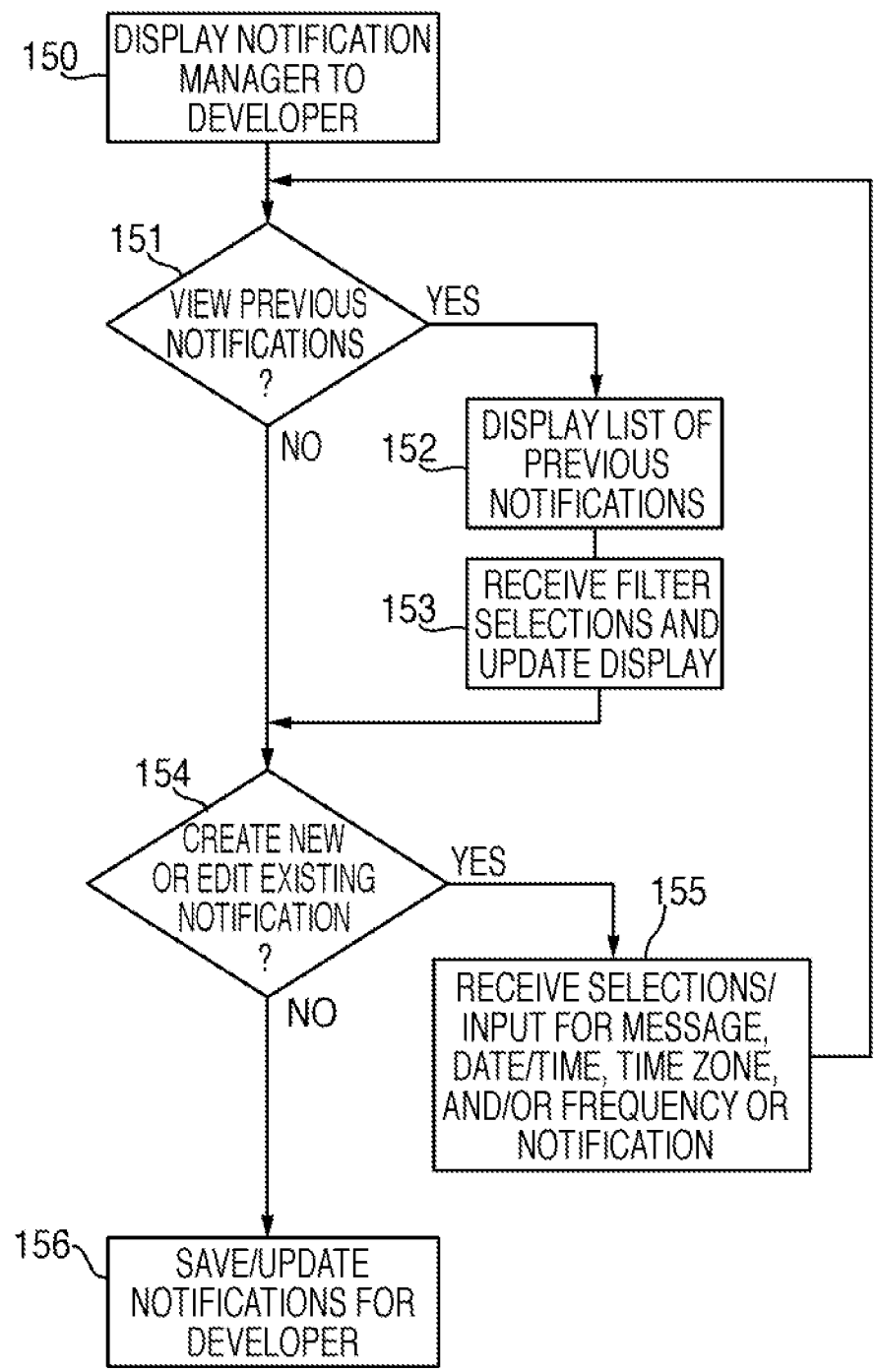
FIG. 6 is a flow diagram of a process for viewing, creating and/or modifying notifications through the mobile development and distribution platform, according to certain embodiments.

FIG. 6 is a flow diagram of a process for viewing, creating and/or modifying notifications through the mobile development and distribution platform, according to certain embodiments. After accessing the mobile development and deployment platform, such as through a web based service and selecting an option to manage notifications, at step 150 a developer may be presented with a notification manager. In certain embodiments, the notification manager may be presented to the developer through one or more web pages in a manner similar to that described in connection with FIGS. 2-3. At step 151, a determination is made as to whether the developer wants to access and view notifications previously created by the developer through the notifications manager. For example, the developer may click a button or link to view the previous notifications. In certain of these embodiments, the notifications created by each developer may be stored by the mobile development and deployment platform, such as in database 200 shown in FIG. 1. If the developer does not want to view previous notifications, flow proceeds to step 154. Otherwise, a list of the developer's previous notifications are displayed at step 152. At step 153, the developer may select and/or input various criteria, such as a date range, app identifier, etc., which are used to filter the previous notifications and update the list displayed to the developer. In accordance with certain embodiments, the developer may select a particular notification from the list, in which case the selected notification is displayed to the developer.

At step 154, a determination is made as to whether the developer wants to create a new notification or edit an existing notification. For example, the developer may click on a button displayed through the notification manager to create a new notification. Likewise, the developer may click on a button associated with the display of a particular previous notification to edit that notification. If the developer chooses to create a new, or edit an existing, notification, at step 155, the developer may select and/or input various options associated with the notification, such as a message, date/time, and time zone for the notification. This process is illustrated and described in more detail below in connection with FIG. 7. After creating and/or updating the notification, at step 156 the developer's selections and inputs are saved, such as by creating or updating an entry in a database.

Figure 7:
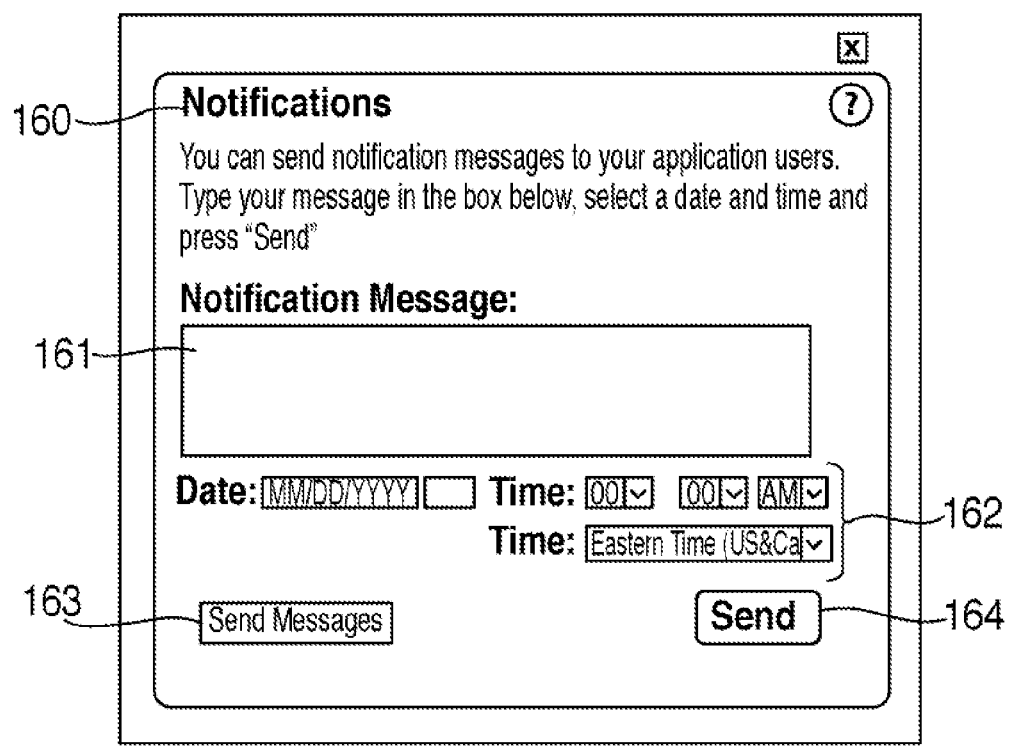
FIG. 7 is a pictorial diagram illustrating a portion of the display of a notifications manager presented to developers through the mobile development and distribution platform, according to certain embodiments.

FIG. 7 is a pictorial diagram illustrating a portion of the display of a notifications manager presented to a developer through the mobile development and distribution platform, according to certain embodiments. In certain of these embodiments, such as where the mobile development and distribution platform is accessed through a web based service, the notifications manager may be displayed to developers within a web page, in a manner similar to that described in connection with in FIG. 2. As shown in FIG. 7, the notifications manager is displayed within notification display window 160, which may include an input form that allows the developer to input and/or select various content and options associated with the notification. Notification display window may include notification message input box 161 through which the developer can enter a text based message associated with the notification. In certain of these embodiments, the developer may be allowed to include additional (or alternate) content within the notification, such as images, video, audio or other forms of content. As shown in FIG. 7, notification display window 160 also includes notification input fields 162 which allow the developer to set the date, time and/or time zone for when the notification should be delivered to end users.

In certain of these embodiments, the developer may be given the option to create a recurring notification, such as a notification that is delivered to end users on a monthly or daily basis. In certain embodiments, notification display window 160 may include various buttons, such as send button 164 which saves and/or sends the notification to end users, and sent messages button 163 which allows the developer to view notifications previously sent by the developer. In certain of these embodiments, when the developer selects a previously created notification as described above, the notification manager may display the selected notification within notification display window 160 and/or pre-populate one or more data fields (e.g., message input box 161, and/or notification input fields 162) using data retrieved from a database that is associated with the selected notification.

Exemplary Application Components

The following provides certain examples of predefined application components that may be offered to developers through the mobile development and distribution platform and incorporated within mobile apps developed through the mobile development environment in accordance with certain embodiments. It should be understood that the particular application components described below and/or illustrated in FIGS. 8-39 are intended to be exemplary in nature, not exhaustive, and various other applications components and elements may be used in connection with the mobile development platform, corresponding arrangements and systems and methods described herein.

AppTypes

In certain embodiments, the mobile development environment may provide one or more of the following predefined app-types for use with apps created through the mobile development environment:

appRestaurant—In certain embodiments, an appRestaurant app-type may provide certain information related to a developer's or third-party's restaurant or food products and/or services. Mobile applications utilizing this template may include various content, such as daily specials, directions, menus, suggested menu items, and reservations. In certain of these embodiments, the mobile application may include these and other types of information for multiple restaurants. The mobile app may allow end users to browse the restaurants and/or filter the restaurants based on various characteristics, such as restaurant type, cuisine, location, or price.

appRealtor—In certain embodiments, an appRealtor app-type may be provided that allows realtors to provide realty agency listings and other related information to end users in real-time. Mobile applications incorporating this template may provide information such as, available properties, directions to properties, asking prices, and descriptions and/or images of the properties, and may allow end users to contact realtors and/or schedule showings through the mobile application. In certain of these embodiments, the mobile application may allow the end user to browse available listings and/or categorize the listings based on various characteristics, such as property type, price, location, features, etc.

appBook—In certain embodiments, an appBook app-type may be provided that allows developers to publish a book or similar publication. In certain of these embodiments, the mobile application may present the book in an easy-to-read format for readers using mobile devices, such as by allowing the developer to modify and customize various options such as the font and style and layout of the pages. In certain embodiments, the mobile application may allow the end user to browse through numerous books and/or select one or more books to purchase and/or download to their mobile devices. The template allows authors and other third-parties to distribute fiction, non-fiction, reference, or other similar works in a digital format to mobile device users.

appMagazine—In certain embodiments, an appMagazine app-type may be provided that allows developers distribute and share an digital version of a magazine, newspaper, pamphlet or other periodical or other similar publication on the mobile market. In certain embodiments, these publications may be presented to users in a manner similar to that of the appBook app-type described above. In certain of these embodiments the app may allow users to subscribe to one or more periodicals and/or automatically download the periodical upon release.

appBlog—In certain embodiments, an appBlog app-type may be provided that allows developers to distribute and share blog content with additional readers. In certain of these embodiments the app may allow end users to upload various content to the blogs, such as pictures, videos and other information. In certain embodiments, the app may automatically notify the end users of updates or additional content added to the blog.

appDoctor—In certain embodiments, an appDoctor app-type may be provided that details and describes the services offered by certain doctor's offices. In certain of these embodiments, the app may include the services provided by smaller doctor's offices to hospitals and/or various information concerning the doctors, such as their specialties and accreditations. In certain embodiments, the app may enable doctors to contact their patients and respond to inquiries from patients in real-time. The app may also assist end users with locating a doctor or hospital and/or scheduling appointments through the app.

appMuseum—In certain embodiments, an appMuseum app-type may be provided that describes the items and exhibits that can be viewed at one or more Museums. The app may advertise different exhibits, such as temporary exhibits and/or provide directions to a specific noteworthy location. In certain embodiments the app may allow end users to take a virtual tour through one or more exhibits and/or may provide and interactive "walk-through" guide for end users who are present at the Museum.

appLawyer—In certain embodiments, an appLawyer app-type may be provided that allows attorneys to provide information about their services, which may include information about their areas of expertise, prior experience, and rates. In certain embodiments, the app may provide end users with the attorney's or law firm's contact information, allow the end user to locate and contact attorneys or law firms, schedule consultations or meetings, and/or ask and received feed-back on various legal questions in real-time with an app.

appAccountant—In certain embodiments, an appAccountant app-type may be provided that allows accountants, accounting firms or similar entities to advertise and describe their services. In certain embodiments, the app may provide some or all of the features and information described in connection with the appLawyer app-type above.

In addition to the app-types described above, other examples of app-types that may be used by developers in connection with creating and designing mobile apps through the mobile distribution and development platform include app-types that correspond to the following organizations, professions, services and/or interests: Businesses, Developer/Construction Companies, Real Estate Agents/Brokers, Contractors, Heating, Ventilation & Air Conditioning (HVAC) Services, Education, Clubs/Associations, Faith-based organizations, Non-profit organizations, Sports clubs/leagues, Beauty & Nail Salons, Chiropractors, Dentists, Veterinarians, Cafés/Bars, Catering Services. Hotels, Travel Agencies, General Manufacturing, Advertising Agencies, Artists/Designers, Hair Salons & Barbershops, Cleaning Services, Consulting Groups, Handymen/Maintenance Services, Insurance Services, Models/Actresses/Actors/Entertainers, Personal Trainers/Fitness Coaches, Pet Care (pet grooming/walking services), Photography Studios, Spa/Beauty Treatments, Talent Management Services, Bakeries/Pastry Shops, Bookstore, Fashion/Clothing stores, Gyms/Fitness Centers/Recreational Sports Centers, Auto/Car Body Repair Shops, Auto/Car Dealerships, Courier Services, Families, Weddings, Cooking/Recipes, Hobbies, Model Making, Photography, Vacations, and/or Pets.

In certain embodiments, the exemplary predefined app-types described above, and/or others, may be selected, modified and combined by developers during the process of designing and creating mobile apps through the mobile development and distribution platform. In certain of these embodiments, the mobile development environment may allow developers to customize numerous aspects of these app-types, such as by selecting, adding, and/or removing various features, functionalities, settings, and/or content associated with the app-types. For example, each app-type may be associated with one or more other components, such as modules, that represent various features and functionalities that can be included in an app that uses the app-type. Specific examples of the types of modules that may be associated with the various app-types are described in more detail below.

As a result, the systems and methods described herein provide non-technical users and developers with a high degree of customizability in connection with the design and development of mobile apps by allowing these developers to utilize, combine and customize various predefined and user-created application components, design elements, features, functions, settings and content to create mobile apps through a user friendly, software tool. Thus, one significant advantage, is that developers and users who lack technical expertise and experience (and other individuals) can nevertheless design, build, and deploy a wide-range of sophisticated mobile apps. Another advantage is that the these developers may take advantage of, and incorporate, various application components, design elements, features and functionalities that have been previously created and/or customized by other developers into their own mobile apps, thereby reducing the time and effort associated with the development of mobile apps.

Modules

As described above, in accordance with certain embodiments, the mobile development platform may provide developers with one or more predefined modules or other application components that are associated with and/or allow developers to incorporate certain features and functionality into mobile apps developed through the platform. In certain of these embodiments, the modules may include features and functionality that are specific to one or more mobile device categories, types or models. The modules may also, or alternatively, be associated with other types of predefined or user-created application components, such as app-types. In certain of these embodiments, the predefined modules presented to the developer and made available for use in mobile apps developed through the platform may be based on certain characteristics of the mobile app and/or selections made by the developer, such as the target mobile device categories, types or models and application components and/or design elements. FIGS. 8-42 and the corresponding descriptions below illustrate and describe certain exemplary predefined modules that may be used with the mobile development and distribution platform and corresponding systems and methods described herein, along with the processes by which such exemplary modules may be selected, customized and/or added to mobile apps by developers, according to certain embodiments.

Figure 8:
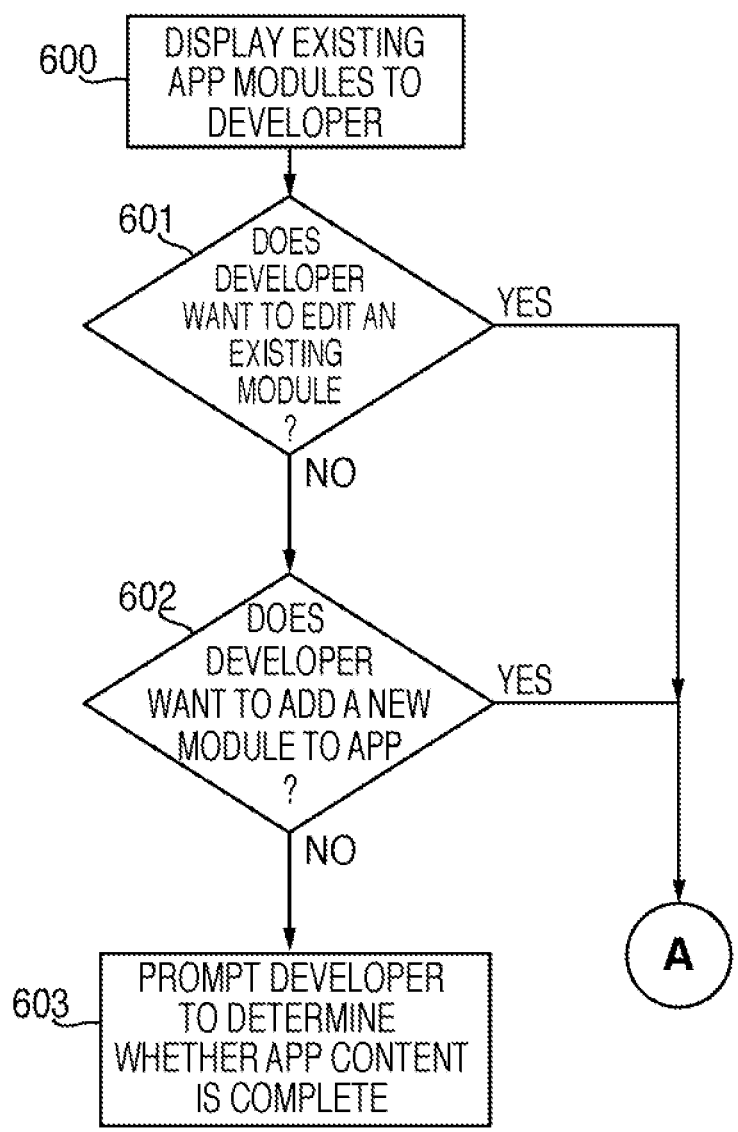
FIG. 8 is a flow diagram illustrating a process that may be used for adding modules to mobile apps through the mobile development and distribution platform, according to certain embodiments.

FIG. 8 is a flow diagram illustrating a process for adding modules to mobile apps through the mobile development and distribution platform, according to certain embodiments. As shown in FIG. 8, at step 600, the existing modules that are included within a particular mobile app are presented to the developer. In certain embodiments, such as where the mobile development and distribution platform is accessed through a web based service, the modules may be displayed to the developer through one or more web pages during the app creation and design process (or when the developer wishes to edit an existing app) as described in connection with FIGS. 2-3 above. At step 601 a determination is made as to whether the developer wants to edit an existing module. For example, the developer may select (e.g., click on) one of the existing modules in the displayed list. If the developer selects an existing module to edit, flow proceeds to step A, wherein the developer is presented with various options and selections based on the selected module as illustrated and described in connection with FIGS. 9-42 below. Otherwise, at step 602, a determination is made as to whether the developer wants to add a new module to the app. If so, the developer is asked to select a new module to add to the app (e.g. by presenting a list of available modules to the developer) and flow proceeds to step A. If the developer does not want to add a new module, at step 603, the developer is prompted to indicate whether he or she is finished adding and updating the app's content.

Figure 9:
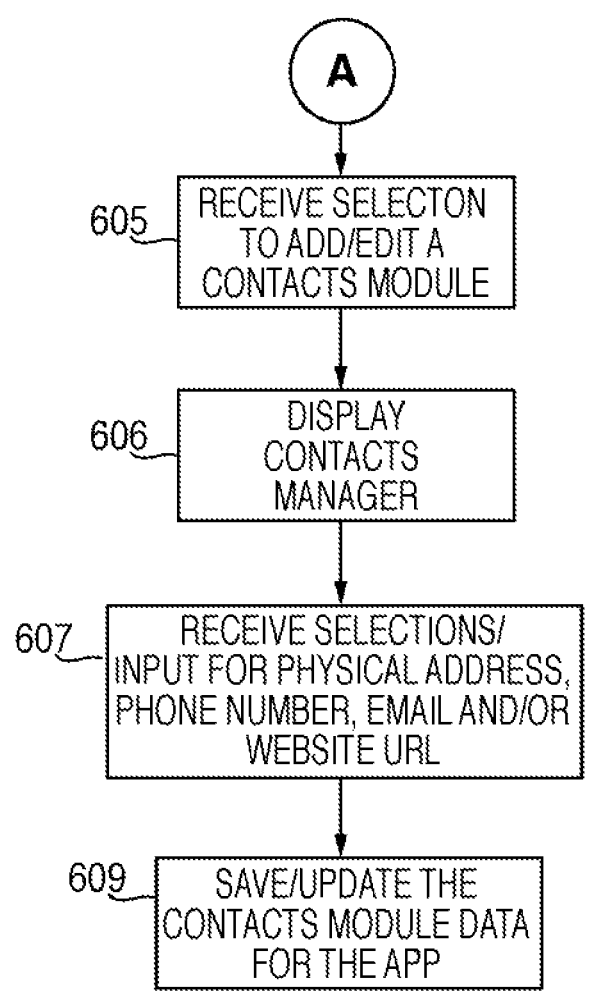
FIG. 9 is a flow diagram illustrating a process for customizing a contacts module for inclusion in a mobile app developed through the mobile development and distribution platform, according to certain embodiments.

FIG. 9 is a flow diagram illustrating a process for customizing a contacts module for inclusion in a mobile app developed through the mobile development and distribution platform, according to certain embodiments. In certain embodiments, developers may include a contacts module in their apps, such as to provide end users with certain contact information associated with the developer and/or other individuals (e.g., third parties for whom the app is being developed). In certain of these embodiments, developers may be required to include a contacts module in each mobile app developed and/or deployed through the mobile development and distribution platform. As shown in FIG. 9, at step 605, the developer may select an option to add a contacts module to an app or edit an existing contacts module. In response, at step 606, the mobile development and deployment platform may activate a contacts manager. The contacts manager is responsible for presenting the developer with various options associated with designing and customizing the contacts module. At step 607, the developer selects and/or inputs various contact information, such as a name, physical address, phone number, e-mail and/or website URL. In certain of these embodiments, the developer may also customize the layout, design and/or features of the contacts module. This information is then saved and/or updated for the mobile app at step 609. For example, in certain embodiments, the developer's selections and inputs may be stored in a database, such as by creating or updating an entry in a modules table in a similar manner to that described in connection with FIG. 4.

FIG. 10 is a pictorial diagram illustrating a portion of the display of an application development environment including a contacts manager accessed by a developer through the mobile development and distribution platform in accordance with certain embodiments. In certain of these embodiments, such as where the mobile development and distribution platform is accessed through a web based service, the contacts manager may be displayed to developers in the form of a graphical user interface using one or more web pages, such as within development window 110 and/or content window 112 illustrated in FIG. 2. As shown in FIG. 10, the application development environment includes contacts manager window 610, which allows the developer to select, input and/or modify various contact information associated with the contacts module. Contacts manager window 610 may include a number of sub-windows, such as address sub-window 611 shown in FIG. 10. The developer may enter physical address information into address form fields 612 included in address sub-window 611, such as street, city, zip, etc. In certain embodiments, address sub-window 611 may include updated button 613 and map representation 614 as shown in FIG. 10, which allow the developer to view the location of the address on a map. In certain embodiments, contacts manager window 610 may include various other sub-windows, such as a phone number sub-window, e-mail address sub-window, and/or website sub-window, which allow the developer to enter additional contact information for the contacts module.

As shown in FIG. 10, in certain embodiments, such as where the application development environment includes device representation 116, device representation 116 may include a representation of the display of contacts module within the display of a mobile device. For example, the contacts module displayed through device representation 116 may include contacts module sub-windows 615-618, which display the address, phone number, email, and website contact information, respectively, based on the information entered by the developer through contacts display window 610. In certain embodiments, contacts module sub-windows may include one or more buttons and/or selectable areas, which allow an end user to interact with the contact information as discussed below.

In accordance with certain of these embodiments, when an end user downloads, installs and/or runs a mobile app having a contacts module developed through the mobile development and deployment platform, the contacts module may be displayed on the end user's mobile device display. For example, the end user may access the contacts module to view certain contact information associated with the app, such as the developer's or a third-party's address, phone number, e-mail address and/or website. In certain embodiments, the contacts module may include a map sub-window, which displays the location of the contact's address. In connection with certain of these embodiments, the map window may rely on a pre-existing map functionality and/or platform that is available through the end user's mobile device and/or the mobile device's operating system, such as Google Maps or Bing Maps.

In certain embodiments, the mobile app and/or contacts module may allow the end user to interact with certain portions of the content displayed through the contacts module. For example, in response to the end user selecting the phone number, such as by tapping on the mobile device display, the contacts module may cause the mobile device to dial the displayed phone number. As another example, in response to the end user selecting the email address, the contacts module may launch a preexisting email application on the mobile device and/or open a new e-mail message with the displayed email address pre-filled in the 'To' field. Similarly, in response to the end user selecting the website, the contacts module may open an in-app web browser or a separate pre-existing browser available on the mobile device and direct the browser to the displayed web address or URL. As yet another example, in response to the end user selecting the physical address or the map, the contacts module may open a preexisting map application with the displayed address pre-filled in the "search" or "to" fields. In certain embodiments, the contact module and/or mobile app may present the end user with an option to add the contact information to a preexisting contacts list or database on the end user's mobile device.

Figure 11:
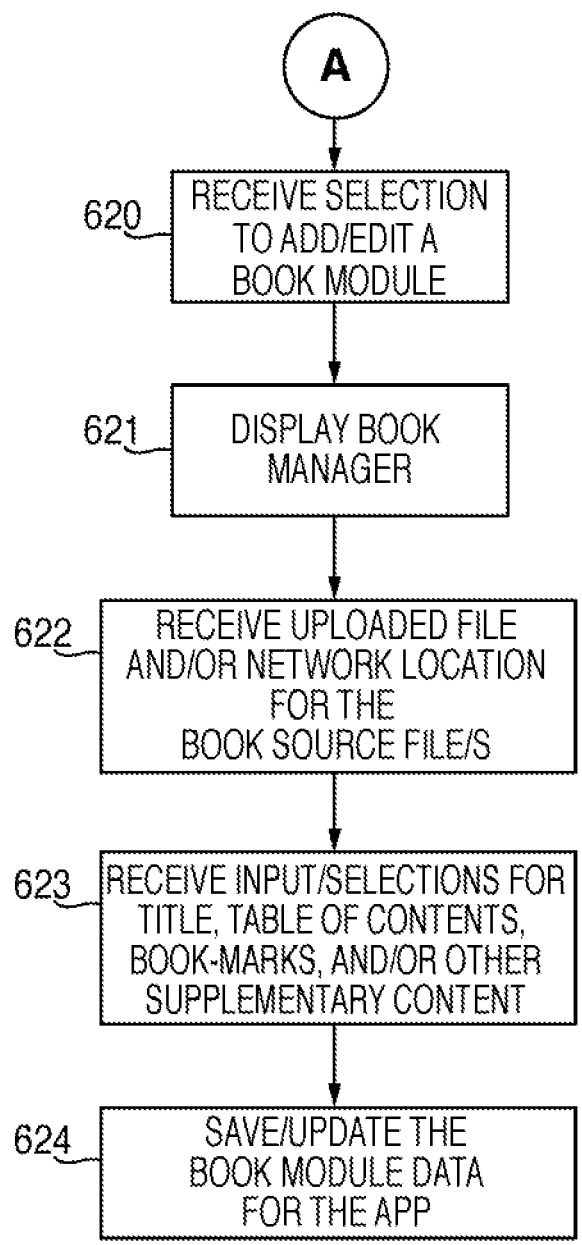
FIG. 11 is a flow diagram illustrating a process for customizing an electronic book module for inclusion in a mobile app developed through the mobile development and distribution platform.

FIG. 11 is a flow diagram illustrating a process for customizing an electronic book module for inclusion in a mobile app developed through the mobile development and distribution platform, according to certain embodiments. In certain embodiments, developers may include an electronic books module in their apps, such as to allow end users to access and view one or more digital books, essays, short stories or other similar literary works. As shown in FIG. 11, at step 620, the developer may select an option to add an electronic book module to an app or edit an existing electronic book module. In response, at step 621, the mobile development and deployment platform may activate an electronic book manager. The electronic book manager is responsible for presenting the developer with various options associated with inputting or uploading one or more digital works and designing and customizing the electronic book module. At step 622, the developer is prompted to select, upload and/or input one or more digital works. For example, the developer may upload one or more source files (e.g., PDF or EPUB files) from a local computer, such as developer computer 100 shown in FIG. 1. Alternatively, or in addition, the developer may specify a network location (e.g., a URL) where the digital work or works are located. In certain of these embodiments, the digital works may then be accessed from a remote source when the app is launched, such as a web server or database server. At step 623, the developer is then prompted to select and/or input various information associated with the digital work, such as a title, table of contents, book-marks and/or other similar information. In certain embodiments, the developer may also customize the layout, design and/or features of the contacts module, such as text-search, fonts, text size, and night-reading capability This information is then saved and/or updated for the mobile app at step 624 in a similar manner to that described in connection with FIG. 9.

Figure 12:
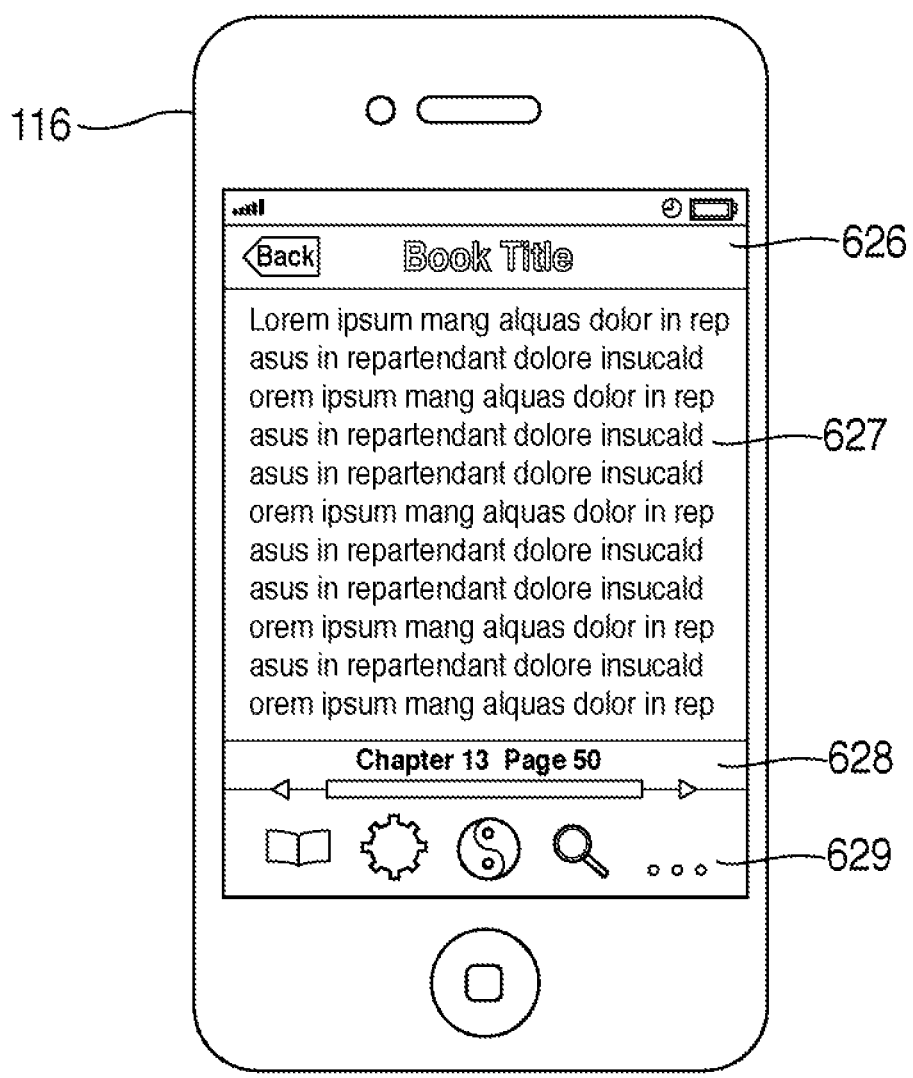
FIG. 12 is a pictorial diagram illustrating a portion of the display of an application development environment including an electronic book manager accessed by a developer through the mobile development and distribution platform in accordance with certain embodiments.

FIG. 12 is a pictorial diagram illustrating a portion of the display of an application development environment including an electronic book manager accessed by a developer through the mobile development and distribution platform in accordance with certain embodiments. In certain of these embodiments, such as where the mobile development and distribution platform is accessed through a web based service, the electronic book manager may be displayed to developers in a similar manner to the display of the contacts manager described above. In accordance with certain of these embodiments, the electronic book manager may include various windows and sub-windows, which allow the developer to select, input, upload and/or modify various information associated with the electronic book module, such as book source files, titles, table of contents, and other related content and features. In certain embodiments, the electronic book manager may be responsible for managing a plurality of available books input and/or uploaded by the developer and displaying the books on a mobile device when an end user downloads and/or launches the app.

As shown in FIG. 12, in certain embodiments, such as where the application development environment includes a representation of a mobile device, device representation 116 may include a representation of the display of the electronic book module within the display of a mobile device. The electronic book module may include book header 626, which displays the title of the book and/or may include one or more buttons, such as a "back" button used to return to the main menu of the app, as depicted in FIG. 12. In certain of these embodiments, such as where the electronic book module includes a number of books, the main menu may allow an end user to search and/or view the available book and select a particular book to read. As shown in FIG. 12, the electronic book module may display the content of one or more books in book text window 627. In certain embodiments, the electronic book module may take advantage of features present in certain mobile devices (e.g., touch screens) to allow end users to scroll through the book content, such as by "flicking" the mobile device display screen. In certain embodiments, the electronic book module may also, or alternatively, include book navigation bar 628 which allows end users to navigate through the book by selecting or pressing one or more buttons. As shown in FIG. 12, book navigation bar 628 may display an indication of the location within the book of the content that is currently being displayed, such as the chapter and page number and/or a visual display of how much of the book has been read, such as a progress bar or percentage.

In certain embodiments, such as is illustrated in FIG. 12, the electronic book module includes book menu bar 629, which may contain various buttons or icons that allow an end user to access additional features, content and/or options associated with the book. For example, book menu bar 629 may include a button that allows the end user to view a table of contents for the book and/or set and view one or more book-marks to quickly navigate to a particular chapter, section, etc. within the book. As another example, book menu bar 629 may include a button that allows the end user to switch between a normal mode and a night reading mode, such as by swapping the background and/or text colors, for easier reading in the dark. As another example, book menu bar 629 may include a button that allows the end user to search for words or phrases in the book using a text search feature. In certain of these embodiments, after performing the search, matching items may be emphasized in the text, such as by highlighting the matching words or phrases. As yet another example, book menu bar 629 may include a button that allows the end user to select or modify the display of the book content, such as the font type, color and size.

Figure 13:
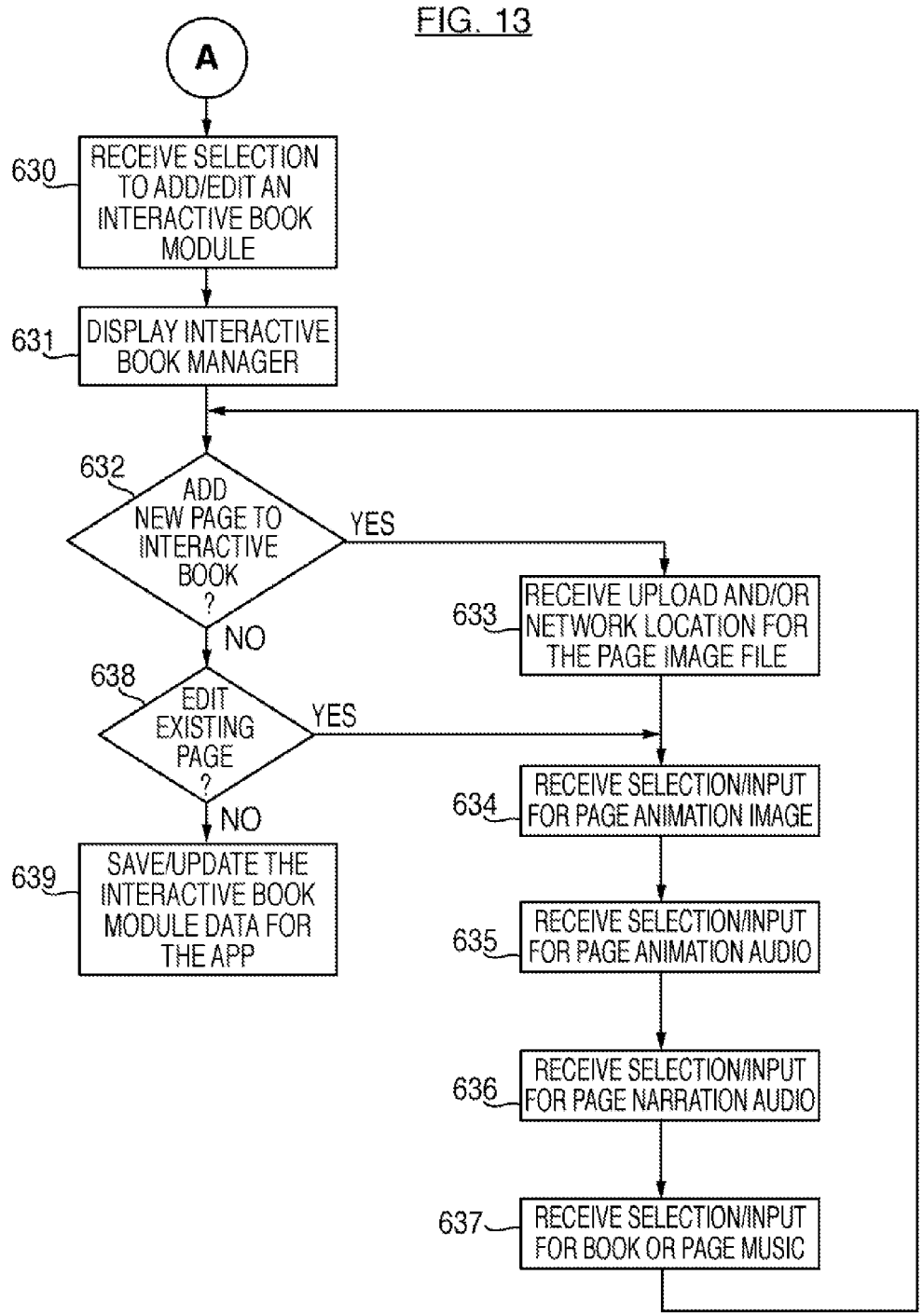
FIG. 13 is a flow diagram illustrating a process for customizing an interactive book module for inclusion in a mobile app developed through the mobile development and distribution platform, according to certain embodiments.

FIG. 13 is a flow diagram illustrating a process for customizing an interactive book module for inclusion in a mobile app developed through the mobile development and distribution platform, according to certain embodiments. In certain embodiments, developers may add an interactive books module to their apps, such as in order to upload (from their computer or from a URL) images, animations, narration audio, and sound files to create an interactive book and provide end users with access to the interactive book. As shown in FIG. 13, at step 630, the developer may select an option to add an interactive book module to an app or edit an existing interactive book module. In response, at step 631, the mobile development and deployment platform may activate an interactive book manager to allow the developer to create and customize an interactive book module. In certain of these embodiments, such as where the mobile development and distribution platform is accessed through a web based service, the interactive book manager may be displayed to developers in a similar manner to the display of the contacts manager described above. In certain embodiments, after accessing the interactive book manager, the developer may be prompted to input and/or select various properties for the interactive book, such as a name, layout, etc.

At step 632, a determination is made as to whether the developer wants to add a new page to the interactive book, such as by the developer clicking an "add page" button. If so, at step 633 the developer is prompted to input or upload a source file for the new page, such as by uploading one or more source files (e.g., PDF, EPUB, or image files) from a local computer and/or specifying a network location (e.g., a URL) where the source files are located, and flow proceeds to step 634. If the developer does not want to add a new page, a determination is made at step 638 as to whether the developer wants to edit an existing page in the interactive book, such as by presenting the developer with, and prompting the developer to select from, a list of the existing pages. If the developer selects an existing page to edit (or is in the process of adding a new page) at step 634 the developer is prompted to select, modify, upload, and/or input one or more animation images to be included in the page. Similarly, at steps 635 and 636, the developer is prompted to select, modify, upload, and/or input one or more animation audio files and narration audio files, respectively, to be included in the page. At step 637 the developer is then prompted to select, modify, upload and/or input a music file. In certain embodiments, the music file may be associated with the interactive book as a whole or with one or more particular pages.

In certain embodiments the interactive book manager may retrieve and display certain pre-defined animation images, animation audio files, narration audio files and/or music files which are displayed to the developer and can be selected by the developer in connection with steps 634-637. After selecting and inputting the various options for the page, flow returns to step 632 and the developer may select an option to add a new page to, and/or edit an existing page in, the interactive book. If the developer has completed the interactive book, at step 639 the developer's selections, inputs, and uploads are saved and/or updated for the mobile app, such as in a similar manner to that described in connection with FIG. 9. In accordance with certain embodiments, the developer may be able to create an interactive book based on an existing digital book or other literary work, such as by selecting, inputting and/or uploading a background image, narration, music or other audio files, and video or animation files and/or inputting or uploading text to modify or customize the digital book in a similar manner to that described above.

Figure 14:
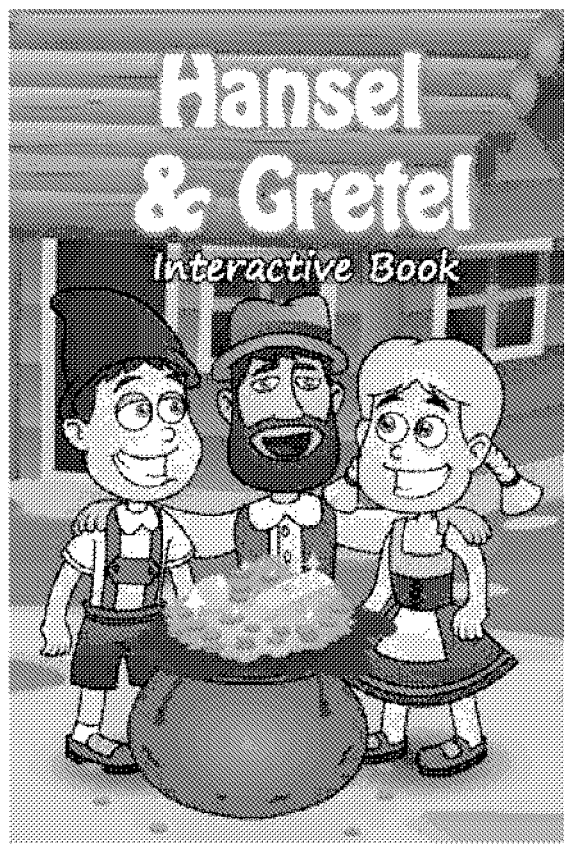
FIG. 14 is a pictorial diagram illustrating a portion of the display of a mobile app having a interactive book module, developed through the mobile development and distribution platform, according to certain embodiments.

FIG. 14 is a pictorial diagram illustrating a portion of the display of a mobile app having a interactive book module, developed through the mobile development and distribution platform, according to certain embodiments. As shown in FIG. 14, the interactive book module may display one or more books as well as other content, attributes and/or input options associated with the interactive books in interactive book display window 640, which may be displayed within a portion or the entirety of the display of a mobile device when the mobile app is executed. In certain embodiments, the end user may navigate through the interactive book using one or more buttons. The end user may be allowed to select or modify certain options, such as muting the background music. In certain embodiments, the interactive book may include certain hotspots that, when selected by an end user, such as by touching the appropriate portion of the display screen, present additional content (e.g., animations, narrations or sounds) to the end user.

Figure 15:
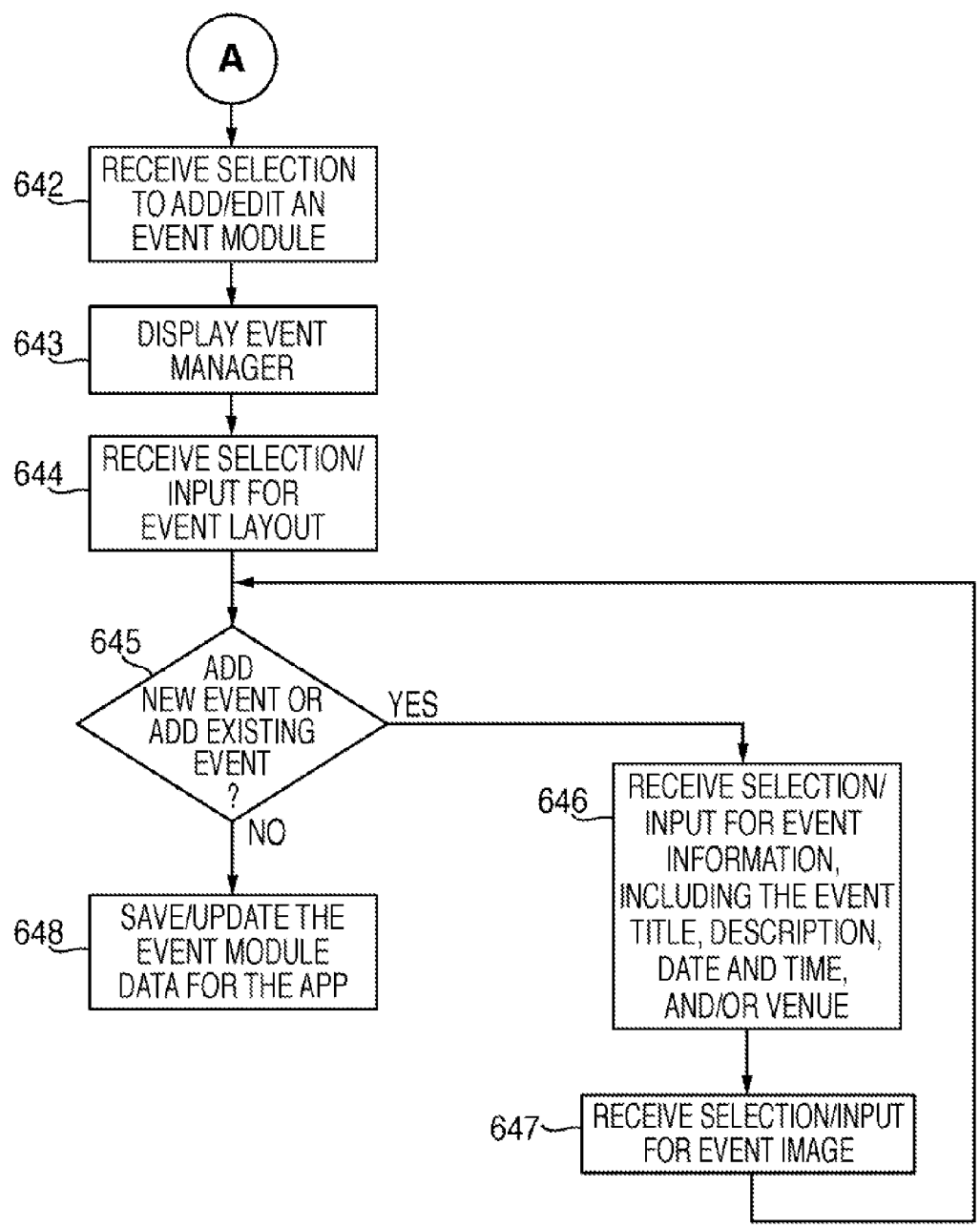
FIG. 15 is a flow diagram illustrating a process for customizing an events module for inclusion in a mobile app developed through the mobile development and distribution platform, according to certain embodiments.

FIG. 15 is a flow diagram illustrating a process for customizing an events module for inclusion in a mobile app developed through the mobile development and distribution platform, according to certain embodiments. In certain embodiments, developers may add an events module to their apps, such as in order to create and modify a menu-based list of events and to add, customize, select and/or modify certain features, content and options associated with the events. As shown in FIG. 15, at step 642, the developer may select an option to add an events module to an app or edit an existing events module. In response, at step 643, the mobile development and deployment platform may activate an events manager to allow the developer to create and customize an events module for the app.

At step 644, the developer is prompted to select and/or input various display options associated with the events, such as the layout of the events, the order in which to display the events and categories in which to group certain events. At step 645 a determination is made as to whether the developer wants to add a new event to the events list or edit an existing event. If so, at step 646 the developer is prompted to select and/or input various information for the event, such as a name, description, date and time, and/or location for each event. Similarly, at step 647, the developer is prompted to provide an image file for the event, such as by uploading a file from a local computer or specifying a network location (e.g., a URL) where the file is located. In certain embodiments the events manager may retrieve and display certain pre-defined images, which may be selected by the developer for use with the event. After creating, updating, and/or customizing the event, flow returns to step 645 and the developer can select an option to add a new, or edit an existing, event. If the developer does not want to add or edit an event, at step 648 the developer's selections, inputs, and uploads are saved and/or updated for the mobile app, such as in a similar manner to that described in connection with FIG. 9.

FIG. 16 is a pictorial diagram illustrating a portion of the display of an application development environment including an events manager accessed by developers through the mobile development and distribution platform in accordance with certain embodiments. In certain of these embodiments, such as where the mobile development and distribution platform is accessed through a web based service, the events manager may be displayed in a manner similar to the display of the contacts manager described above. As shown in FIG. 16, the application development environment includes events manager window 649, which allows the developer to create and customize a list of events. Events manager window may include one or more buttons, such as add event button 650, which allows the developer to create a new event. Events manager window 649 also includes event form fields 652, which allow the developer to input and/or select various information for the event such as a name, date, location, etc., as well as event image selector 651, which allows the developer to select, input and/or upload an image for the event.

As shown in FIG. 16, in certain embodiments, such as where the application development environment includes a representation of the app on a mobile device, device representation 116 may include a representation of the display of the events module within the display of the mobile device. For example, the contacts module displayed through device representation 116 may include various sub-windows, such as event sub-window 653, which display certain information for each event, based on the event information entered by the developer through events display window 649. In certain embodiments, an end user may be able to select a particular event, such as by clicking or touching event sub-window 653, to view additional information associated with the selected event. As shown in FIG. 16, in certain embodiments, event sub-window 653 may include reminder button 654 that allows an end user to add a reminder for the event, such as by adding the event to a calendar (e.g., a preexisting calendar function) on the end user's mobile device. In certain of these embodiments, the event module may rely on a preexisting calendar or reminder functionality or feature that is available through the user's mobile device and/or the mobile device's operating system.

Figure 17:
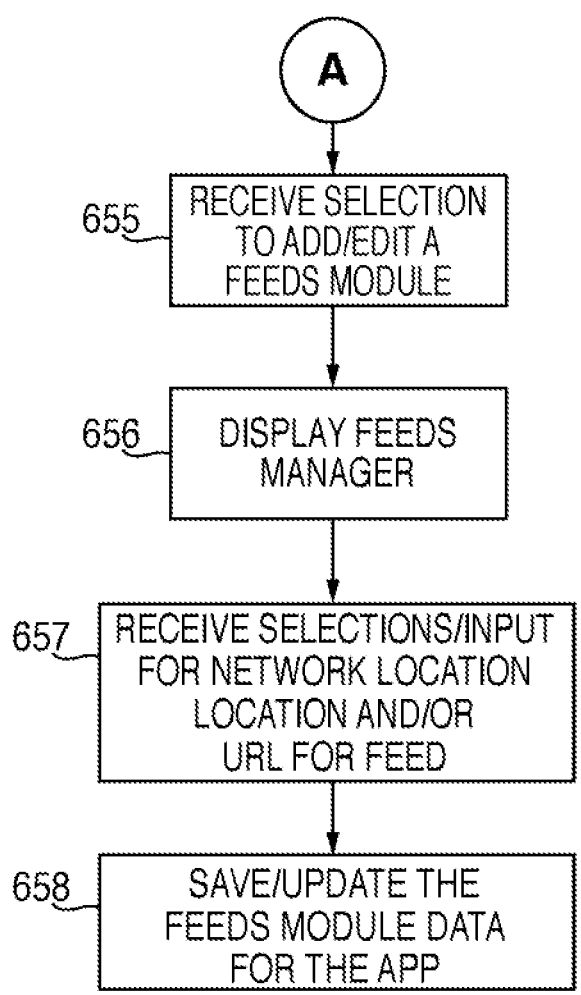
FIG. 17 is a flow diagram illustrating a process for customizing a feeds module for inclusion in a mobile app developed through the mobile development and distribution platform, according to certain embodiments.

FIG. 17 is a flow diagram illustrating a process for customizing a feeds module for inclusion in a mobile app developed through the mobile development and distribution platform, according to certain embodiments. In certain embodiments, developers may include a feeds module in an app, such as in order to add, format, and/or provide end users with access to, various electronic feeds, including Facebook, Twitter and RSS feeds through the app. As shown in FIG. 17, at step 655, the developer may select an option to add a feeds module to an app or edit an existing feeds module. In response, at step 656, the mobile development and deployment platform may activate a feeds manager to allow the developer create and customize the feeds module. The feeds manager is responsible for presenting the developer with various options associated with selecting, specifying, and or formatting the feeds to be included in the feeds module. In certain embodiments, the developer may be prompted to select various design options for the feeds module, such as display order, layout, format, etc. For example, in certain of these embodiments, the developer may choose to have the feeds displayed in a list-based layout, with the most recent items presented at the top of the list.

At step 657, the developer is prompted to add and/or update one or more feeds, such as by inputting one or more network locations (e.g., URLs) where the feeds can be accessed. Alternatively, or in addition, the feeds manager may display a list of commonly accessed or popular feeds that the developer may select to be included in the feeds module. In certain embodiments, these feeds may then be accessed by the feeds module and/or app and displayed to end users, such as when the app is launched by an end user, and/or during execution of the app. At step 658, developer's inputs and selections for the feeds module are then saved and/or updated for the mobile app in a similar manner to that described in connection with FIG. 9.

Figure 18:
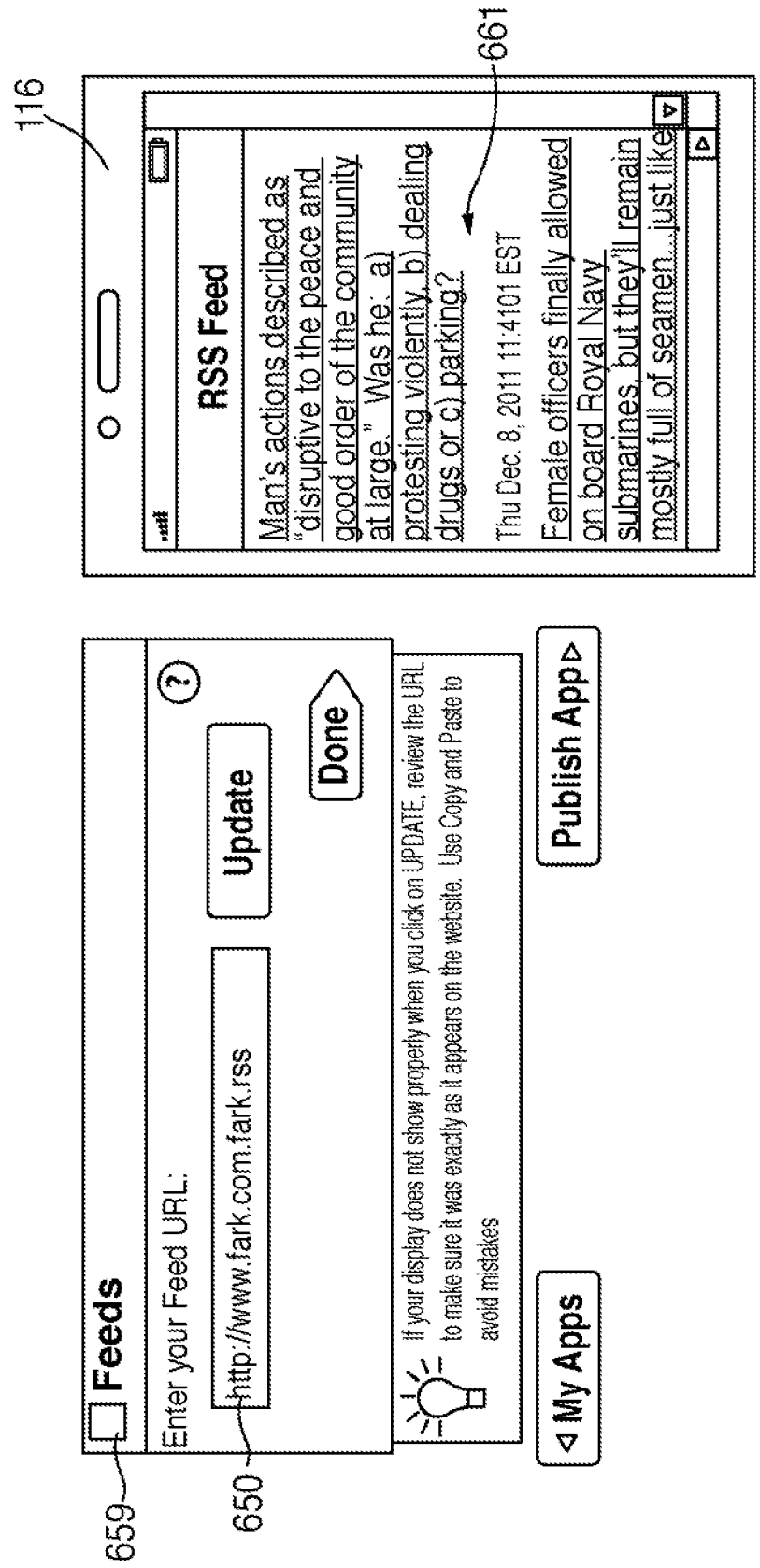
FIG. 18 is a pictorial diagram illustrating a portion of the display of an application development environment including a feeds manager accessed by developers through the mobile development and distribution platform in accordance with certain embodiments.

FIG. 18 is a pictorial diagram illustrating a portion of the display of an application development environment including a feeds manager accessed by developers through the mobile development and distribution platform in accordance with certain embodiments. In certain of these embodiments, such as where the mobile development and distribution platform is accessed through a web based service, the feeds manager may be displayed in a manner similar to the display of the contacts manager described above. As shown in FIG. 18, the application development environment includes feeds manager window 659, which allows the developer to add and format feeds. Feeds manager window 659 may include feed input field 660 into which the developer may input the URL or network address for a feed, as depicted in FIG. 18. In certain embodiments, such as where the application development environment includes a representation of the app on a mobile device, device representation 116 may include a representation of the display of the feeds module within the display of the mobile device. As shown in FIG. 18, the feeds module displayed through device representation 116 may include various feed items, such as RSS feed item 661, which display certain information, such as a headline and timestamp, for each feed items.

In certain embodiments, an end user who has downloaded and launched an app containing the feeds module may be able to select a particular feed item, such as by clicking or touching RSS feed item 661, to view full content associated with the feed item. In certain embodiments, the end user may be able to modify various other settings associated with the feeds module, such as the layout, order, and/or format of the feed items.

Figure 19:
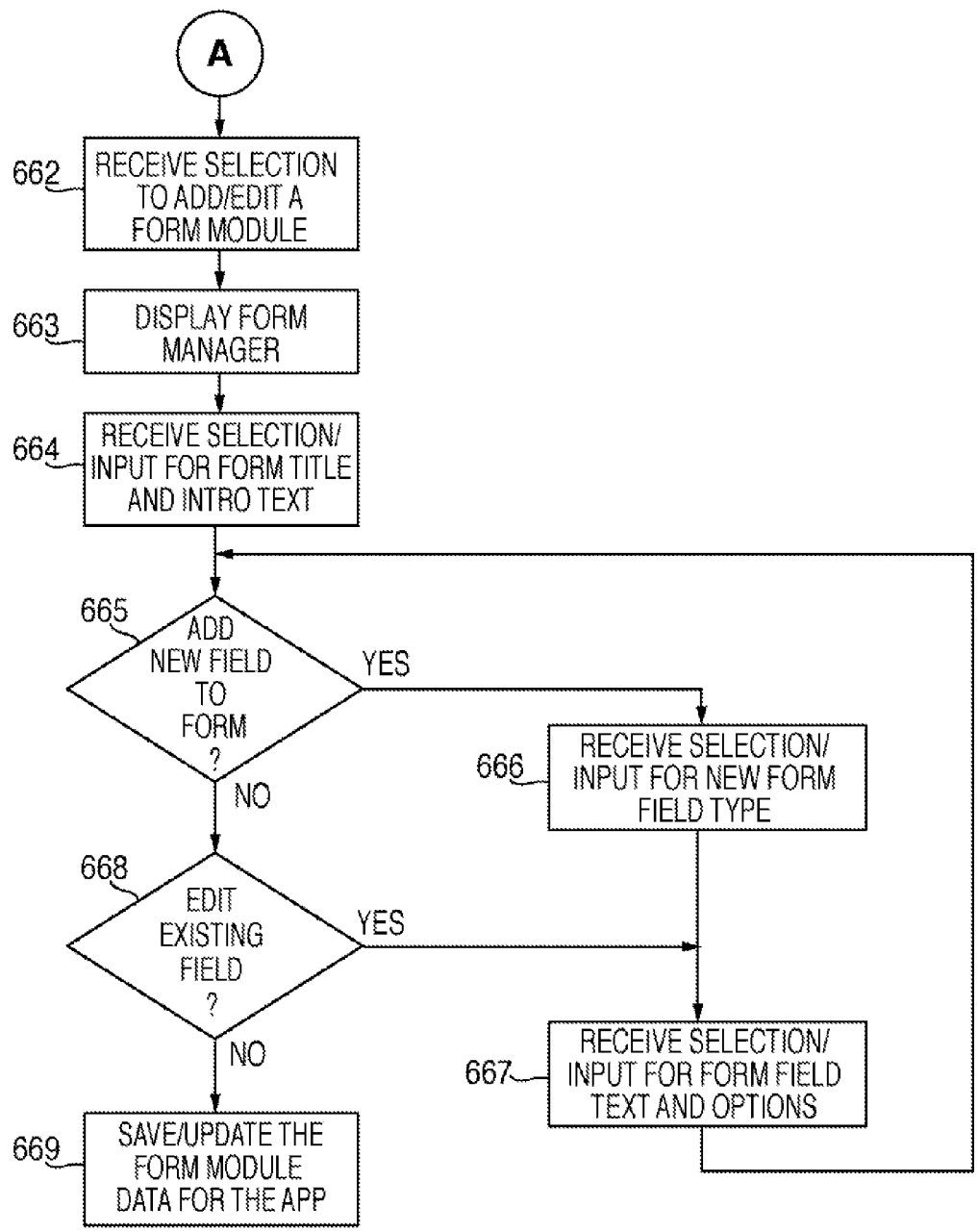
FIG. 19 is a flow diagram illustrating a process for customizing a forms module for inclusion in a mobile app developed through the mobile development and distribution platform, according to certain embodiments.

FIG. 19 is a flow diagram illustrating a process for customizing a forms module for inclusion in a mobile app developed through the mobile development and distribution platform, according to certain embodiments. In certain embodiments, developers may add forms module to their apps, such as to create and modify a simple form for end user input through the mobile app. As shown in FIG. 19, at step 662, the developer may select an option to add a forms module to an app or edit an existing forms module. In response, at step 663 the mobile development and deployment platform may activate a forms manager to allow the developer to create and customize a forms module for the app.

At step 664, the developer is prompted to select and/or input various properties for the form, such as a form title, introductory text, and/or a layout for the form. At step 665 a determination is then made as to whether the developer wants to add a field to the form. If so, at step 666 the developer is prompted to select the type of field to be added, such as form text, form fields, text box fields, multiple choice fields, drop down list fields, and text area fields, etc., and flow proceeds to step 667 In certain embodiments, the developer may be given the option to create a custom field. If the developer does not want to add a new field, a determination is then made at step 668 as to whether the developer wants to edit an existing field, such as by the developer selecting a previously added field. If so, at 667 the developer is prompted to input and/or upload the content for the field, and/or select various options associated with the field, such as format, size, etc. After creating and customizing the field, flow returns to step 665 and the developer may add new and/or edit existing fields. If the developer does not want to add or edit any more fields, at step 669 the developer's selections, inputs, and uploads are saved and/or updated for the mobile app, such as in a similar manner to that described in connection with FIG. 9.

Figure 20:
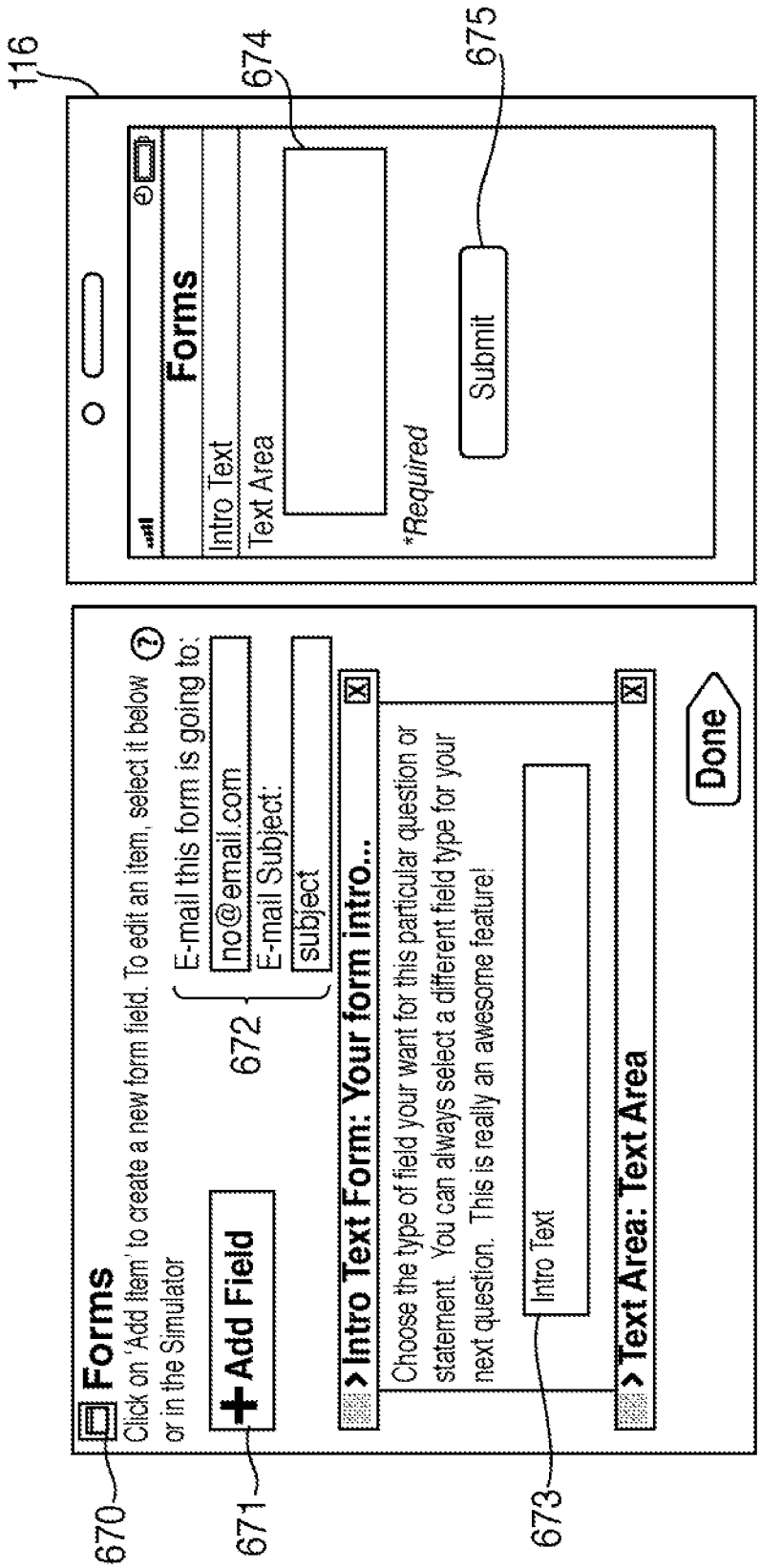
FIG. 20 is a pictorial diagram illustrating a portion of the display of an application development environment including a forms manager accessed by developers through the mobile development and distribution platform in accordance with certain embodiments.

FIG. 20 is a pictorial diagram illustrating a portion of the display of an application development environment including a forms manager accessed by developers through the mobile development and distribution platform in accordance with certain embodiments. In certain of these embodiments, such as where the mobile development and distribution platform is accessed through a web based service, the forms manager may be displayed in a manner similar to the display of the contacts manager described above. As shown in FIG. 20, the application development environment includes form manager window 670, which allows the developer to create and customize an input form. Form manager window 670 may include one or more buttons, such as add field button 671, which allows the developer to add a new field to the form. Form manager window 670 may also include various form selection fields, such as intro text field 673, which allow the developer to input content and/or select various options for the form and its fields. In certain embodiments, as illustrated in FIG. 20, form manager window 670 may include form delivery fields 672, which allows the developer to input the location, e.g., e-mail address, to which submissions of the form should be delivered, along with other related options, such as specifying a subject for the e-mails.

In certain embodiments, such as where the application development environment includes a representation of the app on a mobile device, device representation 116 may include a representation of the display of the forms module within the display of the mobile device. As shown in FIG. 20, the forms module displayed through device representation 116 may include various form fields, such as text area 674, which correspond to the selections and inputs made by the developer in form manager window 670. In certain embodiments, the developer may specify that one or more of the form fields are required. In certain of these embodiments, the forms module may indicate such required fields by displaying an asterisk or similar designation next to the required field. As shown in FIG. 20, the forms module may include one or more buttons, such as submit button 675, which allows an end user to submit the form when completed. In certain embodiments, the forms module may check whether all required fields have been input or selected prior to allowing the end user to submit the form. FIG. 20A is a pictorial diagram illustrating a portion of the display of an app including a forms module developed through the mobile development and distribution platform and executing on a mobile device, in accordance with certain embodiments.

Figure 21:
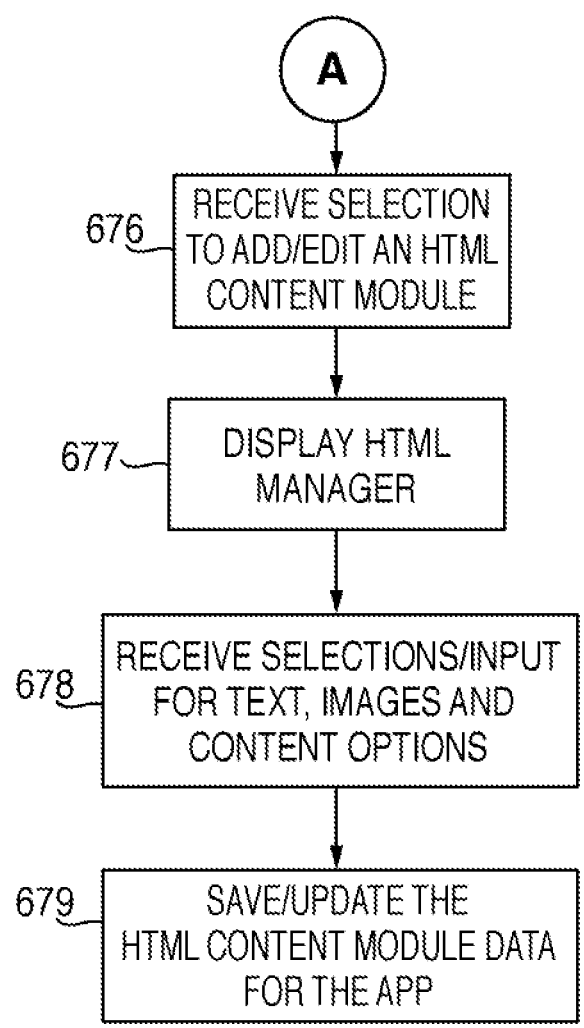
FIG. 21 is a flow diagram illustrating a process for customizing an HTML module for inclusion in a mobile app developed through the mobile development and distribution platform, according to certain embodiments.

FIG. 21 is a flow diagram illustrating a process for customizing an HTML module for inclusion in a mobile app developed through the mobile development and distribution platform, according to certain embodiments. In certain embodiments, developers may include an HTML module, such as to create and modify simple HTML content (e.g., a webpage) to be included in the mobile app. As shown in FIG. 21, at step 676, the developer may select an option to add an HTML module to an app or edit an existing HTML module. In response, at step 677, the mobile development and deployment platform may activate an HTML manager to allow the developer create and customize the HTML module. The HTML manager is responsible for presenting the developer with various options associated with inputting, uploading, creating, and customizing certain features, content and options for the HTML page and/or generating and managing the corresponding HTML code. At step 678, the developer may input, select and/or upload various content and options for the HTML page. For example, the developer may enter and format text to appear on the page, upload images, and select various layout options. At step 679, developer's inputs and selections for the HTML module are then saved and/or updated for the mobile app in a similar manner to that described in connection with FIG. 9.

FIG. 22 is a pictorial diagram illustrating a portion of the display of an application development environment including an HTML manager accessed by developers through the mobile development and distribution platform in accordance with certain embodiments. In certain of these embodiments, such as where the mobile development and distribution platform is accessed through a web based service, the HTML manager may be displayed in a manner similar to the display of the contacts manager described above. As shown in FIG. 22, the application development environment includes HTML manager window 680, which allows the developer to create and customize the HTML page. In certain of these embodiments, the HTML manager window may be in the form of a WYSIWYG (what you see is what you get) editor.

HTML manager window 680 includes content input box 682 into which the developer may enter various content directly, such as by typing text and pasting images, as depicted in FIG. 22. HTML manager window 680 also includes text editor menu 681, as illustrated in FIG. 22, that includes various options to add to and customize the HTML content, such as formatting settings for text, such as font type, size, emphasis, color, and alignment and uploading images and other media content. For example, the developer may select an option to have text wrap around one or more images included in the HTML page. In certain of these embodiments, text editor menu 681 may be displayed only when the user selects text to edit. In certain embodiments, the HTML module may include an edit picture feature which allows the developer to upload or specify the location of one or more images and/or modify the images to be included in the HTML page.

In certain embodiments, such as where the application development environment includes a representation of the app on a mobile device, device representation 116 may include a representation of the display of the HTML module within the display of the mobile device. As shown in FIG. 22, the HTML module displayed through device representation 116 may updated and display the current HTML page based on the input and selections made by the developer in HTML manager window 680. In certain embodiments, when an end user has downloaded and launched an app containing the HTML module, the HTML module may be responsible for rendering and displaying the HTML content on the end user's mobile device.

Figure 23:
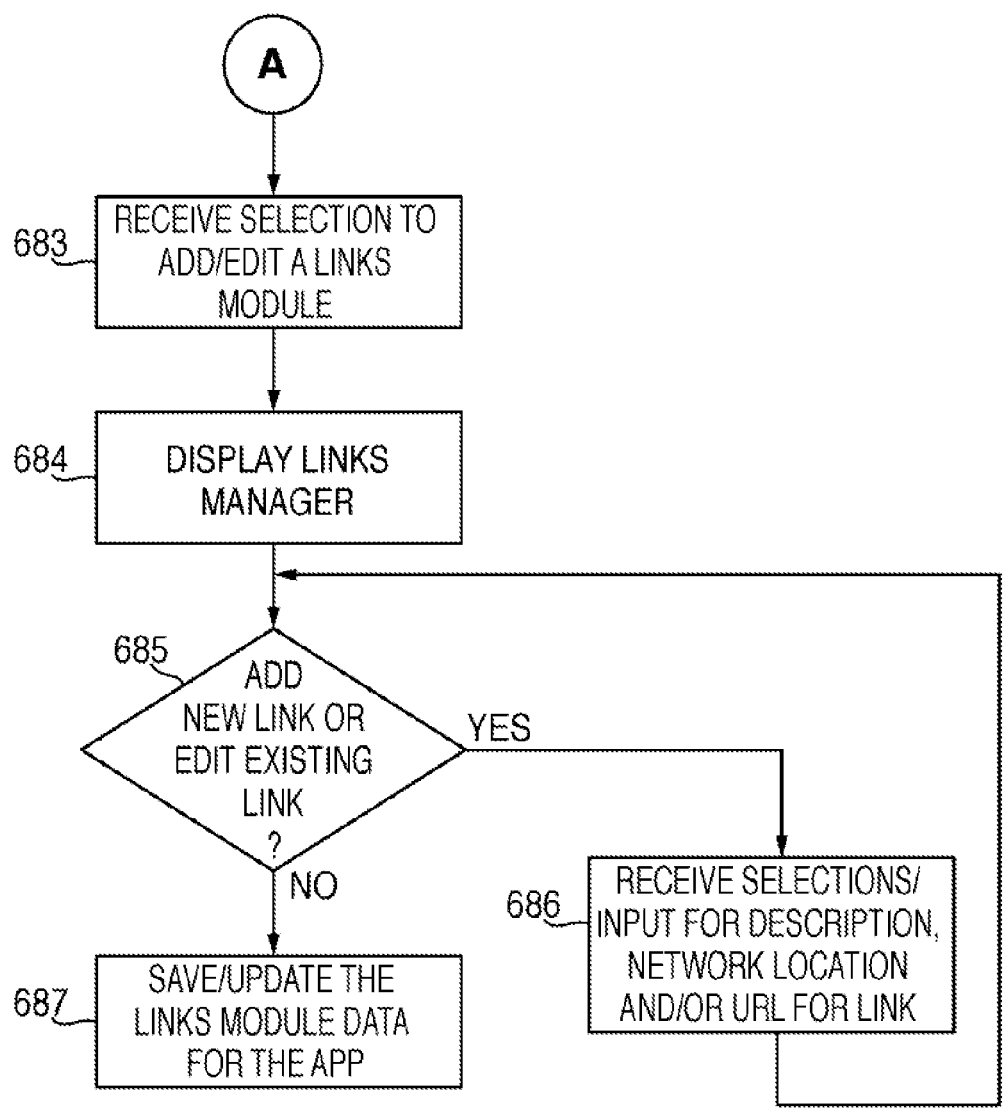
FIG. 23 is a flow diagram illustrating a process for customizing a links module for a mobile app developed through the mobile development and distribution platform, according to certain embodiments.

FIG. 23 is a flow diagram illustrating a process for customizing a links module for a mobile app developed through the mobile development and distribution platform, according to certain embodiments. In certain embodiments, developers may include a links module in an app, such as in order to link and provide end users with access to external websites, social networking sites, files and/or other resources through the mobile app. As shown in FIG. 23, at step 683, the developer may select an option to add a links module to an app or edit an existing links module. In response, at step 684, the mobile development and deployment platform may activate a links manager to allow the developer create and customize the links module. The links manager is responsible for presenting the developer with various options associated with selecting, specifying, and/or formatting the links to be included in the links module. In certain embodiments, the developer may be prompted to select various design options for the links module, such as an order for displaying the links, a layout, various formatting options, etc. For example, in certain of these embodiments, the developer may choose to have the links displayed in a list-based layout or as one or more pages of icons representing the links.

At step 685, a determination is made as to whether the developer wants to add a new, or edit an existing, link. If so, the developer is prompted to add and/or update the link, such as by inputting one or more network locations (e.g., URLs) where the linked resource can be accessed. For example, the developer may create links to a webpage, social networking site, PDF document, text document, presentation, image file, video file, or spreadsheet. In certain embodiments the developer may be able to upload a file from the developer's computer, which can then be stored by the mobile development and deployment platform and linked to within the links module. In certain embodiments, the links manager may display a list of commonly accessed or popular websites, such as social networking websites, that the developer may select to be included in the links module. In addition to specifying the location of the link, the developer may be prompted to select, input and/or upload various other information for the links, such as a name, description, and/or icon image. After adding and/or updating the link, flow returns to step 685. Once the developer has finished adding and/or editing the links for the links module, at step 687 the developer's inputs and selections for the links module are then saved and/or updated for the mobile app in a similar manner to that described in connection with FIG. 9.

FIGS. 24 and 25 are pictorial diagrams illustrating a portion of the display of an application development environment including a links manager accessed by developers through the mobile development and distribution platform in accordance with certain embodiments. In certain of these embodiments, such as where the mobile development and distribution platform is accessed through a web based service, the links manager may be displayed in a manner similar to the display of the contacts manager described above. As shown in FIG. 24, the application development environment includes links manager window 688, which allows the developer to add and format links. Links manager window 688 may include link input field 689 into which the developer may input the location for the link, such as a local file, URL or network address, as depicted in FIG. 24. In certain of these embodiments, the developer may be prompted to specify whether the link is for a resource that exists locally on the developer's computer or for an external website or resource.

Similarly, as shown in FIG. 25, the application development environment includes social links manager window 690, which allows the developer to add and format links to social networking web pages. Social links manager window 690 may include social link input fields 691 which present a list of commonly used social networking websites and allow the developer to input the location to be linked to within such websites, as depicted in FIG. 24. In certain of these embodiments, the developer may be allowed to input a link to other websites not included in the list. In certain embodiments, the social links manager may associate a predefined icon image for each social link. Alternatively, or in addition, the developer may be able to select, modify and/or upload an icon image for the social links.

In certain embodiments, such as where the application development environment includes a representation of the app on a mobile device as shown in FIGS. 24 and 25, device representation 116 may include a representation of the display of the links module within the display of the mobile device. As shown in FIG. 25, the links module displayed through device representation 116 may include a number of icons representing the social links, such as Facebook link icon 692, which allow end users to access the link, such as by clicking on or touching the icon.

In certain embodiments, such as where a link provides access to a resource file (e.g., PDF document, text document, presentation, image file, video file, or spreadsheet), the links module may prompt the developer to input or select the file type for the linked data and/or a preferred application (e.g., viewer or editor) in which to open the resource. In certain of these embodiments, when an end user who has downloaded the app selects a link to such resources, the links module may launch a separate and/or preexisting viewer or editor available on the end user's mobile device in order to access and display the data referenced by the link. For example, the links module may launch a spreadsheet viewer in response to an end user selects a link to spreadsheet data, such as the chart data and pie-chart data depicted in FIG. 23A. As another example, the links module may launch an image viewer in response to the end user selecting a link to an image file or may launch a web browser in response to the user selecting a link to a webpage. In certain of these embodiments, the links module and/or mobile app may access a third-party service (e.g., Google Docs) to process and/or display the linked data.

Figure 26:
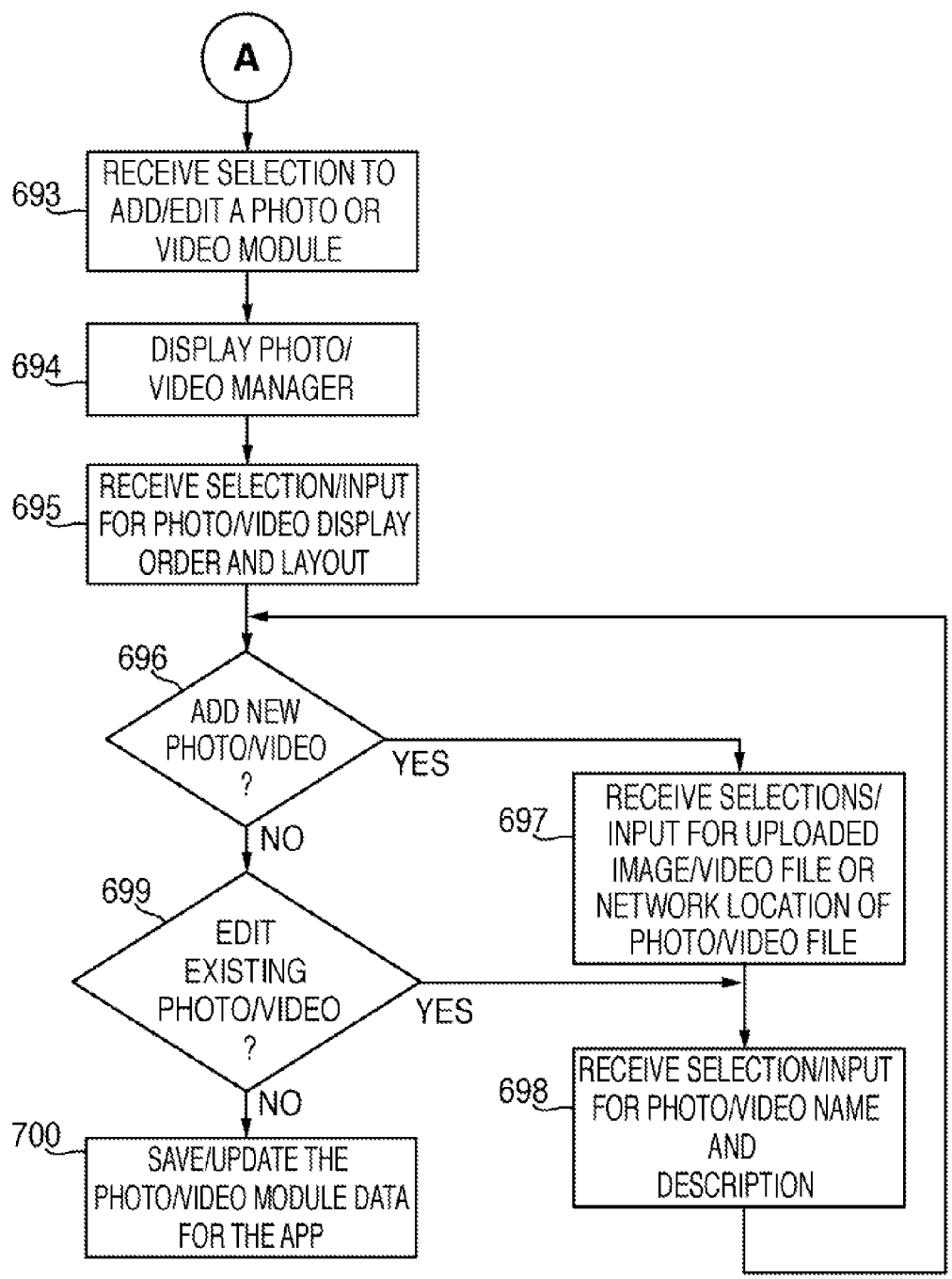
FIG. 26 is a flow diagram illustrating a process for customizing a photos or videos module for inclusion in a mobile app developed through the mobile development and distribution platform, according to certain embodiments.

FIG. 26 is a flow diagram illustrating a process for customizing a photos or videos module for inclusion in a mobile app developed through the mobile development and distribution platform, according to certain embodiments. In certain embodiments, developers may add a photos and/or videos module to their apps, such as to add, upload, select and/or modify a series of photos, images, videos and/or other animated content or media to the app. As shown in FIG. 26, at step 693, the developer may select an option to add a photos or videos module to an app or edit an existing photos or videos module. In response, at step 694 the mobile development and deployment platform may activate a photos or videos manager to allow the developer to create and customize a photos or videos module for the app. At step 695, the developer may be prompted to select and/or input various properties and design options for the photos or videos, such as introductory text, and/or a layout for the photos or videos. For example, the developer may select and/or create a layout used to display the photos or videos, such as a slideshow, list view, icon view, or scrolling view.

At step 696 a determination is then made as to whether the developer wants to add a new photo or video. If so, at step 697 the developer is prompted to select and/or upload the location of the photo or video file, and flow proceeds to step 698. In certain of these embodiments, the developer may add photos or videos by uploading them from the developer's computer, inputting a URL and/or specifying the location of a third-party photo or video sharing service. If the developer does not want to add a new photo or video, a determination is then made at step 699 as to whether the developer wants to edit an existing photo or video, such as by the developer selecting a previously added photo or video. If so, at step 698 the developer is prompted to input and/or select various options associated with the photo or video, such as a name, description, icon image, size, etc. In certain embodiments, the developer may be able to edit the photo or video using an editor provided through the mobile development and deployment platform. After creating and customizing the photo or video, flow returns to step 695 and the developer may add new and/or edit existing photos or videos. If the developer does not want to add or edit any more photos or videos, at step 700 the developer's selections, inputs, and uploads are saved and/or updated for the mobile app, such as in a similar manner to that described in connection with FIG. 9.

Figure 27A:
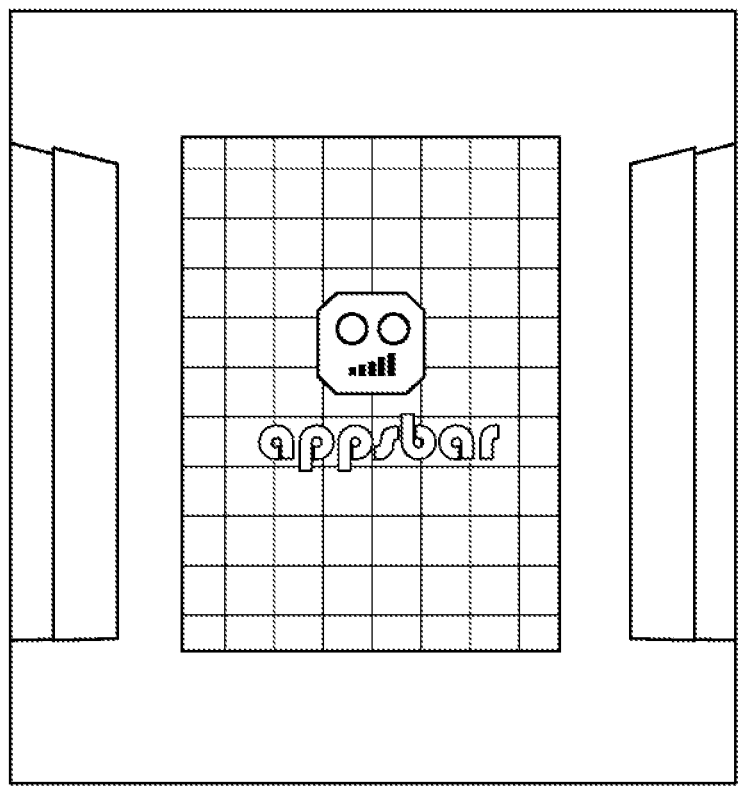
FIGS. 27A and 28A are pictorial diagrams illustrating a portion of the display of a photos or videos module on the display of a mobile device, according to certain embodiments.
Figure 28:
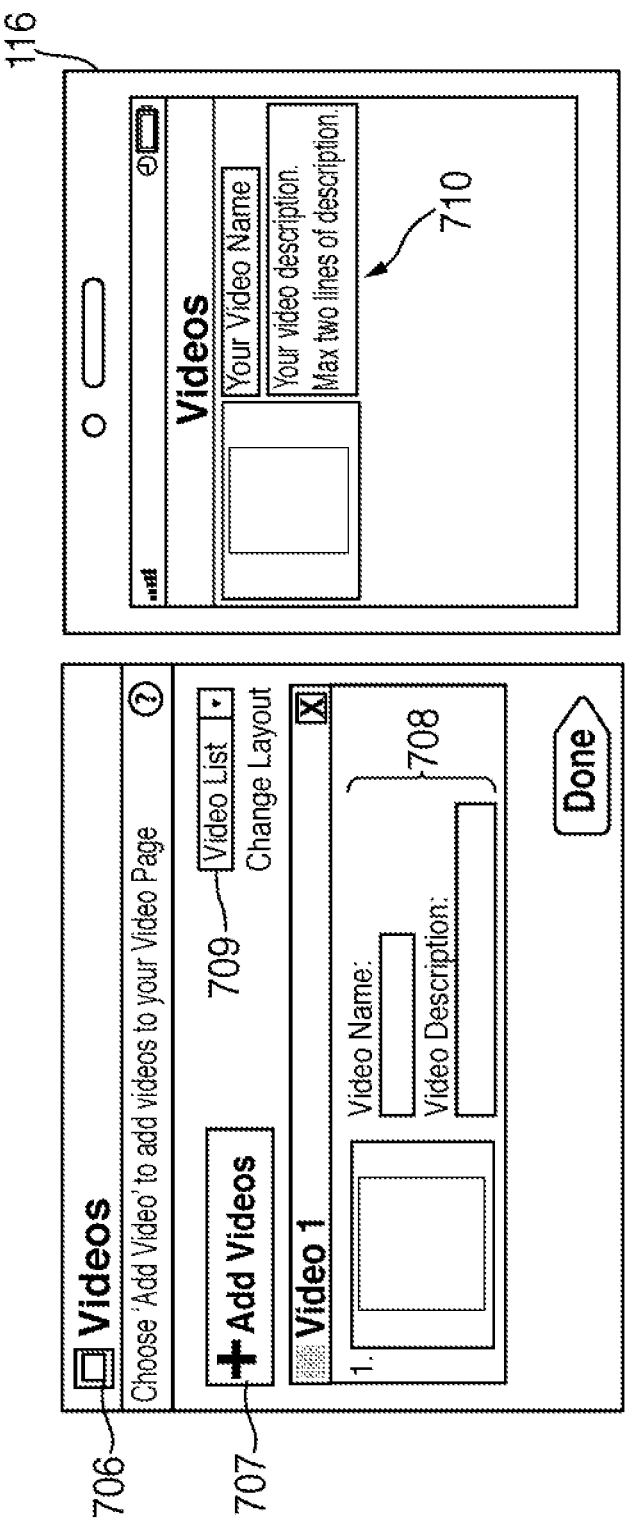

FIGS. 27 and 28 are pictorial diagrams illustrating a portion of the display of an application development environment including a photos or videos manager accessed by developers through the mobile development and distribution platform in accordance with certain embodiments. In certain of these embodiments, such as where the mobile development and distribution platform is accessed through a web based service, the photos or videos manager may be displayed in a manner similar to the display of the contacts manager described above. As shown in FIG. 26, the application development environment includes photos manager window 701, which allows the developer to add and format photos or other images. Photos manager window 701 may include add photo button 702, which the developer may select to add a new photo, and photo selector fields 703 into which the developer may input the location, name and/or description for the photo, as depicted in FIG. 24. In certain embodiments, as shown in FIG. 27, photos manager window 701 may include photo layout selector 704, such as in the form of a drop down list, which allows the developer to select a layout from a list of predefined layouts for the photos. In certain of these embodiments, the developer may alternatively, or additionally, create a custom layout or modify a predefined layout for the photos.

Similarly, as shown in FIG. 28, the application development environment includes videos manager window 706, which allows the developer to add and format videos or other animated content. Videos manager window 706 may include add video button 707, video selector fields 708 and/or video layout selector 709, which allow the developer to select and input various information for the videos in a similar manner as described in connection with the photos manager window described above.

In certain embodiments, such as where the application development environment includes a representation of the app on a mobile device as shown in FIGS. 27 and 28, device representation 116 may include a representation of the display of the photos or videos module within the display of the mobile device. As shown in FIG. 27, the photos module displayed through device representation 116 may include a number of sub-windows representing the photos or images, such as photo sub-window 705, which may display certain information for each photo (e.g., icon, description, etc.) and/or allow end users to select and access the full photo or image, such as by clicking on or touching the photo sub-windows. Likewise, as shown in FIG. 28, the videos module displayed through device representation 116 may include a number of sub-windows representing the videos or animated content, such as video sub-window 710, which may display certain information for each video (e.g., icon, description, etc.) and/or allow end users to select and access the full video, such as by clicking on or touching the video sub-windows.

Figure 28A:

FIGS. 27A and 28A are pictorial diagrams illustrating a portion of the display of a photos or videos module on the display of a mobile device, according to certain embodiments. As shown in FIG. 27A, the photos module may display a plurality of photos and/or images, which may be displayed as a slideshow that allows the end user to browse through and select the photos. As shown in FIG. 28A, the videos module may display a plurality of videos and/or animated content, which may be displayed in a tiled manner that shows one or more frames of each video and allows the end user to browse through the videos and select a video to view. In certain of these embodiments, the photos or videos module may take advantage of certain functionality available through the end user's mobile device, such as by allowing the user to flick the display screen of the mobile device to browse through the photos or videos.

Figure 29:
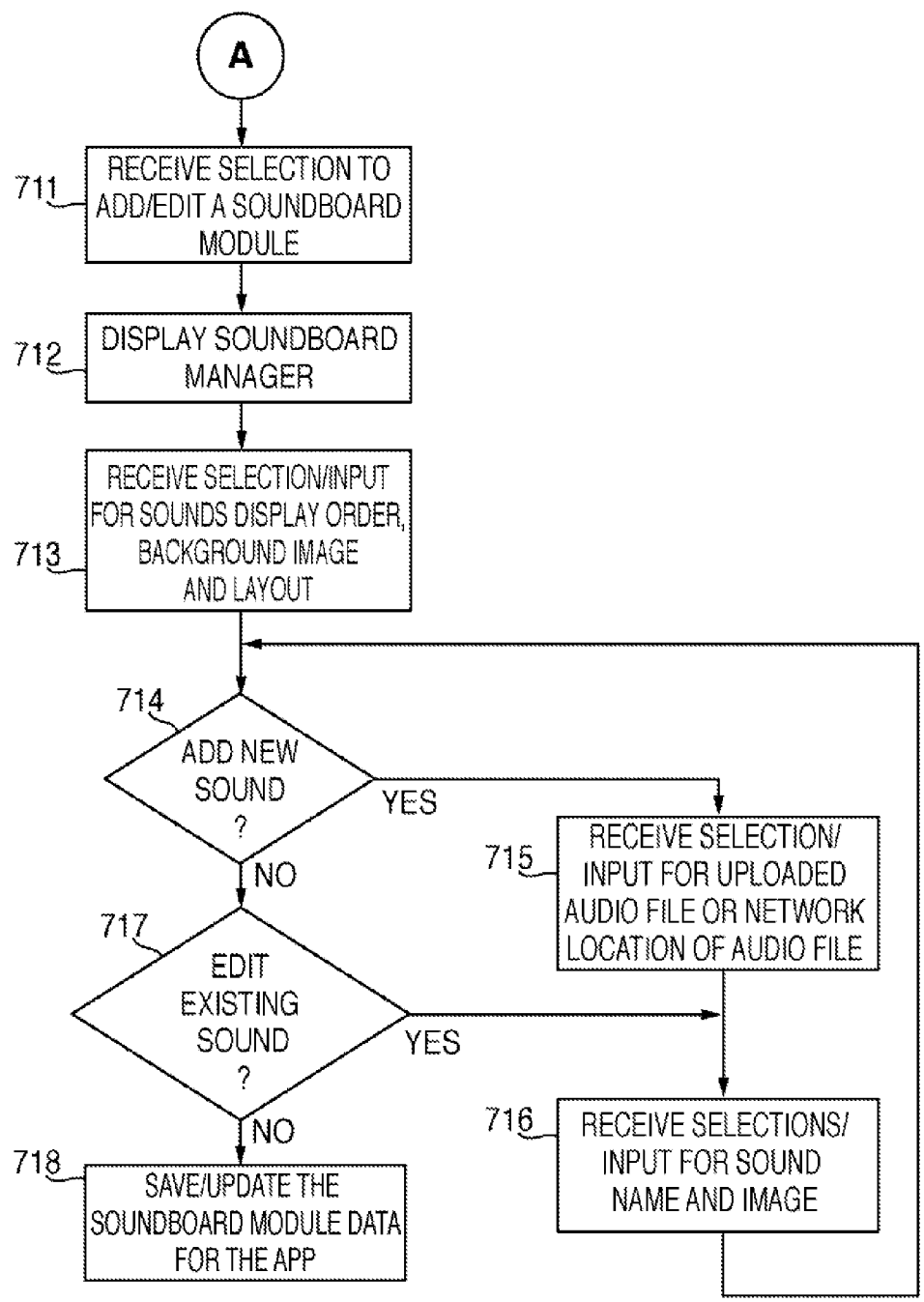
FIG. 29 is a flow diagram illustrating a process for customizing a soundboard module for inclusion in a mobile app developed through the mobile development and distribution platform, according to certain embodiments.

FIG. 29 is a flow diagram illustrating a process for customizing a soundboard module for inclusion in a mobile app developed through the mobile development and distribution platform, according to certain embodiments. In certain embodiments, developers may add a soundboard module to their apps, such as to developers to add, upload, select and/or modify a series of sounds or other audio content than an end user can quickly navigate to and play through the app. As shown in FIG. 28, at step 711, the developer may select an option to add a soundboard module to an app or edit an existing soundboard module. In response, at step 712 the mobile development and deployment platform may activate a soundboard manager to allow the developer to create and customize a soundboard module for the app. At step 713, the developer may be prompted to select and/or input various properties and design options for the sounds, such as introductory text, a background image, and/or a layout for the sounds. For example, the developer may select or create a layout used to display the sounds, such as a list view, icon view, or scrolling view, and/or select or modify the display order of the sounds.

At step 714 a determination is then made as to whether the developer wants to add a new sound. If so, at step 715 the developer is prompted to upload an audio file and/or select or input the location of the audio file, and flow proceeds to step 716. In certain of these embodiments, the developer may add sounds or audio content by uploading the files from the developer's computer or inputting a URL or other network location. If the developer does not want to add a new sound, a determination is then made at step 717 as to whether the developer wants to edit an existing sound, such as by the developer selecting a previously added sound. If so, at step 716 the developer is prompted to input and/or select various options associated with the sound, such as a name, description, icon image, etc. After creating and customizing the sound, flow returns to step 714 and the developer may add new and/or edit existing sounds. If the developer does not want to add or edit any more sounds, at step 718 the developer's selections, inputs, and uploads are saved and/or updated for the mobile app, such as in a similar manner to that described in connection with FIG. 9.

FIG. 30 is pictorial diagram illustrating a portion of the display of an application development environment including a soundboard manager accessed by developers through the mobile development and distribution platform in accordance with certain embodiments. In certain of these embodiments, such as where the mobile development and distribution platform is accessed through a web based service, the soundboard manager may be displayed in a manner similar to the display of the contacts manager described above. As shown in FIG. 30, the application development environment includes soundboard manager window 719, which allows the developer to add and format sounds for the soundboard module. Soundboard manager window 719 may include add sound button 720, which the developer may select to add a new sound, and soundboard background selector 721, which allows the developer to select and/or upload a background for the soundboard module, as depicted in FIG. 30. In certain embodiments, soundboard manager window 719 may include various other sound input fields, which allow the developer to select and/or upload audio files for the sounds and input corresponding information, such as a name, icon image, and description.

In certain embodiments, such as where the application development environment includes a representation of the app on a mobile device as shown in FIG. 30, device representation 116 may include a representation of the display of the soundboard module within the display of the mobile device. As shown in FIG. 30, the soundboard module displayed through device representation 116 may include a number of icons representing the sounds, such as sound icon 722, which may display certain information for each sound (e.g., image, name, description, etc.) and/or allow end users to select and play the sound, such as by clicking on or touching the sound icons.

Figure 30A:
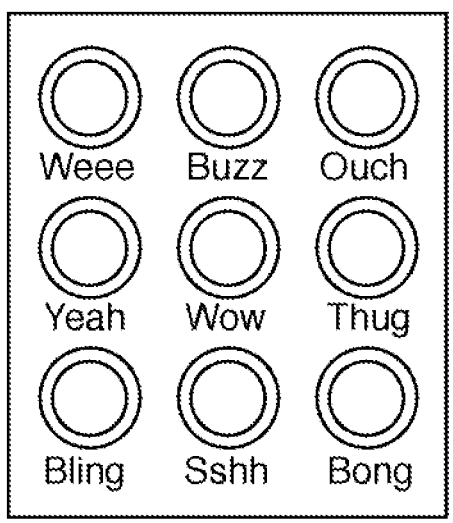
FIG. 30A is a pictorial diagram illustrating a portion of the display of a soundboard module on the display of a mobile device, according to certain embodiments.

FIG. 30A is a pictorial diagram illustrating a portion of the display of a soundboard module on the display of a mobile device, according to certain embodiments. As shown in FIG. 30A, the soundboard module may display a plurality of sounds within a portion or the entirety of the display of a mobile device when the mobile app is executed. In certain embodiments, the sounds may be displayed in a tiled manner, as depicted in FIG. 30A, and/or may auto-paginate based on the number of sounds presented on the display of the mobile device.

Figure 31:
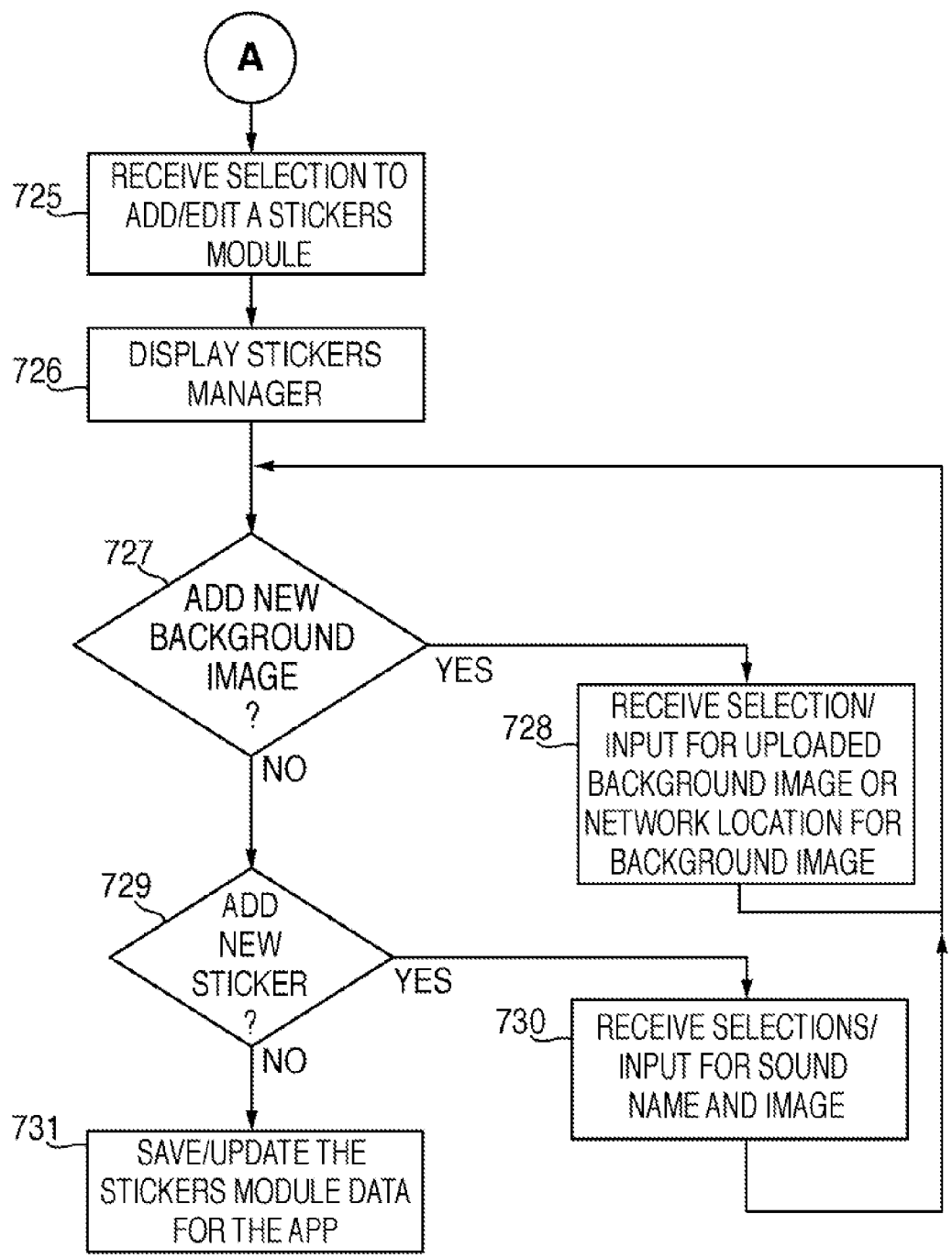
FIG. 31 is a flow diagram illustrating a process for customizing a stickers module for inclusion in a mobile app developed through the mobile development and distribution platform, according to certain embodiments.

FIG. 31 is a flow diagram illustrating a process for customizing a stickers module for inclusion in a mobile app developed through the mobile development and distribution platform, according to certain embodiments. In certain embodiments, developers may add a stickers module to their apps, such as to create, upload, select and/or modify a set of stickers or other images and content that end users may place on certain photos or images (e.g., backgrounds) through the mobile app. As shown in FIG. 31, at step 725, the developer may select an option to add a stickers module to an app or edit an existing stickers module. In response, at step 726 the mobile development and deployment platform may activate a stickers manager to allow the developer to create and customize a stickers module for the app. In certain embodiments, the stickers manager is responsible for presenting the developer with various options associated with inputting, uploading, selecting and/or customizing the stickers, as well as their layout and order. For example, the developer may select or create a layout used to display the background images and/or stickers, such as a list view, icon view, or scrolling view, and/or select or modify their display order.

At step 727, a determination is made as to whether the developer wants to add a background image to the stickers module or edit an existing background image. If so, at step 728, the developer is prompted to upload an image file (e.g., from the developer's computer), input a URL or other network location for the image file and/or select a predefined image file presented through the stickers manager. In certain embodiments, the developer may be prompted to select and/or or input various properties and options for the backgrounds, such as a name, description and icon image. Flow then returns to step 727. If the developer does not want to add or edit a background image, at step 729 a determination is made as to whether the developer wants to add a sticker to the stickers module or edit an existing sticker. If so, at step 730, the developer is prompted to upload an image file (e.g., from the developer's computer), input a URL or other network location for the image file and/or select a predefined image file presented through the stickers manager. In certain embodiments, the developer may be prompted to select and/or input various properties and options for the stickers, such as a name, description and icon image. Flow then returns to step 727. After the developer is finished adding and/or editing the backgrounds and stickers, at step 731 the developer's selections, inputs, and uploads are saved and/or updated for the mobile app, such as in a similar manner to that described in connection with FIG. 9.

For example, in certain embodiments, the stickers module includes "PicWith" or similar functionality, which may utilize images uploaded or selected by the developer during the mobile app creation process and/or images selected by the end user (e.g., downloaded, received through email or text message, or taken by a camera included on the end user's mobile device). In certain of these embodiments, one of the images uploaded and provided by the developer may be selected by end-users as a foreground image for use with a background image also chosen by the end user. The stickers module may allow the end user to merge or combine the foreground and background images together, such as to create the appearance of a single image. In certain embodiments, the end user may then save the merged image, send the merged image to other individuals (e.g., via email or text message) and/or upload and post the merged image to a website, such as a social networking site.

FIG. 32 is pictorial diagram illustrating a portion of the display of an application development environment including a stickers manager accessed by developers through the mobile development and distribution platform in accordance with certain embodiments. In certain of these embodiments, such as where the mobile development and distribution platform is accessed through a web based service, the stickers manager may be displayed in a manner similar to the display of the contacts manager described above. As shown in FIG. 32, the application development environment includes stickers manager window 732, which allows the developer to add, modify and customize backgrounds and stickers for the stickers module. Stickers manager window 732 may include one or more buttons such as background library button 733 and sticker library button 734 depicted in FIG. 32, which the developer may select to view the existing backgrounds and/or select and/or upload a background or sticker for the stickers module. In certain embodiments, suck as in response to the developer selecting background library button 733 and/or sticker library button 734, stickers manager window 719 may present the developer with one or more predefined background or stickers for selection. As shown in FIG. 32, stickers manager window 732 may include add sticker button 735, which allows the developer to upload and/or input a network location for an image file.

In certain embodiments, such as where the application development environment includes a representation of the app on a mobile device, device representation 116 may include a representation of the display of the stickers module within the display of the mobile device. As shown in FIG. 32, the stickers module displayed through device representation 116 may include a number of icons, such as sticker icon 736 representing the available stickers, and one or more background images, such as background image 737, onto which end users may include the stickers. In certain embodiments, the stickers module may take advantage of the features present on an end user's mobile device, such as allowing the end user to drag and drop the stickers onto the background image using a touch screen on the mobile device. Similarly, in certain embodiments, end users may be able to edit and manipulate the stickers, such as shrinking or enlarging the stickers through pinch and zoom gestures and/or rotating the stickers using a rotate gesture. In certain embodiments, end users may be able to select backgrounds and images stored on their mobile devices for use in the stickers module.

Figure 32A:
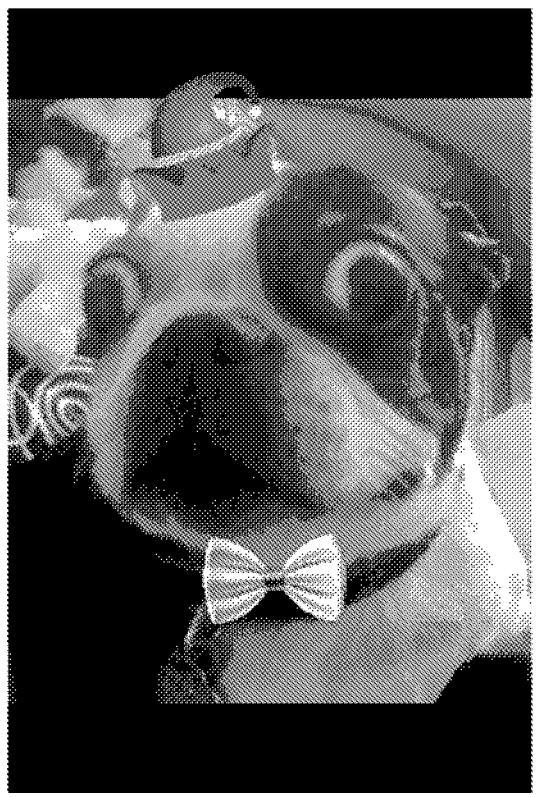
FIG. 32A is a pictorial diagram illustrating a portion of the display of a stickers module on the display of a mobile device, according to certain embodiments.

According to certain embodiments, after modifying background images through the stickers module, end users may store the modified images including the stickers (e.g., on their mobile device and/or at a remote network location) and/or may share these modified images, such as through social media websites and/or via e-mail functionality available on their mobile devices. FIG. 32A is a pictorial diagram illustrating a portion of the display of a stickers module on the display of a mobile device, according to certain embodiments. As shown in FIG. 32A, the stickers module may display a background image having one or more stickers added by the end user within a portion or the entirety of the display of a mobile device.

Figure 33:
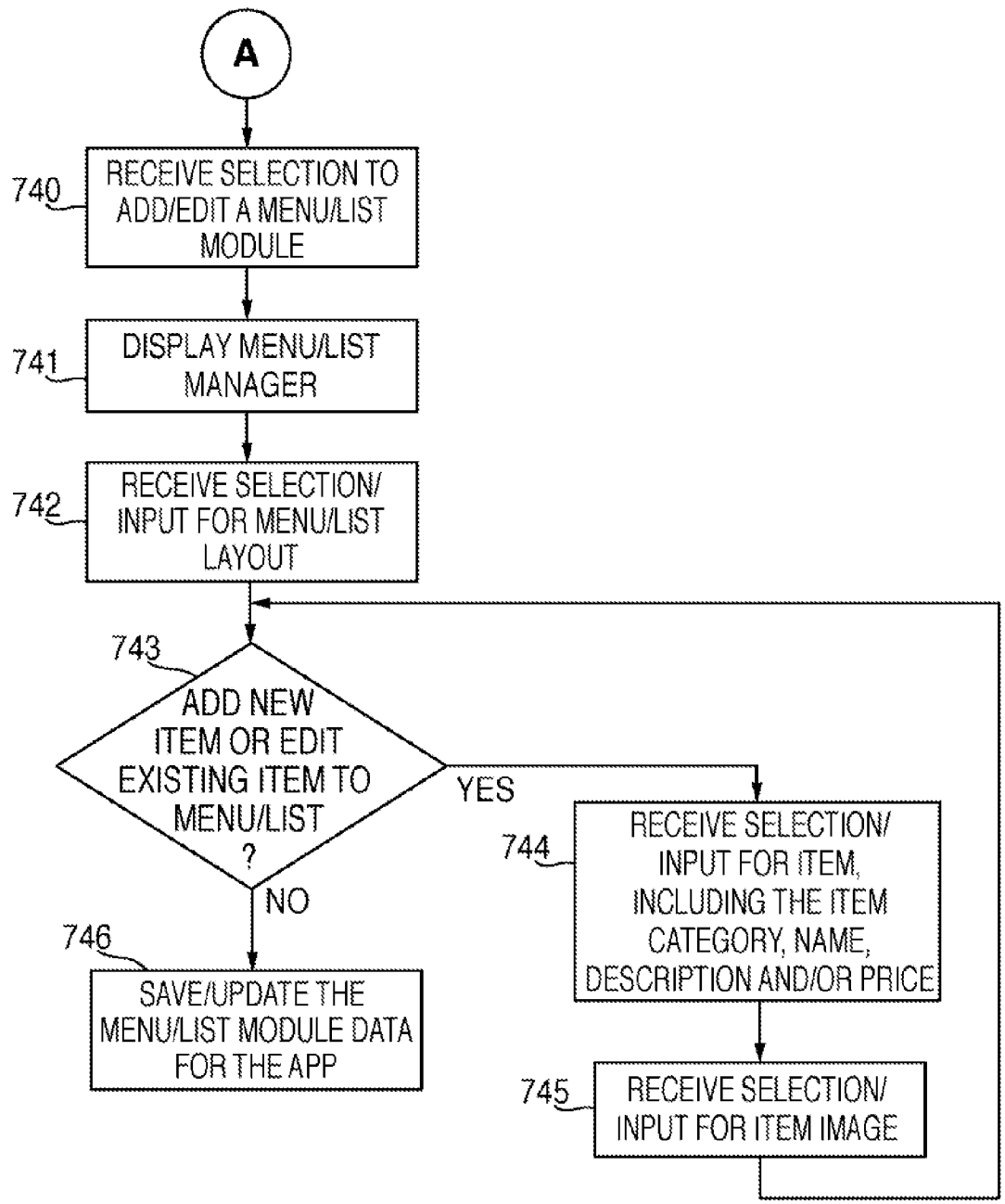
FIG. 33 is a flow diagram illustrating a process for customizing a menu or list module for a mobile app developed through the mobile development and distribution platform, according to certain embodiments.

FIG. 33 is a flow diagram illustrating a process for customizing a menu or list module for a mobile app developed through the mobile development and distribution platform, according to certain embodiments. In certain embodiments, developers may include a menu or list module in an app, such as in order to create, upload, select and/or modify a menu or list of items (e.g. a restaurant menu or employee list) to be included in mobile app. As shown in FIG. 23, at step 740, the developer may select an option to add a menu or list module to an app or edit an existing menu or list module. In response, at step 741, the mobile development and deployment platform may activate a menu or list manager to allow the developer create and customize the menu or list module. The menu or list manager is responsible for presenting the developer with various options associated with selecting, specifying, and/or formatting the menu items and/or list items to be included in the menu or list module. At step 742, the developer may be prompted to select various design options for the menu or list module, such as an order for displaying the items, a layout, one or more categories, and various formatting options, etc. For example, in certain of these embodiments, the developer may choose to have the items displayed in a list-based layout or as one or more pages containing categories of items.

At step 743, a determination is made as to whether the developer wants to add a new, or edit an existing, menu or list item. If so, the developer is prompted to select, modify, and/or input various information for the item, such as a name, price, description and/or suggested complimentary items. At step 744, the developer may be prompted to add or modify an icon image for the item, such as by uploading a file from the developer's computer, selecting a predefined image, or inputting a network location for the image. Flow then returns to step 743. Once the developer has finished adding and/or editing the items for the menu or list module, at step 745 the developer's inputs and selections for the menu or links module are then saved and/or updated for the mobile app in a similar manner to that described in connection with FIG. 9.

Figure 34:
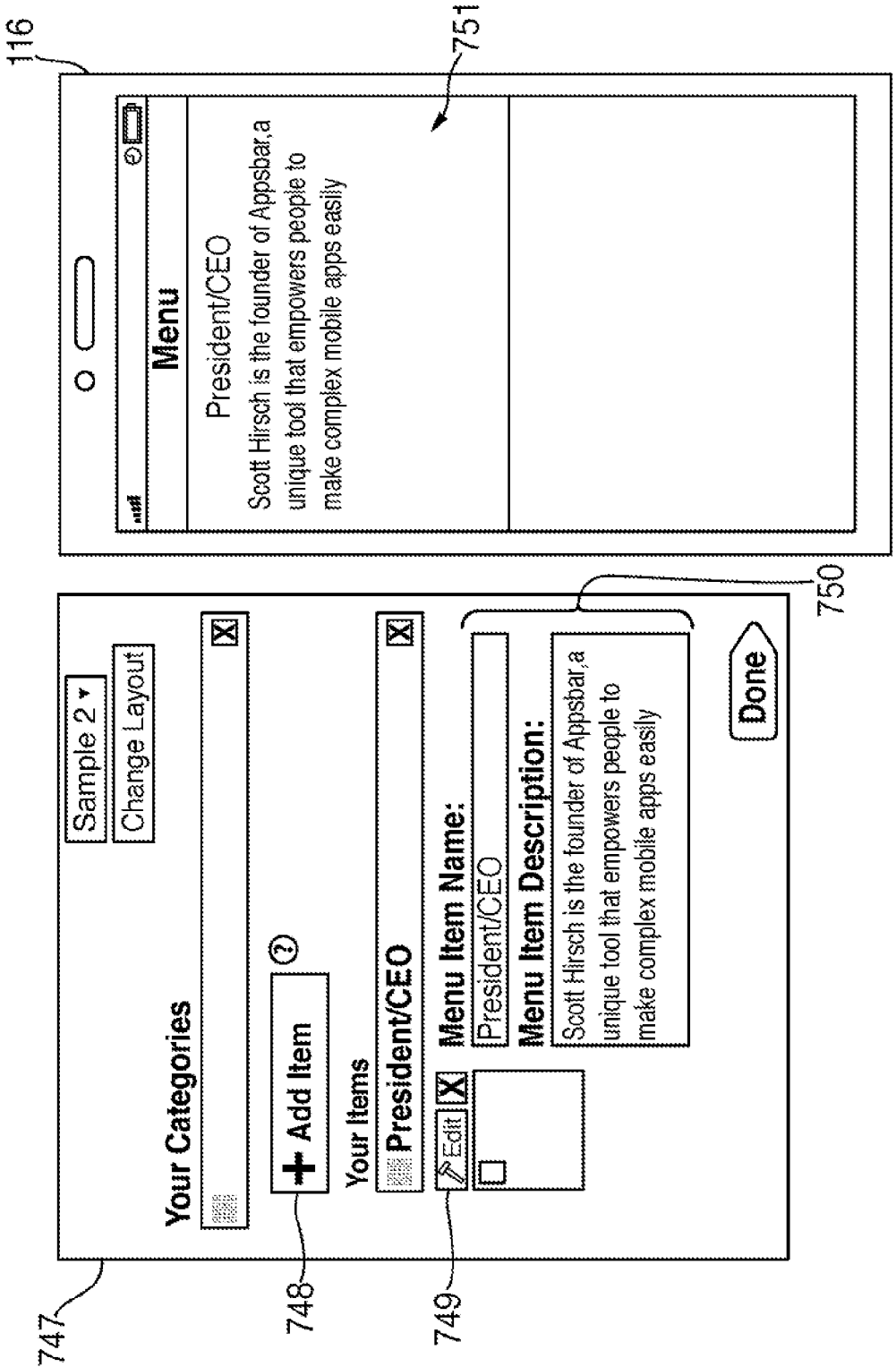
FIG. 34 is pictorial diagram illustrating a portion of the display of an application development environment including a list manager accessed by developers through the mobile development and distribution platform in accordance with certain embodiments.

FIG. 34 is pictorial diagram illustrating a portion of the display of an application development environment including a list manager accessed by developers through the mobile development and distribution platform in accordance with certain embodiments. In certain of these embodiments, such as where the mobile development and distribution platform is accessed through a web based service, the list manager may be displayed in a manner similar to the display of the contacts manager described above. As shown in FIG. 34, the application development environment includes list manager window 747, which allows the developer to add, modify and customize list items and customize their layout. List manager window 747 may include one or more buttons such as add item button 748 depicted in FIG. 34, which the developer may select to add a new item. In certain embodiments, such as in response to the developer selecting add item button 748, list manager window 747 may present one or more buttons and/or input fields, such as item image button 749 and item input fields 750 depicted in FIG. 34, which allow the developer to select, upload and/or input various information for the item including a name, description and icon image.

In certain embodiments, such as where the application development environment includes a representation of the app on a mobile device, device representation 116 may include a representation of the display of the menu or list module within the display of the mobile device. As shown in FIG. 34, the list module displayed through device representation 116 may include a number of sub-windows, such as list item sub-window 751, which present various information associated with the list items to end users and allow the end users to browse through and/or select the list items, such as to view additional information or purchase the list item.

According to certain embodiments, the developer may use a menu or list module to create various menus or lists, such as a restaurant or bar menu, list of products and services, list of employees, list of business or store locations, etc. FIG. 34A is a pictorial diagram illustrating a portion of the display of a mobile app having a menu module, developed through the mobile development and distribution platform, according to certain embodiments. As shown in FIG. 34A, the menu module includes a number of restaurant menu items, which are grouped into various categories.

In certain of these embodiments, the developer may be able to include an ecommerce or similar sub-module within the menu or list module, such as to allow end users to select and/or purchase one or more of the menu items through the app (e.g., by submitting an order to a restaurant associate with the app). FIGS. 34B and 34C are pictorial diagrams illustrating a portion of the display of an application development environment including an ecommerce manager accessed by developers through the mobile development and distribution platform in accordance with certain embodiments. The ecommerce manager allows developers to add ecommerce and in-app purchases to a menu or list module (or other modules) included in their mobile apps, such as through a shopping cart based ordering system. For example, if the mobile app includes a menu module, the developer may select certain menu items to be available for purchase by end users and create and customize an order form for use with such items. As shown in FIG. 34B, the application development environment may include order delivery method window 752, which allows the developer to select various methods of delivery for items purchased through the app, such as delivery, pick-up, take-out, dine-in. Similarly, as shown in FIG. 34C, the application development environment may include order delivery confirmation method window 753, which allows the developer to select various methods of confirmation for items purchased through the app, such as e-mail or QR code.

In certain embodiments, such as where the application development environment includes a representation of the app on a mobile device, device representation 116 may include a representation of the display of the ecommerce sub-module within the display of the mobile device. As shown in FIG. 34B, the ecommerce sub-module displayed through device representation 116 may include an input form based on the developers selections and inputs in order delivery method window 752, which allow end users to choose an order delivery method, and/or input various order-related information. As shown in FIG. 34C, the ecommerce sub-module displayed through device representation 116 may include a representation of the order confirmation method (e.g., a QR code) based on the developer's selections in order delivery confirmation method window 753.

In accordance with certain of these embodiment, after an end user selects various items to order and purchase and/or indicates a desire to complete an order through a mobile app having an ecommerce sub-module, the ecommerce sub-module may display a checkout form to the end user. The checkout form may include various fields, such as form fields that allow the end user to input certain information associated with the order, such as the end user's name, e-mail, address, and a time for the order. In certain embodiments, such as where the mobile app is associated with a restaurant, the order form may include a menu which allows the end user to select the ordering method (e.g., delivery, take-out, dine-in). In certain of these embodiments, the mobile app may present a separate window, such as pop-up window, to prompt the end user to select the ordering method. In certain of these embodiments, after the end user inputs and/or submits the order information, the ecommerce sub-module may prompt the end user to select a method for order processing and confirmation, such as an e-mail or QR code confirmation. In certain of these embodiments, the mobile app may display this selection to the end user in a separate window, such as an order processing pop-up window. If the end user selects to receive a QR code confirmation, the QR code may be displayed to the end user on the display of the mobile device.

Figure 35:
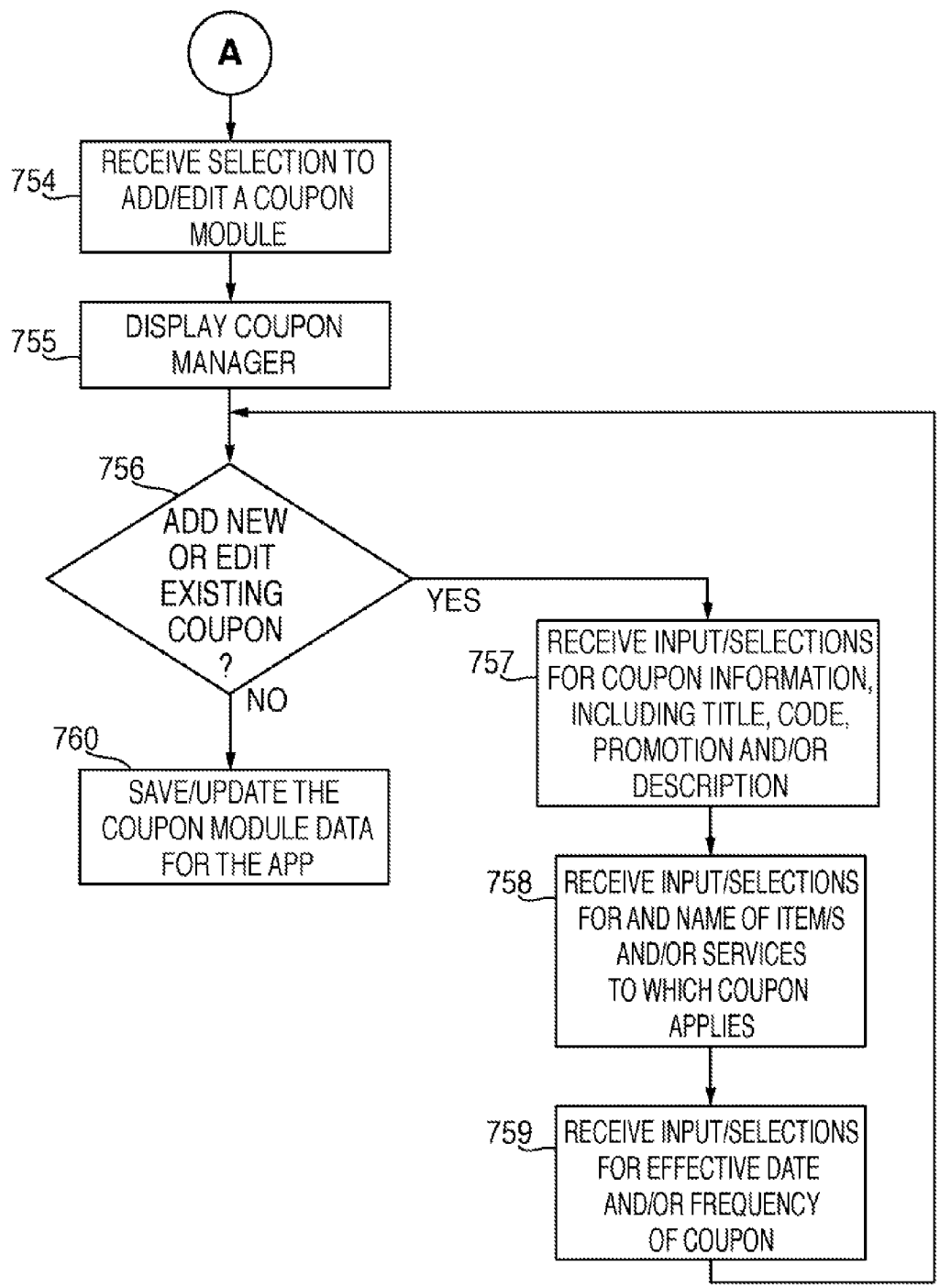
FIG. 35 is a flow diagram illustrating a process for customizing a coupons module for inclusion in a mobile app developed through the mobile development and distribution platform, according to certain embodiments.

FIG. 35 is a flow diagram illustrating a process for customizing a coupons module for inclusion in a mobile app developed through the mobile development and distribution platform, according to certain embodiments. In certain embodiments, developers may include a coupons module, such as to create, customize and modify coupons, rewards or the like to end users through the mobile app. As shown in FIG. 35, at step 754, the developer may select an option to add a coupons module to an app or edit an existing coupons module. In response, at step 755, the mobile development and deployment platform may activate a coupons manager to allow the developer create and customize the coupons module. The coupons manager is responsible for presenting the developer with various options associated with inputting, uploading, creating, and customizing certain features, content and options for the coupons and/or delivering the coupons to end users who have downloaded the mobile app. At step 756, a determination is made as to whether the developer wants to add a new, or edit an existing, coupon. If not, flow proceeds to step 760. Otherwise, the developer is prompted to input, select and/or upload various properties, content and design options for the coupon, such as a title, description, code, and/or promotion name at step 757. In certain embodiments, the developer may be allowed to select various layout or display options, such as how and where the coupon is displayed on the display of a mobile device. At step 758, the developer may be prompted to select and/or input the items (e.g., products and services) to which the coupon applies. At step 759 the developer may then be prompted to select and/or input various delivery options, such as the end users who are to receive the coupons and the date, time, frequency, and/or method of delivery. Flow then returns to step 756 to allow the developer to continue adding or editing coupons. Once the developer has finished creating and/or modifying the coupon module, at step 760, the developer's inputs and selections for the coupons module are then saved or updated for the mobile app in a similar manner to that described in connection with FIG. 9.

FIG. 36 is pictorial diagram illustrating a portion of the display of an application development environment including a coupons manager accessed by developers through the mobile development and distribution platform in accordance with certain embodiments. In certain of these embodiments, such as where the mobile development and distribution platform is accessed through a web based service, the coupons manager may be displayed in a manner similar to the display of the contacts manager described above. As shown in FIG. 36, the application development environment includes coupons manager window 761, which allows the developer to add, modify and customize coupons. Coupons manager window 761 may include one or more buttons such as add coupon button 762 depicted in FIG. 36, which the developer may select to add a new coupon. In certain embodiments, such as in response to the developer selecting add coupon button 762, coupons manager window 761 may present one or more input fields, such as coupon input fields 763 depicted in FIG. 36, which allow the developer to select, upload and/or input various information for the coupon.

In certain embodiments, such as where the application development environment includes a representation of the app on a mobile device, device representation 116 may include a representation of the display of the coupon module within the display of the mobile device. The coupon module displayed through device representation 116 may include a number of coupons and which allows the end users to browse through and/or select the coupons, such as to view additional information or use the coupon to purchase applicable items. As shown in FIG. 36, the coupon module may display a QR code or similar code, such as QR coupon code 764, associated with a coupon, which the end user may present at a physical store in connection with making a purchase.

Figure 37:
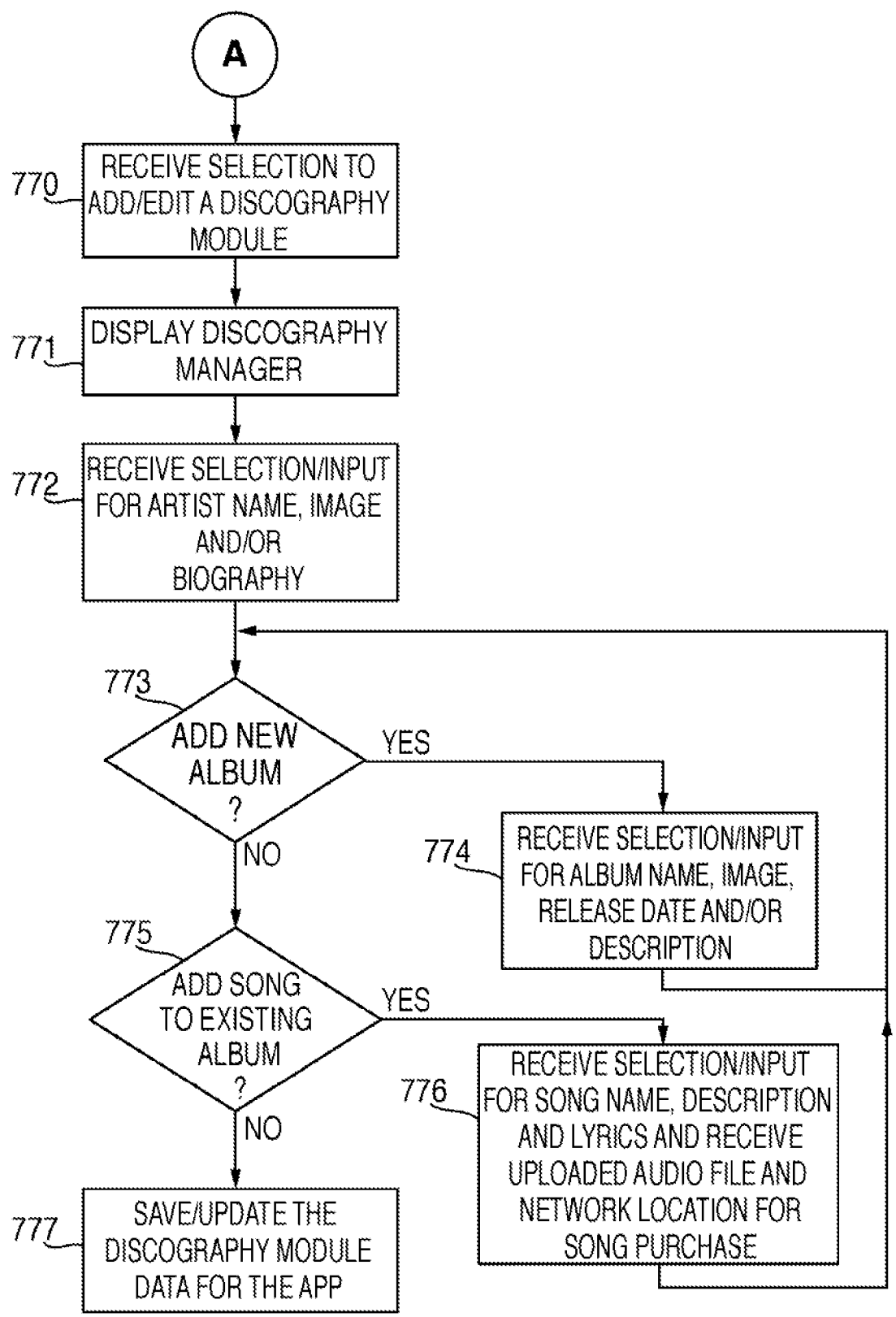
FIG. 37 is a flow diagram illustrating a process for customizing a discography module for inclusion in a mobile app developed through the mobile development and distribution platform, according to certain embodiments.

FIG. 37 is a flow diagram illustrating a process for customizing a discography module for inclusion in a mobile app developed through the mobile development and distribution platform, according to certain embodiments. In certain embodiments, developers may include a discography module, such as to provide information related to an artist and the artist's music or works of art to end users and/or allow end users to purchase the artist's music and other related items through the mobile app. As shown in FIG. 37, at step 770, the developer may select an option to add a discography module to an app or edit an existing discography module. In response, at step 771, the mobile development and deployment platform may activate a discography manager to allow the developer create and customize the discography module. The discography manager is responsible for presenting the developer with various options associated with inputting, uploading, creating, and customizing certain features, content and options associated with an artist or band. At step 772, the developer may input, select and/or upload various information for the artist, such as a name, description, biography, images, and similar information, and/or select various design options, such as the layout and order for displaying the artist's albums and songs.

At step 773, a determination is made as to whether the developer wants to add a new album or edit an existing album. If so, at step 774 the developer may be prompted to select and/or input various information associated with the album, such as a name, image, release date and/or description and flow returns to step 773. Otherwise, at step 775 a determination is made as to whether the developer wants to add a new song or edit an existing song. If so, the developer may then be prompted to select and/or input various information associated with the song at step 776, such as a name, description, lyrics, and the album or albums which include the song. In certain embodiments the developer may be prompted to upload an audio file for the song and/or input the network location where the song may be accessed. Flow then returns to step 773. Once the developer has finished adding and/or editing albums and songs, at step 777, the developer's inputs and selections for the discography module are then saved and/or updated for the mobile app in a similar manner to that described in connection with FIG. 9.

FIGS. 38 and 39 are pictorial diagrams illustrating a portion of the display of an application development environment including a discography manager accessed by developers through the mobile development and distribution platform in accordance with certain embodiments. In certain of these embodiments, such as where the mobile development and distribution platform is accessed through a web based service, the discography manager may be displayed in a manner similar to the display of the contacts manager described above. As shown in FIG. 38, the application development environment includes discography manager window 778, which allows the developer to add, customize and format various information associated with an artist and his or her works of art. Discography manager window 778 may include artist profile fields 779, into which the developer may input and/or select various information about the artist, such as a name, image and biography and one or more buttons, such as add album button 780 which the developer may select to add a new album, as depicted in FIG. 38. In certain embodiments, such as where the developer selects add album button 780, discography manager window 778 may include album input fields 781, which allow the developer to input and/or select various information associated with the album, such as a name, image and description and add track button 782, which allows the developer to add a song, as depicted in FIG. 39. Similarly, in certain of these embodiments, such as where the developer selects add track button 782, discography manager window 778 may include track input fields 783, which allow the developer to input and/or select various information associated with the song, such as a name, description, and lyrics, and upload or select an audio file for the song.

In certain embodiments, such as where the application development environment includes a representation of the app on a mobile device as shown in FIGS. 38 and 39, device representation 116 may include a representation of the display of the discography module within the display of the mobile device. As shown in FIG. 38, the discography module displayed through device representation 116 may include artist sub-window in 784 in which information about the artist is displayed, as well as number of sub-windows representing the artist's albums, such as album sub-window 785, which display certain information for each album (e.g., icon, name, etc.) and/or allow end users to select and access additional information abut the album, such as by clicking on or touching the album sub-windows. As shown in FIG. 39, in certain embodiments, such as in response to the developer selecting a particular album, the discography module displayed through device representation 116 may include an album window in which information about the album is displayed, as well as a number of sub-windows representing the songs included in the album, which may display certain information for each song (e.g., icon, description, etc.). In certain embodiments, the song sub-windows may include one or more buttons, such as play button 787 and/or buy button 786 as depicted in FIG. 39, which allow end users to play the song using preexisting audio output functionality available on the end user's mobile device and/or allow end users to purchase the song, such as by opening a link in a preexisting browser on the mobile device to a website where the song is available for purchase. In certain other embodiments, the developer may be able to include a purchase feature within discography module itself, such as in a similar manner to that described in connection with the ecommerce sub-module above.

Figure 40:
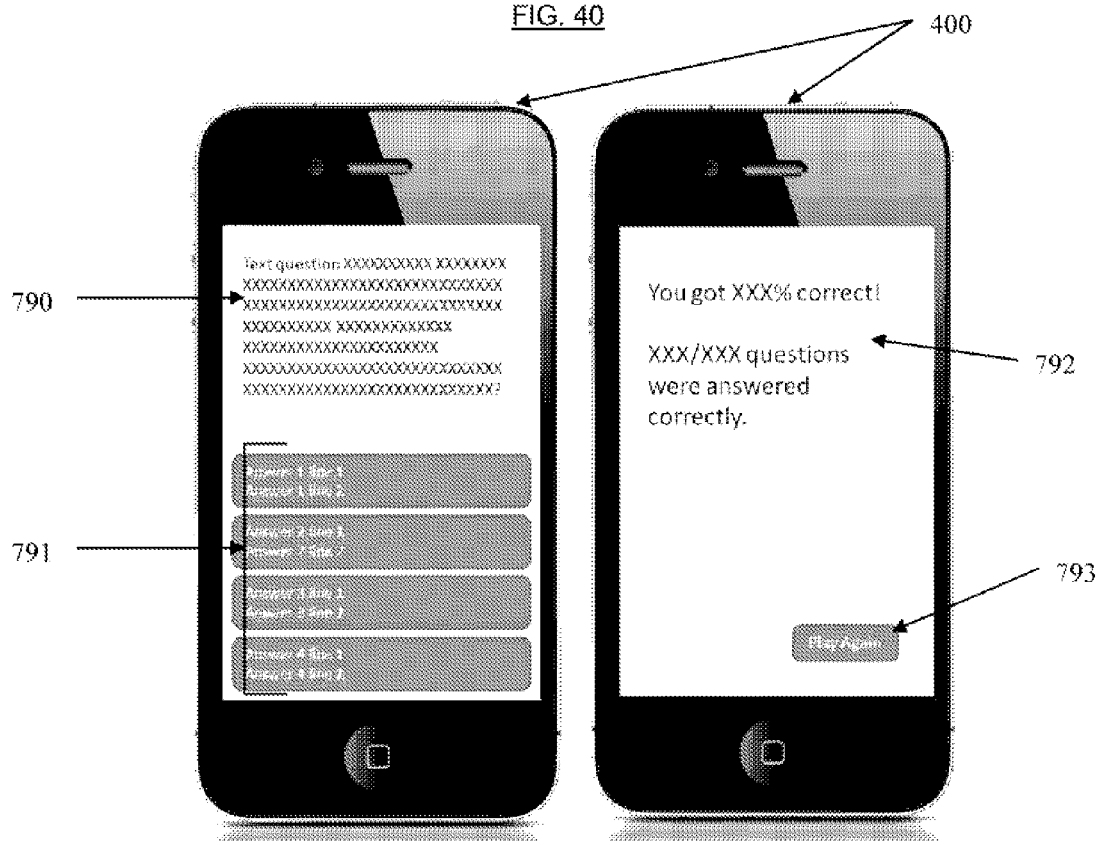
FIG. 40 is a pictorial diagram illustrating a portion of a mobile device displaying a mobile app having a quiz module, developed through the mobile development and distribution platform, according to certain embodiments.

In certain embodiments, the developer may include a quiz module that allows developers to create and modify a quiz or trivia game to include in the mobile app. The quiz module may include a quiz manager that allows the developer to input, select, combine and customize certain quiz items, and their content, design and layout, to be displayed by the mobile app to end users. For example, the developer may include one or more questions, which may be in various formats, such as multiple choice, short answer, etc. FIG. 40 is a pictorial diagram illustrating a portion of a mobile device displaying a mobile app having a quiz module, developed through the mobile development and distribution platform, according to certain embodiments. After launching the mobile app on mobile device 400 and accessing a quiz module, the quiz module may display a quiz to the end user within the display of the end user's mobile device. In certain embodiments, such as is illustrated in FIG. 40, the quiz module may display a quiz item, such as a multiple choice question, to the end user, which includes quiz question 790 and multiple choice answers 791. In certain of these embodiments, the end user may only be allowed to view one question at a time, answering each question in order and progressing through the quiz on a question-by-question basis. In certain other embodiments, the user may be able to navigate to specific questions and answer the questions in any desired order.

In certain embodiments, after the end user has completed the quiz the app may rate or grade the end user's answers, such as by comparing the answers to an answer key to determine how many questions the end user answered correctly As shown in FIG. 40, in certain embodiments, the quiz module may display a results page, which includes quiz results text 792 that presents the results of the quiz, such as by displaying a percentage score and/or the number of questions answered correctly. In certain of these embodiments, the results page may include play again button 793 which allows the end user to repeat the quiz. According to certain embodiments, the quiz module may allow the end user to compare his or her results with, and/or view, the results of other end users who have taken the quiz. In certain of these embodiments, the results of other end users may be presented in the form of a leader board or similar display. The end user may also, or alternatively, be allowed to view a subset of the results other end users, such as the results of the end user's friends.

Figure 41:
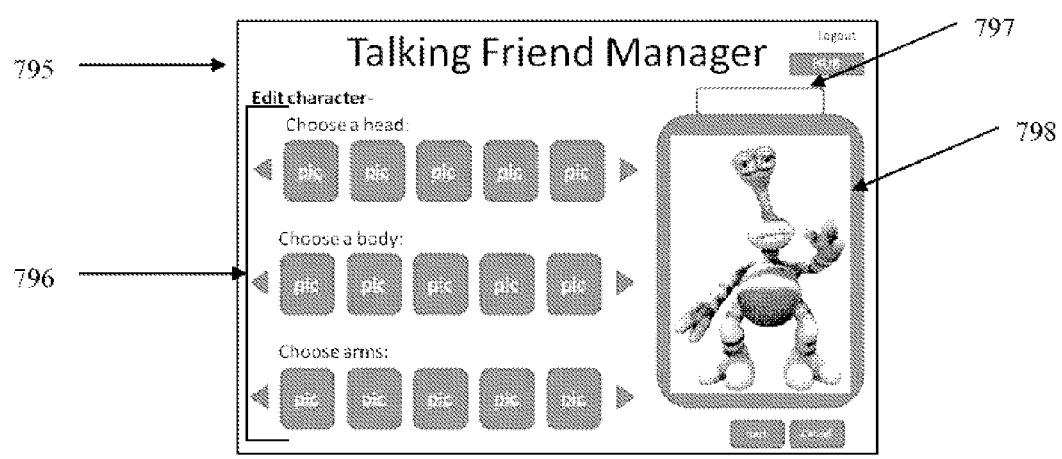
FIG. 41 is a pictorial diagram illustrating a portion of the display of an application development environment including a talking friend manager accessed by developers through the mobile development and distribution platform in accordance with certain embodiments.

In certain embodiments, the developer may include a talking friend module that allows developers to create, customize, and modify a "talking friend" to include in the mobile app. In certain embodiments, the talking friend module may receive speech input from an end user through the mobile device and output the speech in a particular voice. The talking friend module may allow the end user to interact with the module through various buttons, gestures and/or other inputs. In certain embodiments, the talking friend module may include a friend manager that allows the developer to input, select, combine and customize certain features, options and designs for the talking friend. FIG. 41 is a pictorial diagram illustrating a portion of the display of an application development environment including a talking friend manager accessed by developers through the mobile development and distribution platform in accordance with certain embodiments. In certain of these embodiments, such as where the mobile development and distribution platform is accessed through a web based service, the discography manager may be displayed in a manner similar to the display of the contacts manager described above. As shown in FIG. 41, the talking friend manager may present the developer with various options associated with creating, editing, and/or customizing the talking friend module in talking friend design window 795. Talking friend design window 795 includes talking friend characteristic selectors 796, which allows the developer to choose the visual and other characteristics of the talking friend, such as the characters head, body and arm types and talking friend name field 797, which allows the developer to input a name for the talking friend. In certain of these embodiments, talking friend design window 795 may updated and display the current representation of the character in real-time as the developer makes various selections, such as in talking friend representation window 798.

Figure 42:
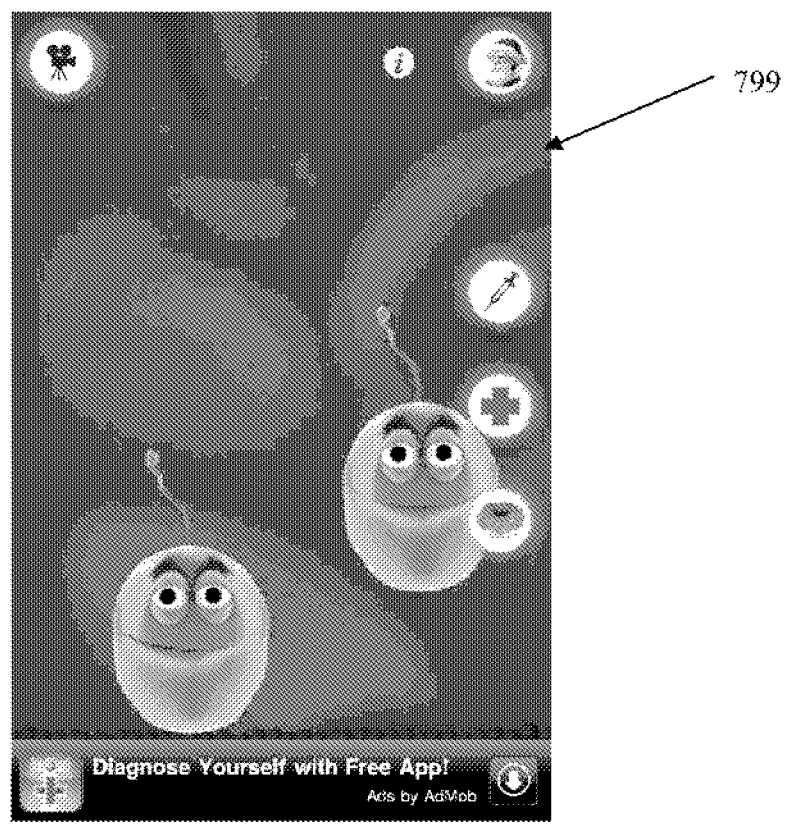
FIG. 42 is a pictorial diagram illustrating a portion of the display of a mobile app having a talking friend module, developed through the mobile development and distribution platform, according to certain embodiments.

In certain embodiments, the developer may select and input various other information associated with the talking friend, such as a description, voice type (e.g., pitch, speed, echo) etc., as well as the actions taken and responses provided by the talking friend based on certain end user inputs. For example, the developer may select and input various audio responses that are output in response to the end user touching or swiping the screen of the mobile device, shaking the mobile device, and/or speaking into the mobile device. In certain embodiments, the end user may be able to record and/or share a video or audio recording of the end user's interactions with the talking friend, such as by uploading the video to a social media website. FIG. 42 is a pictorial diagram illustrating a portion of the display of a mobile app having a talking friend module, developed through the mobile development and distribution platform, according to certain embodiments. As shown in FIG. 42, the talking friend module may display one or more talking friends to the end user in talking friend display window 799. In certain embodiments, talking friend display window 799 may include various buttons that the end user may select to interact with the talking friends and/or to record the end user's interactions with talking friends.

In certain embodiments, developers may be given the option to include a "share with friends" or similar functionality in mobile apps created and/or modified through the mobile development and deployment platform. In certain of these embodiments, the share with friends functionality allows end users to share information (e.g., comments, reviews, suggestions) about one or more mobile apps and/or modules, or other application components, design elements and/or content with other individuals. For example, end users may post the app or module related information to websites, such as social networking sites. As another example, the end user may send this information to one or more individuals directly, such as through email, text messaging, or similar functionalities provided by the end user's mobile device. In certain embodiments, the information may include information about the mobile app and/or module that the end user is currently viewing or accessing, as well as a message input or otherwise provided by the end user.

Other Types of Applications

While the description above has been focused on the creation, design and deployment of applications for mobile devices, it should be understood that the mobile development and deployment and corresponding systems and methods illustrated and described herein may also be used in connection with the creation and deployment of other types of applications in a similar manner. For example, the mobile development and deployment platform and application development environment illustrated and described in connection with FIGS. 1-42 could be used by developers to create, customize, modify and distribute web based applications, such as web apps that are included within social networking or other websites. After creating an application through the platform, the developer may be given the option to publish the application for the web. The platform may then generate a form of the application that can be incorporated within, and accessed through, a web page, such as by creating a flash or HTML based version of the application.

In certain embodiments, the web app may be in the form of an application for social networking site, such as a Facebook app. In certain of these embodiments, after creating the web app, the developer may be provided with a URL or similar link that can be utilized in the social networking site to provide end users with access to the web app. Alternatively, or in addition, the web app may be in the form of a website widget which allows the developer to include an interactive web app within a website, such as the developer's website that can be accessed from a web browser through the website. Similarly, the web app may be in the form of a mobile web app that may be designed primarily for use with mobile devices, and allows mobile device users to access the mobile web app via a website. In certain of these embodiments, the developer may be provided with a URL or similar link that can be placed on a website and which redirects mobile end users to the interactive web app. In certain embodiments, the social networking app, website widget and/or mobile web app may mimic the functionalities of a mobile app previously or concurrently developed by the developer through the mobile development and deployment platform and/or may appear to end users to be the same as or similar to the mobile app. In certain of these embodiments, the developer may be presented with the option to create one or more web apps based on a mobile app created by the developer through the mobile development and deployment platform.

Figure 43A:
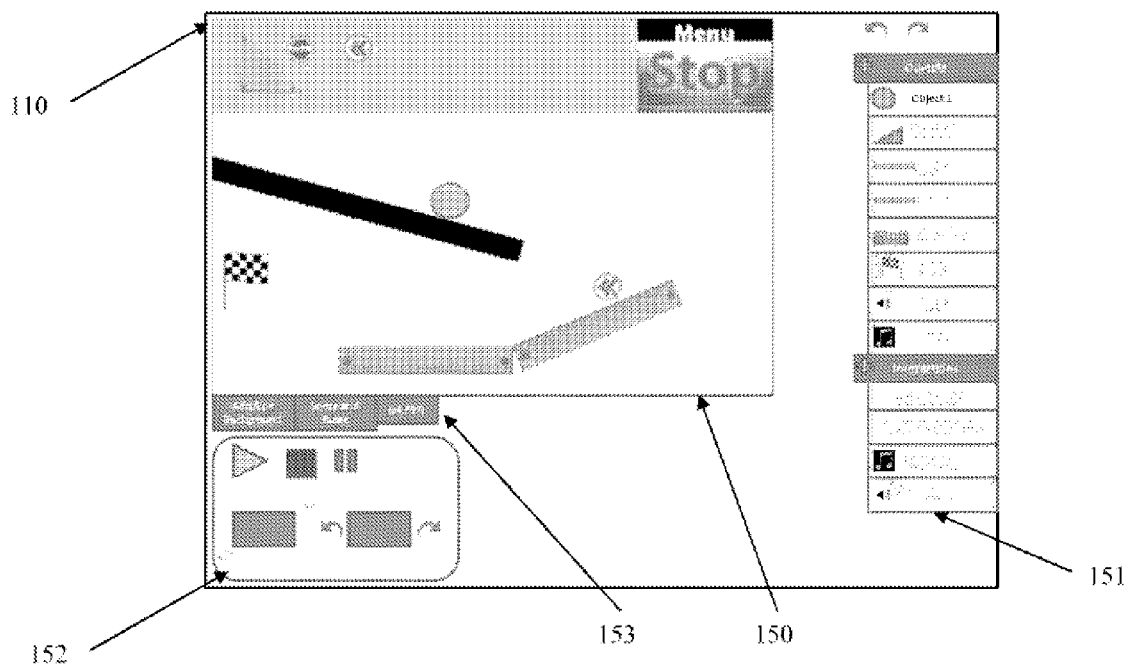
FIGS. 43A-43C are pictorial diagrams illustrating a portion of the display of a game development environment that may be used by developers to create, modify and customize mobile games through the mobile development and distribution platform in accordance with certain embodiments.
Figure 43B:
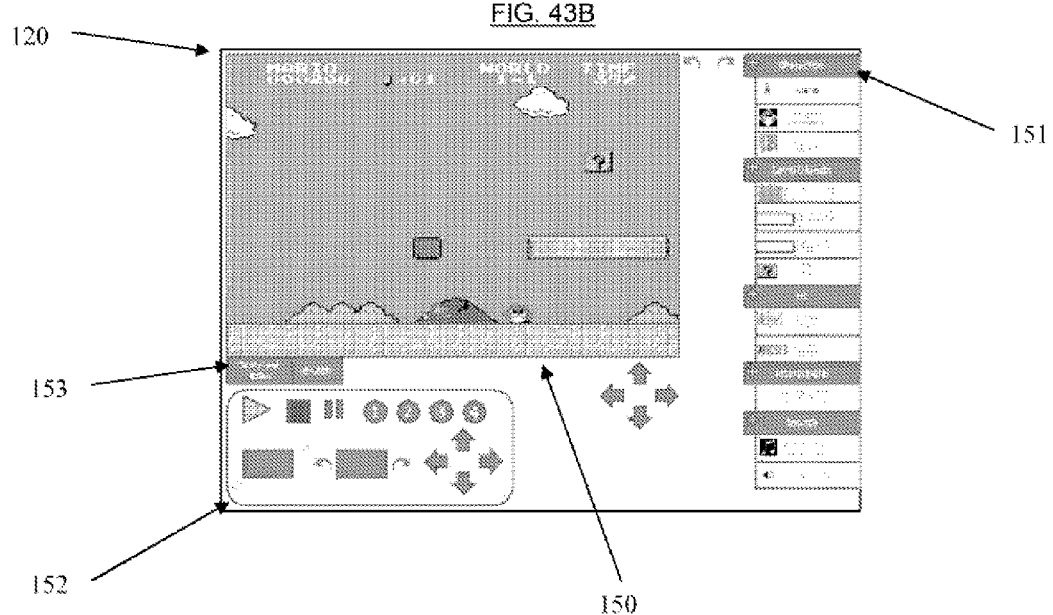
Figure 43C:
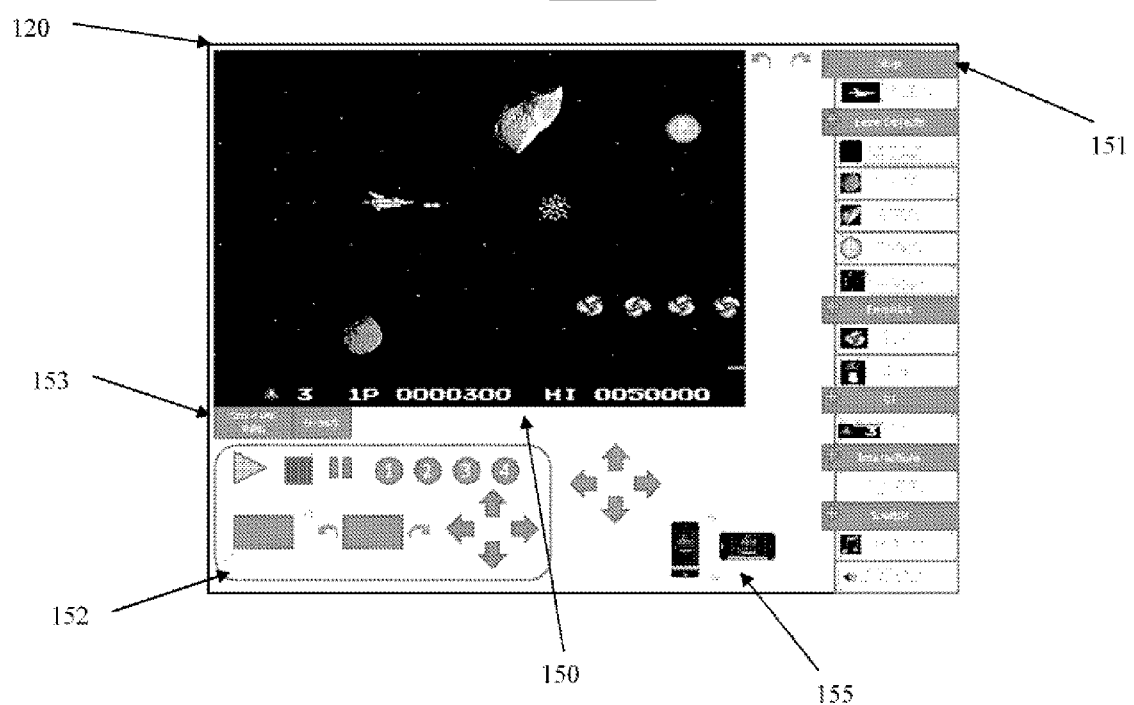

As another example, the mobile development and deployment platform and application development environment described herein could be used by developers to create, customize, modify and distribute games for mobile devices. FIGS. 43A-43C are pictorial diagrams illustrating a portion of the display of a game development environment that may be used by developers to create, modify and customize mobile games through the mobile development and distribution platform in accordance with certain embodiments. The mobile games may be created and distributed as separate apps or may be included as a module within existing apps. In certain embodiments, the game development environment may be in the form of a web based graphical interface with similar features and functionality to that of the mobile development environment described in connection with FIG. 2. The developer may create, modify and customize the mobile game by selecting, inputting, combining and modifying various features, content, components, and design elements associated with the mobile game.

In certain embodiments, the game development environment may allow developers to create, customize, update, and/or deploy their own physics-based and/or puzzle mobile games as depicted in FIG. 43A. In certain embodiments, the physics games created through the physics game module are broken down into a combination of game objects and their associated actions with respect to the game background and/or other game objects. Based on these interactions, a game or level score or goal may be reached by end users. In accordance with certain of these embodiments, the developer may be allowed to create and/or select certain main components for the physics mobile game: backgrounds, game objects and game object interactions.

As shown in FIG. 43A, the game development environment may display various options to the developer in connection with the design, creation and customization of a physics mobile game in a game development window, such as development window 110 depicted in FIG. 2. For example, development window 110 may include game object menu 151, which includes a list of predefined game objects that may be selected by the developer. In certain embodiments, the developer may also, or alternatively, be able to create custom game objects for inclusion in the game. Development window 110 may include game object interaction selector 152, which allows the developer to specify how certain objects interact with the background and other game objects, such as by moving the objects through the course of the game play and setting rules for the interaction between game objects.

In certain embodiments, as shown in FIG. 43A, development window 110 may present the developer with a simulated display of the current state of the physics game in game display window 150 and/or allow the developer to "play" the game as the developer proceeds through the game development process. In certain embodiments, development window 110 may include game settings buttons 153, which allow the developer to select, upload, and/or input various settings for the game, such as uploading a background image, and selecting various rules and scoring methods and values. After the developer has completed the game design and development process, the mobile game may be saved, compiled and distributed in a manner similar to that described in connection with FIGS. 1-5. In certain of these embodiments, the mobile game may be compiled using one or more preexisting physics engines. In certain of these embodiments, the developer may be able to select the orientation of the mobile device display on which the mobile game is intended to execute.

In certain embodiments, the game development environment may allow developers to create their own platforming mobile games (e.g., Super Mario Brothers) as depicted in FIG. 43B. In certain of these embodiments, the developer may allowed to create and/or select certain main components for the platforming mobile game, including character objects, level objects, user interface elements, rules, interactions, and sounds. In certain of these embodiments, the developer may select and modify various sub-objects or sub-components associated with these main components. For example, the developer may add a "hero" object to the game, which the end user is intended to navigate through the game to reach a goal. As shown in FIG. 43B, in certain embodiments, the game development environment may display various options to the developer in connection with the design, creation and customization of a platforming mobile game and the developer may select, modify and combine the various components, design elements, and features for the game in a manner similar to that described above in connection with FIG. 43A.

In certain embodiments, the game development environment may allow developers to create their own shooter mobile games. For example, the shooter game module may allow the developer to create side-scrolling space shooter game, as depicted in FIG. 43C. In certain of these embodiments, the developer may allowed to create and/or select certain main components for the shooter mobile game, including hero objects, level objects, enemy objects, user interface elements, rules, interactions, and sounds. In certain of these embodiments, the developer may select and modify various sub-objects or sub-components associated with these main components. For example, the developer may add a hero object and multiple enemy objects to the game, with the purpose of having the end user destroy the enemy objects with the hero object in order to reach an end goal. As shown in FIG. 43C, in certain embodiments, the game development environment may display various options to the developer in connection with the design, creation and customization of a shooter mobile game and the developer may select, modify and combine the various components, design elements, and features for the game in a manner similar to that described above in connection with FIG. 43A. In certain of these embodiments, the developer may be able to select the orientation of the mobile device display on which the mobile game is intended to execute, such as by selecting game orientation buttons 155 depicted in FIG. 43C.

Gesture Interface of Mobile App Development Tool

Figure 44:
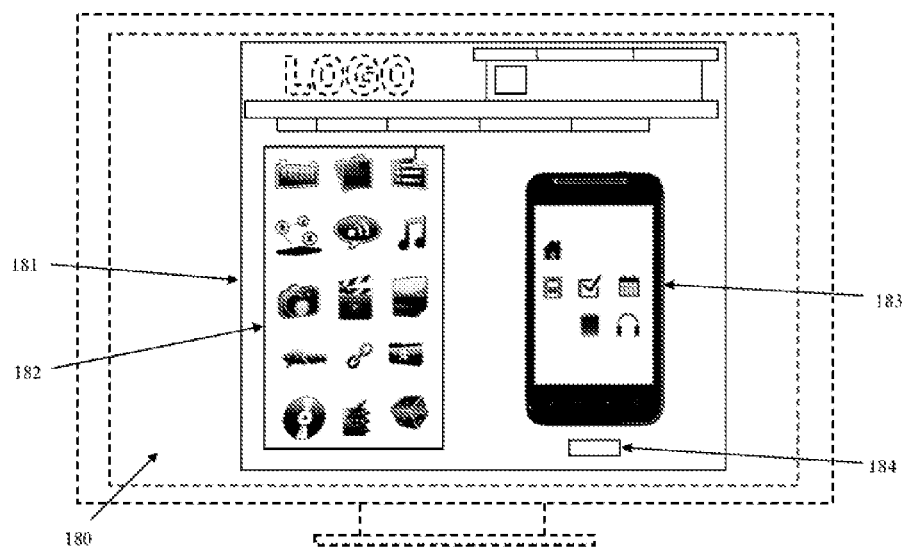
FIG. 44 is a schematic illustrating a portion of an application development environment of a mobile development and distribution platform according to certain embodiments.

FIG. 44 is a schematic illustrating a portion of an application development environment of a mobile development and distribution platform according to certain embodiments. The particular display shown in FIG. 44 is an exemplary illustration of a web tool in the form of a website that may be presented to developers in order to allow them to design and develop mobile apps, and may be similar to the web tool illustrated in FIG. 2 and described above. In certain of these embodiments, the application development environment may be provided by server 200 and/or the mobile development service and accessed by a developer using developer computer 100 as illustrated and described in connection with FIG. 1.

As shown in FIG. 44, in certain embodiments, the mobile development environment may be displayed to the developer on a touch screen display associated with developer computer 100, such as touch screen display 180. Touch screen display 180 may be any form of a suitable touch screen display, such as a resistive touch screen display or a capacitive touch screen display. Touch screen display 180 can support human-computer interaction through the developer's fingers, fingertips, and/or a stylus. In certain embodiments, touch screen display 180 is capable of receiving input from the developer through simple or multi-touch gestures by the developer touching the screen with one or more fingers, respectively. For example, touch screen display 180 can be a touch screen display built into developer computer 100, such as in an all-in-one desktop computer, a touch screen portable computer (e.g., a touch screen notebook computer), or a tablet computing device.

According to certain embodiments, touch screen display 180 may present the mobile development environment in a display window, such as development window 181. Development window 181 may be similar to development window 110 (FIG. 2), and may be any form of display suitable for presenting the mobile development environment to the developer. Touch screen display 180 may be used by the developer to interact with various visual components of a graphical user interface in development window 181. Development window 181 may present the developer with a graphical user interface in the form of a web application or a stand-alone software application. In certain embodiments, touch screen display 180 allows the developer to interact with the mobile development environment to select, arrange, modify, and/or delete certain predefined application components, content elements, and/or design elements for the mobile app in an intuitive and user-friendly manner using touch gestures.

As shown in FIG. 44, in certain embodiments, development window 181 may include a sub-window, such as component window 182 for displaying one or more application components, design elements, content elements, and/or various settings or options to the developer. Development window 181 may also include a graphical representation of one or more mobile devices, such as device representation 183. Device representation 183 may provide a visual representation to the developer of certain application components, content elements, and/or design elements, such as app-types, mobiles, layouts, and themes, and how such components are included, arranged, presented, and/or function on the represented mobile device. The developer may perform certain touch gestures on components included in component window 182 and device representation 183 to select, arrange, modify, and/or delete those components, and/or to receive additional information about those components.

For example, the developer may touch an icon (or other graphical representation) representing a component in component window 182 and/or device representation 183 to see additional information about the component, such as a description of the component and/or the functionalities associated with the component. As another example, the developer may touch an icon and drag it from component window 182 to device representation 183 to add the component represented by that icon to the mobile app, or may drag an icon from device representation 183 to component window 182 to remove the component represented by that icon from the mobile app. In other examples, the developer may perform different gestures, such as a double tap, or a two finger swipe to add or remove components from the mobile app. As an additional example, the developer may touch and drag an icon in device representation 183 to arrange the location of the component in the mobile app.

In certain embodiments, when a developer creates a new app, the mobile development environment may present the developer with a number of icons representing app-types in component window 182 and may allow the developer to select a desired app-type from the presented app-types, such as restaurant apps, law firm apps, magazine apps, blogging apps, doctor apps, museum apps, etc., for inclusion in the mobile app. The developer may perform a certain gesture, such as touching an icon representing an app-type, to see additional information about the app-type, such as a description of the app-type and various pre-defined components and/or functionalities associated with that app-type. The developer may select an app-type for the mobile application by touching an icon representing that app-type in component window 182 and dragging the icon to device representation 183. In certain embodiments, the developer may perform a gesture on device representation 183 to modify the appearance of the mobile app. For example, the developer may perform a multi-finger rotation or a multi-finger swipe on device representation 183 to modify the color scheme used in the mobile app and/or to modify the splash screen to be used by the mobile app.

In certain embodiments, the developer may change from one stage of the application development process to another stage by performing a gesture on development window 181. For example, the developer may perform a three-finger swipe down to advance from a first stage of initial app-type, in which in component window 182 may include a presentation of the available app-types, as described above, to a second stage of adding and editing modules, in which component window 182 may include a presentation of the available modules. Upon advancing from one stage of the application development process to the next stage, device representation 183 may also change to display icons or other information associated with the updated development stage. As another example, the developer may perform a three-finger swipe up to go back to a prior development stage.

According to certain embodiments, the mobile development platform may present the developer with a number of icons representing modules in component window 182 and may allow the developer to select a desired module for inclusion in the mobile app. For example, the developer may perform a certain gesture, such as touching and dragging the icon from component window 182 to device representation 183, and positioning the icon in device representation 183 to create the desired arrangement of module icons for the mobile app. In certain embodiments, the developer may double tap on an icon representing a module in device representation 183 to edit the selected module. When editing a module, in certain embodiments, the mobile development platform may allow the developer to arrange and/or resize elements using gestures such as dragging or a two-finger pinch to zoom in or out. For example, when editing a photo module, as illustrated in FIG. 27 and described above, the mobile development platform may allow the developer to modify the location and/or size of a photo represented in device representation 183, such as by dragging the photo to a new location in device representation 183 or by using a two-finger pinch gesture to resize the photo. As another example, when editing a form module, as illustrated in FIG. 20 and described above, the mobile development platform may allow the developer to resize various form fields and buttons, such as text area 674 (FIG. 20) and/or button 675 (FIG. 20), such as by performing a dragging gesture or a two-finger pinch gesture.

In certain embodiments, development window 181 may include a button 184, which the developer may select, such as by a tapping gesture, to allow the developer to configure which gestures are associated with certain actions. The mobile development environment may allow the developer to reconfigure the mapping between a set of gestures and a set of actions to a new mapping between the set of gestures and the set of actions. For example, certain developers with limited mobility or a physical disability may be unable to perform certain gestures, such as a two-finger rotation or a three-finger swipe. Certain other developers may prefer a different set of gestures fore ease-of-use or convenience than those gestures provided by default in the mobile development platform. Such developers may configure the mobile development platform to be controlled with a different set of gestures. For example, the mobile development platform may allow the developer to associate certain available actions with certain recognizable gestures, thus allowing the developer to customize the human-computer interface for greater accessibility and/or convenience.

Figure 45A:
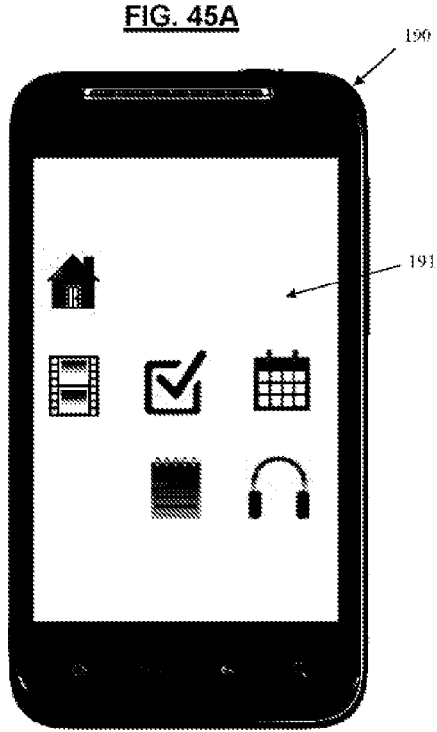
FIGS. 45A-45B are pictorial diagrams illustrating a portion of an application development and distribution platform running on a mobile device according to certain embodiments.
Figure 45B:
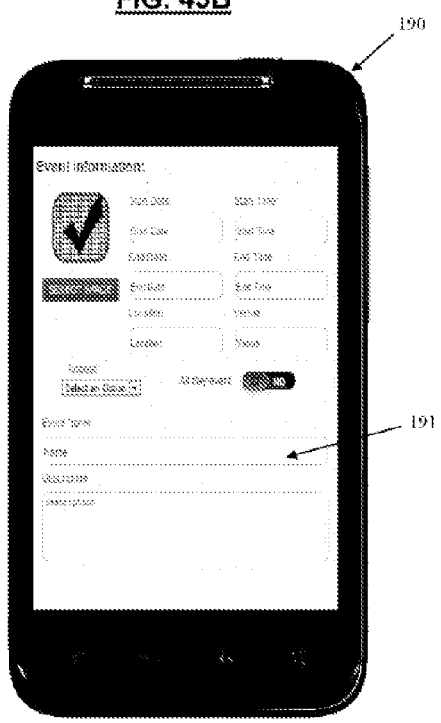

According to certain other embodiments, the display window presenting the mobile development environment to the developer may be on a touch screen of a smaller size, such as when developer computer 100 is a mobile device. In such embodiments, the display window for the mobile development environment may be similar to device representation 183, and the mobile development environment may allow the developer to alternate between certain display screens, such as a screen showing a graphical representation of the mobile app's appearance (such as in device representation 183) and other screens showing customization managers or component selection displays (such as in component window 182). FIGS. 45A and 45B are pictorial diagrams illustrating a portion of an application development environment of a mobile development and distribution platform running on a mobile device according to certain embodiments. The mobile development and distribution platform may include a developer computer, such as mobile device 190, which may include a touch screen display 191 displaying the graphical representation of the mobile app with icons for various modules included in the mobile app, as illustrated in FIG. 45A. The developer may, for example, double tap on a module icon to open a screen displaying a customization manager for editing the module's design, components, or functionality. For example, a developer may perform a gesture, such as a double tap on an events module icon (on touch screen display 191 of FIG. 45A) to open a screen on touch screen display 191 of an events manager form, as illustrated in FIG. 45B, thus allowing the developer to enter a new event. Alternatively, or in addition, the developer may, for example, touch and hold the module icon to display a screen allowing the developer to replace the module with another module from a list of displayed module icons, or to remove the module from the mobile app. In a similar manner, the mobile development environment may provide a touch screen interface on a smaller touch screen display, such as on a mobile device.

Voice Interface of Mobile App Development Tool

Figure 46:
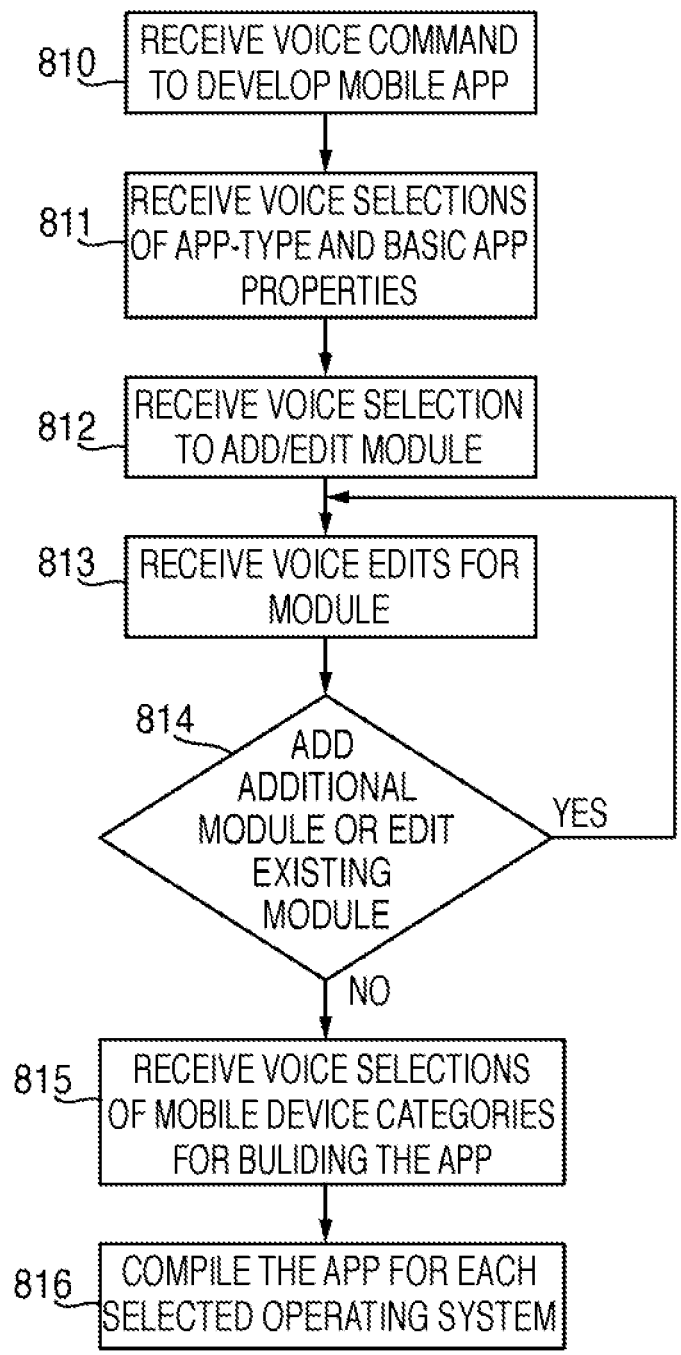
FIG. 46 is a flow diagram illustrating a process for developing a mobile application through the mobile development platform through a voice interface in accordance with certain embodiments.

FIG. 46 is a flow diagram illustrating a process for developing a mobile application through the mobile development platform through a voice interface in accordance with certain embodiments. The mobile development and distribution platform, in certain embodiments, may allow a developer to create a mobile application using voice interaction in place of or in addition to other forms of human-computer interaction, such as using pointing devices, keyboard input devices, and/or touch screen displays. In certain embodiments, the mobile development environment may also provide interactive audio output to the developer. Such embodiments may assist visually impaired developers to create mobile application without the need to view the mobile development environment. At step 810, after a developer has accessed the mobile development environment on developer computer 100, such as through voice command functionality provided by certain operating systems, through accessibility application interfaces, or through traditional means as described above in connection with FIG. 3, the mobile development environment may receive a voice command from the developer to develop a new mobile app or update an existing mobile app.

The mobile development environment may include a voice interaction interface with a voice recognition engine. In certain embodiments, the mobile development environment may support a list of pre-defined commands that a developer may speak to initiate one or more associated procedures in the mobile development environment. In certain other embodiments, or in addition, the mobile development environment may provide an audio menu at each step, such as providing a spoken list of choices to the developer and waiting to receive voice commands selection of one of the choices. In yet certain other embodiments, the mobile development environment may include an intelligent software assistant that engages with the developer in an integrated, conversational manner using a spoken natural language dialog. The intelligent software assistant may recognize functions or operations to perform based on voice specifications provided by the developer during the natural language dialog, or may recognize functions or operations to perform automatically based on the context of the dialog. The intelligent software assistant may thus be used as a voice control interface providing a natural, user-friendly, and/or accessible interface to the developer.

In response to the developer providing, through the voice interface, a selection to develop a new or existing application, the mobile development environment may, in certain embodiments, provide an audio list of options related to the app, such as pre-defined app-type and basic app properties (e.g., name, color theme, target mobile device categories or types, and/or icon or splash screen images to be displayed). In certain other embodiments, as described above, the mobile development environment may provide a natural language dialog or simply wait for additional voice commands. At step 811, the mobile development environment may receive voice selections of an app-type and basic app properties. For example, the developer may orally state, "I would like to create a new mobile app," whereupon the mobile development environment may reply, "Okay, what type of application would you like to create?" The developer may respond, "I own a restaurant," upon which the mobile development environment may recognize that the developer would like to develop a mobile app with app-type of appRestaurant. The mobile development environment, in a similar manner, may receive selections for the basic app properties.

In certain embodiments, such as after the developer vocally selects an app-type and/or vocally selects certain basic application properties, the mobile development environment may provide an audio listing of the current modules and/or application design elements, such as themes and layouts, that are part of the mobile application. For example, if the developer created a new app with a certain app-type, the mobile development environment may provide an audio listing of the default modules included in the mobile app, which may be based on the selected app-type. In certain embodiments, the developer may issue a voice command to edit one of the modules or to add an additional module. In certain other embodiments, the mobile development environment may, for each module and/or application design elements, ask the developer if the developer would like to edit that module and/or application design element. The mobile development environment may also ask the developer whether the developer would like to add a new module or delete an existing module. In certain further embodiments, the mobile development environment may use a natural language dialog to ask the developer about the type of mobile app the developer would like to create and the features, design, and/or functionality the developer would like to employ. At step 812, the mobile development environment may receive a voice selection from the developer to add or edit a module or application design element.

In response, the mobile development environment may allow the developer to input or modify certain options associated with the selected module or application design element, such as content elements, settings, features, or associated sub-components. For example, after the developer issues a voice command to edit a certain pre-defined module, such as a menu module, the mobile development environment may provide an audio listing of choices, such as editing the existing menu items, changing the design or layout of the existing menu items, or adding new menu items. As another example, the mobile development environment may conduct a natural language dialog regarding the layout of the menu and the items to be included on the menu, asking additional details as necessary. In certain embodiments, the mobile development environment may also display a graphical representation of the modules and/or design elements the developer has created, as shown in FIGS. 2, 44, 45, and 46, and described above. In certain other embodiments, or in addition, the mobile development environment may provide a descriptive audio listing of the modules, design elements, sub-components, etc. The mobile development environment may allow the developer to customize or configure the level of audio description provided, such that the developer may receive the level of audio description detail desired, for example, based on factors such as the profoundness of the developer's visual impairment. Specifically, in certain embodiments, the mobile development environment may allow a developer to configure the level of audio output to only include a subset of the detailed description of the plurality of customizable components. At step 813, the mobile development environment receives the voice edits for the module or application design element, as the developer provides one or more voice inputs, selections, and/or commands. The mobile development environment saves certain selections, updates, and/or inputs provided by the developer during the development process, as described above.

At step 814, the mobile development environment may determine whether the developer wants to add an additional module or edit an existing module. In certain embodiments, the mobile development environment may prompt the developer through an audio prompt or through a natural language dialog. In certain other embodiments, the mobile development environment may wait until the developer issues a voice command. If the mobile development environment determines that the developer wants to add an additional modules or edit an existing module, flow returns to step 813 and the developer can provide voice edits for the module and/or application design element. Otherwise, in certain embodiments, the mobile development environment may prompt the developer (e.g., through an audio menu or through natural language dialog) to vocally select one or more mobile device categories, mobile device types, and/or particular mobile device models on which the app is intended to run. In certain other embodiments, the mobile development environment may wait until the developer issues such a voice command. At step 815, the mobile development environment may receive voice selections of the mobile device categories, types, and/or models for which to build the app. At step 816, as described above, the mobile development environment may build and compile the app for the mobile device categories, types, or modules selected by the developer, as explained above.

It should be understood that the order of the steps illustrated in FIG. 46 and described herein are merely exemplary and the order or combination in which various steps (such as receiving voice selections of app-type and basic app properties, and receiving voice selections of mobile device categories for building the app) may be modified or may be performed in any order or combination that is appropriate or desired by the developer or mobile development platform provider. It should also be understood that portions of the procedure in FIG. 46 (including various voice selections) may be implemented through other appropriate steps or other appropriate input or human-computer interface methods, such as those described above in connection with FIGS. 2-3, and 44-45B. For example, in certain embodiments, the developer may provide input partially through voice interaction, partially through touch screen gestures, partially through keyboard input, and/or partially through pointing device input.

Thus, the systems and methods described herein allow non-technical users to build cross-platform mobile applications that utilize various features and functions, including features specific to particular mobile operating systems and mobile devices through a user-friendly, software tool with a robust human-computer interface, including a gesture interface and/or a voice interface. Accordingly, developers may design, build, and deploy highly-customizable and sophisticated mobile apps without the need for technical expertise in computer programming or mobile operating systems and devices, and may develop such applications through an intuitive and user-friendly manner of providing touch gestures or voice commands. Moreover, the mobile development and distribution platform may allow those with limited hand mobility or visual impairment to provide sophisticated mobile apps through these accessible interfaces.

It is understood that the various systems and methods described in connection with the foregoing figures are exemplary, and any other suitable systems or methods may be used. The foregoing is merely illustrative of the principles of this invention and various modifications can be made by those skilled in the art without departing from the scope and spirit of the invention. As an example, although certain embodiments of the mobile development platform have been described in connection with certain predefined app-types and modules associated with particular features and functions that may be included in mobile apps developed through the platform, the platform may provide any number, manner and type of predefined application components and subcomponents which may be associated with any one or more features, functionalities or content. One skilled in the art will appreciate that the present invention can be practiced in other than the described embodiments, which are presented for purposes of illustration and not limitation, and the present invention is limited only by the claims which follow.

What is claimed is:

1. A system for allowing users to use voice commands to develop mobile applications or portions thereof that are capable of being compiled to run on a plurality of mobile operating systems, the system comprising:
   a computing device having physical memory storing instructions that cause the computing device to:
      provide a mobile application development platform adapted to assist users, including visually-impaired users, with the development and customization of mobile applications, wherein the mobile application development platform represents application data associated with a mobile application in accordance with a data model that defines relationships among a hierarchy of tables including:
         a head table that is used to represent an instance of the mobile application and that includes an identifier for the mobile application;
         an app type table that includes a first set of attributes for one or more templates that can be applied to the mobile application; and
         a module table that includes a second set of attributes that are used to represent one or more customizable components included in the mobile application;
      receive a first set of voice commands from a user to develop the mobile application through the mobile application development platform, the first set of voice commands at least identifying an application type property that identifies a template included in the app type table;
      query one or more of the tables in the data model to identify a plurality of customizable components that are available for use with the identified template;
      send information associated with the plurality of customizable components to be presented to the user through a set of audio outputs, the plurality of customizable components pertaining to a functionality, design and content of a mobile application to be developed by the user;
      receive from the user through a second set of voice commands a plurality of customizable component selections pertaining to the plurality of presented customizable components;
      associate application data with the mobile application based, at least in part, on the plurality of customizable component selections received from the user through the second set of voice commands, the application data representing user-defined functionality, design and content for the mobile application;
      store the application data associated with the mobile application in accordance with the data model;
      generate compiled data for the mobile application based on the stored application data using build tools associated with at least one mobile operating system selected by the user through a third set of voice commands, wherein generating compiled data includes querying a database that stores the tables associated with the data model to retrieve information associated with the mobile application and including at least a portion of the retrieved information in a configuration file; and
      generate the configuration file comprising the identifier for the mobile application, the configuration file being adapted for transmission to, and execution on, a mobile device running the at least one mobile operating system;
   wherein the identifier enables the retrieval of at least a portion of the compiled application data by the mobile device in response to the mobile application being installed on or executed by the mobile device.

2. The system according to claim 1, wherein the mobile application development platform includes a web based service accessed by the user through the Internet.

3. The system according to claim 1, wherein the mobile application development platform is accessed through a software application installed on a computer associated with the user.

4. The system according to claim 1, the physical memory storing instructions that further cause the computing device to receive from the user through a fourth set of voice commands one or more identifying properties for the mobile application.

5. The system according to claim 4, wherein the one or more identifying properties are selected from the group consisting of a name, a type, a category, a description, a unique identifier, and a date.

6. The system according to claim 1, wherein the second set of voice commands comprises one or more voice commands from a pre-defined list of voice commands supported by the mobile application development platform.

7. The system according to claim 1, wherein the second set of voice commands comprises a one or more voice responses to an audio menu output presented by the mobile application development platform.

8. The system according to claim 1, wherein the second set of voice commands comprises voice specifications provided by the user during a natural language dialog with the mobile application development platform.

9. The system according to claim 1, wherein the set of audio outputs comprises a user-configurable subset of a detailed audio description of the plurality of customizable components pertaining to the functionality, design and content of the mobile application.

10. A method for developing and customizing mobile applications or portions thereof that are compiled to run on a plurality of mobile operating systems, the method being implemented through instructions stored in a physical memory associated with a computing device, which cause the computing device to perform the steps of:
   providing a mobile application development platform adapted to assist users with the development and customization of mobile applications, wherein the mobile application development platform represents application data associated with a mobile application in accordance with a data model that defines relationships among a hierarchy of tables including:
      a head table that is used to represent an instance of the mobile application and that includes an identifier for the mobile application;
      an app type table that includes a first set of attributes for one or more templates that can be applied to the mobile application; and
      a module table that includes a second set of attributes that are used to represent one or more customizable components included in the mobile application;
   receiving at the computing device a first set of voice commands from a user to develop the mobile application, the first set of voice commands at least identifying an application type property that identifies a template included in the app type table;
   querying one or more of the tables in the data model to identify a plurality of customizable components that are available for use with the identified template;

presenting the plurality of customizable components to the user through a set of audio outputs, the plurality of customizable components pertaining to functionality, design and content of the mobile application to be customized by the user;

receiving from the user through a second set of voice commands at the computing device a plurality of customizable component selections pertaining to the plurality of presented customizable components;

associating application data with the mobile application based, at least in part, on the plurality of customizable component selections, the application data being stored in the physical memory associated with the computing device;

storing the application data associated with the mobile application in accordance with the data model;

generating at the computing device compiled data for the mobile application based on the application data using build tools associated with at least one mobile operating system selected by the user through a third set of voice commands, wherein generating compiled data includes querying a database that stores the tables associated with the data model to retrieve information associated with the mobile application and including at least a portion of the retrieved information in a configuration file; and generating at the computing device the configuration file comprising the identifier for the mobile application, the configuration file being adapted for transmission to, and execution on, a mobile device running the at least one mobile operating system;

wherein the identifier enables the retrieval of at least a portion of the compiled application data by the mobile device in response to the mobile application being installed on or executed by the mobile device.

11. The method according to claim 10, wherein the instructions stored in the physical memory associated with the computing device further cause the computing device to perform the steps:

receiving a fourth set of voice selections from the user of one or more identifying properties from the mobile application selected from the group consisting of a name, a type, a category, a description, a unique identifier, and a date.

12. A system for allowing users to use touch gestures to develop mobile applications or portions thereof that are capable of being compiled to run on a plurality of mobile operating systems, the system comprising:

a computing device comprising a touch screen display, the computing device further having physical memory storing instructions that cause the computing device to:

provide a mobile application development platform adapted to assist users with the development and customization of mobile applications, wherein the mobile application development platform represents application data associated with a mobile application in accordance with a data model that defines relationships among a hierarchy of tables including:

a head table that is used to represent an instance of the mobile application and that includes an identifier for the mobile application;

an app type table that includes a first set of attributes for one or more templates that can be applied to the mobile application; and a module table that includes a second set of attributes that are used to represent one or more customizable components included in the mobile application;

receive a request from a user through one or more first gestures to develop the mobile application through the mobile application development platform, the one or more first gestures at least identifying an application type property that identifies a template included in the app type table;

query one or more of the tables in the data model to identify a plurality of customizable components that are available for use with the identified template;

send information associated with the plurality of customizable components to be presented to the user, the plurality of customizable components pertaining to a functionality, design and content of a mobile application to be developed by the user;

receive from the user through one or more second gestures a plurality of customizable component selections pertaining to the plurality of presented customizable components;

associate application data with the mobile application based, at least in part, on the plurality of customizable component selections received from the user through the one or more second gestures, the application data representing user-defined functionality, design and content for the mobile application;

store the application data associated with the mobile application in accordance with the data model;

generate compiled data for the mobile application based on the application data using build tools associated with at least one mobile operating system selected by the user through one or more third gestures, wherein generating compiled data includes querying a database that stores the tables associated with the data model to retrieve information associated with the mobile application and including at least a portion of the retrieved information in a configuration file; and generate the configuration file comprising the identifier for the mobile application, the configuration file being adapted for transmission to, and execution on, a mobile device running the at least one mobile operating system;

wherein the identifier enables the retrieval of at least a portion of the compiled application data by the mobile device in response to the mobile application being installed on or executed by the mobile device.

13. The system according to claim 12, wherein the mobile application development platform includes a web based service accessed by the user through the Internet.

14. The system according to claim 12, wherein the mobile application development platform is accessed through a software application installed on a computer associated with the user.

15. The system according to claim 12, wherein the touch screen display of the computing device is configured to receive user input through at least one of simple gestures or multi-touch gestures.

16. The system according to claim 12, wherein the information associated with the plurality of customizable components is presented to the user as graphical elements on the touch screen display.

17. The system according to claim 16, the physical memory storing instructions that further cause the computing device to:

receive one or more fourth gestures performed by the user on the graphical elements of the touch screen display to modify the plurality of customizable components; and modify the application data associated with the mobile application, based on the modifications to the plurality of customizable components.

18. The system according to claim 17 wherein the one or more fourth gestures performed by the user on the graphical elements of the touch screen display to modify the plurality of customizable components comprise one or more gestures performed by the user to resize the graphical elements.

19. The system according to claim 17 wherein the one or more fourth gestures performed by the user on the graphical elements of the touch screen display to modify the plurality of customizable components comprise one or more gestures performed by the user to arrange the graphical elements with respect to each other.

20. The system according to claim 17 wherein the one or more fourth gestures performed by the user on the graphical elements of the touch screen display to modify the plurality of customizable components comprise one or more gestures performed by the user to modify content associated with the customizable components.

21. The system according to claim 12, the physical memory storing instructions that further cause the computing device to receive a request to reconfigure a mapping between a set of gestures and a set of actions to a new mapping between the set of gestures and the set of actions.

\* \* \* \* \*